US006456233B1

(12) United States Patent
Zhodzishky et al.

(10) Patent No.: US 6,456,233 B1
(45) Date of Patent: Sep. 24, 2002

(54) METHODS AND APPARATUSES OF POSITIONING A MOBILE USER IN A SYSTEM OF SATELLITE DIFFERENTIAL NAVIGATION

(75) Inventors: Mark Isaakovich Zhodzishky; Victor Abramovich Veitsel, both of Moscow; Michail Y. Vorobiev, Moscow Region, all of (RU); Javad Ashjaee, Saratoga, CA (US)

(73) Assignee: Topcon GPS LLC, Pleasanton, CA (US)

( * ) Notice: Subject to any disclaimer, the term of this patent is extended or adjusted under 35 U.S.C. 154(b) by 0 days.

(21) Appl. No.: 09/875,066

(22) Filed: Jun. 5, 2001

Related U.S. Application Data

(62) Division of application No. 09/399,077, filed on Sep. 18, 1999, now Pat. No. 6,268,824.
(60) Provisional application No. 60/100,837, filed on Sep. 18, 1998.

(51) Int. Cl.[7] .................................................. G01S 5/14
(52) U.S. Cl. .............................. 342/357.02; 342/357.12
(58) Field of Search ......................... 342/357.02, 357.12

(56) References Cited

U.S. PATENT DOCUMENTS

| 4,812,991 A | 3/1989 | Hatch | 701/225 |
| 5,451,964 A | 9/1995 | Babu | 342/357.06 |
| 5,502,641 A | 3/1996 | Isomura | 701/215 |

OTHER PUBLICATIONS

Dr. Dariusz Lapucha, Richard A. Barker, "Dual Baseline Real–Time OTF Kinematic GPS," *Proceedings of the 9th International Technical Meeting of the Satellite Division of the Institute of Navigation ION GPS–96*, Sep. 17, 1996, pp. 883–888.

Dmitry Kozlovet et al., "Instant RTK cm with Low Cost GPS+GLONASS C/A Receivers," *Proceedings of the 10th International Technical Meeting of the Satellite Division of the Institute of Navigation ION GPS–97*, Sep. 16, 1997, pp. 1559–1569.

Janet Brown Neumann, et al., "Test Results from a New 2 cm Real Time Kinematic GPS Positioning System," *Proceedings of the 9th International Technical Meeting of the Satellite Division of the Institute of Navigation ION GPS–96*, Sep. 17, 1996, pp. 873–882.

Bradford W. Parkinson, James J. Spilker, Jr., *Global Positioning System: Theory and Applications; vol. 1; vol. 163, Progress in Astronautics and Aeronautics*, Published by American Institute of Aeronautics and Astronautics, Inc., Copyright 1996, pp. 245–433.

(List continued on next page.)

*Primary Examiner*—Thomas H. Tarcza
*Assistant Examiner*—Fred H Mull
(74) *Attorney, Agent, or Firm*—Coudert Brothers LLP

(57) ABSTRACT

The measurements of two GPS and/or GLONASS receivers are related to a common time moment by extrapolating measurement data that has arrived through a connection link with a delay. This common time moment is defined by the user. Cycle slips in the phase-lock loops (PLLs) of the receivers, which may be caused by blockage of direct signals from the satellites, strong interference signals, and reflections, are deflected and corrected in a multi-loop nonlinear tracking system. The procedure of resolution of phase measurement ambiguities comprises the preliminary estimation of floating ambiguities by a recurrent (e.g., iterative) procedure including the simultaneous processing of code and phase measurements for all satellites for each processing time interval, and the gradual improvement of the result as the information is accumulated. After the resolution of ambiguity, the user coordinates are estimated with centimeter accuracy on the basis of phase measurements on the carrier frequency.

38 Claims, 10 Drawing Sheets

OTHER PUBLICATIONS

Bradford W. Parkinson, James J. Spilker, Jr., *Global Positioning System: Theory and Applications; vol. I1; vol 163, Progress in Astronautics and Aeronautics*, Published by American Institute of Aeronautics and Astronautics, Inc., Copyright 1996, pp. 3–50 and 275–301.

P.J.G. Teunissen, et al., "The Volume of the GPS Ambiguity Search Space and its Relevance for Integer Ambiguity Resolution," *Proceedings of the 9th International Technical Meeting of the Satellite Division of the Institute of Navigation ION GPS–96*, Sep. 17, 1996, pp. 889–898.

Davis Walsh, et al., "GPS and GLONASS Carrier Phase Ambiguity Resolution," *Proceedings of the 9th International Technical Meeting of the Satellite Division of the Institute of Navigation ION GPS–96*, Sep. 17, 1996, pp. 899–907.

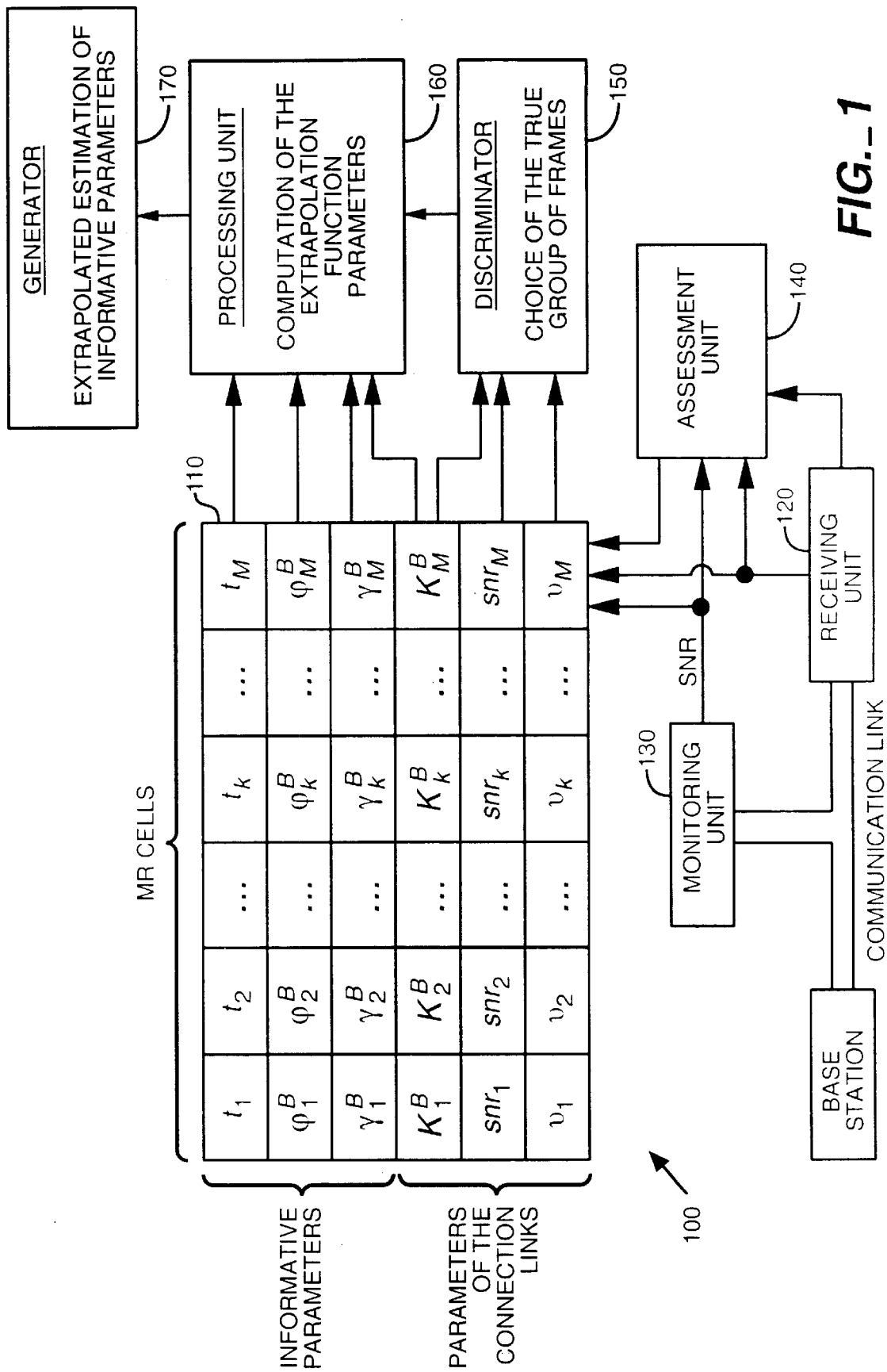
FIG._1

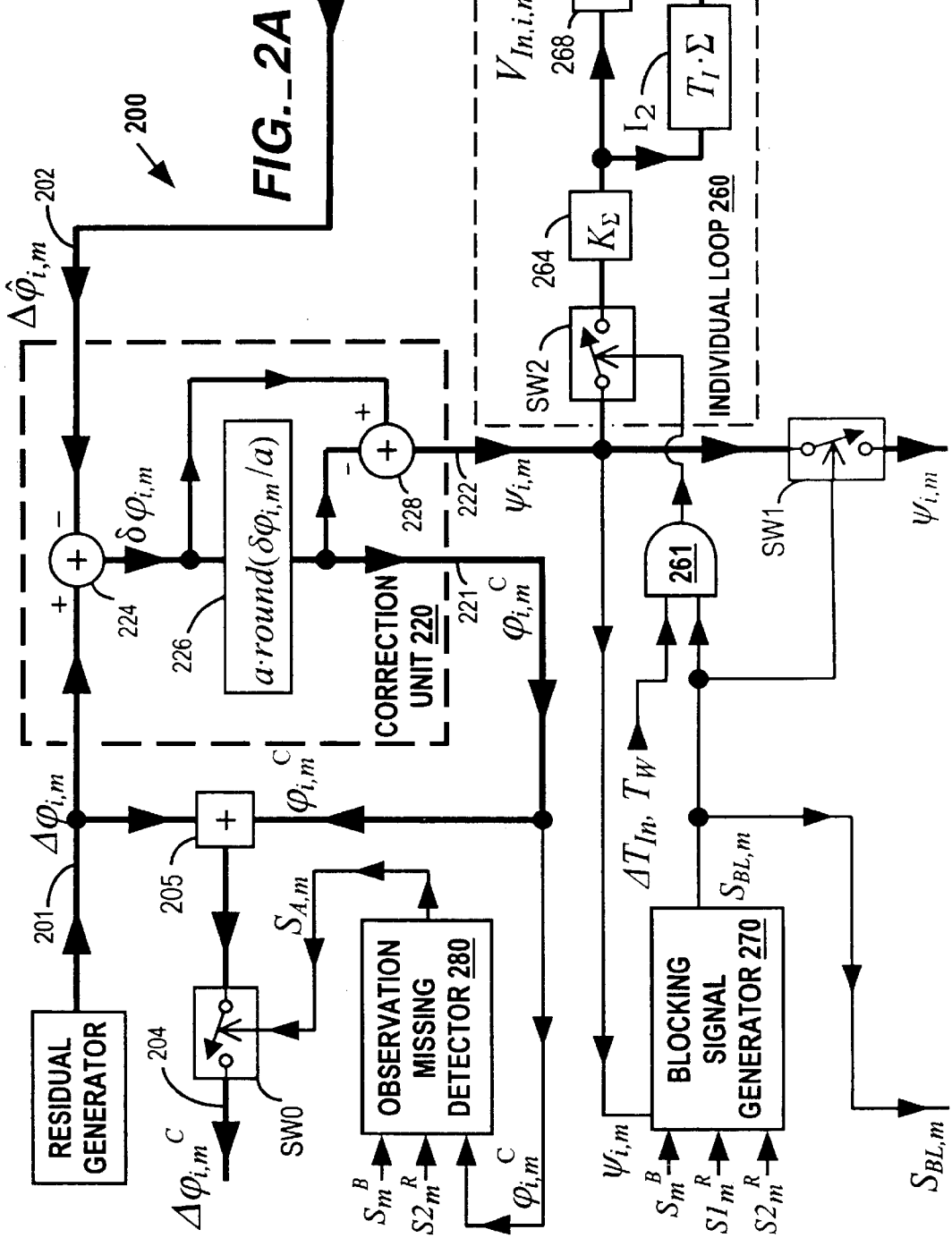

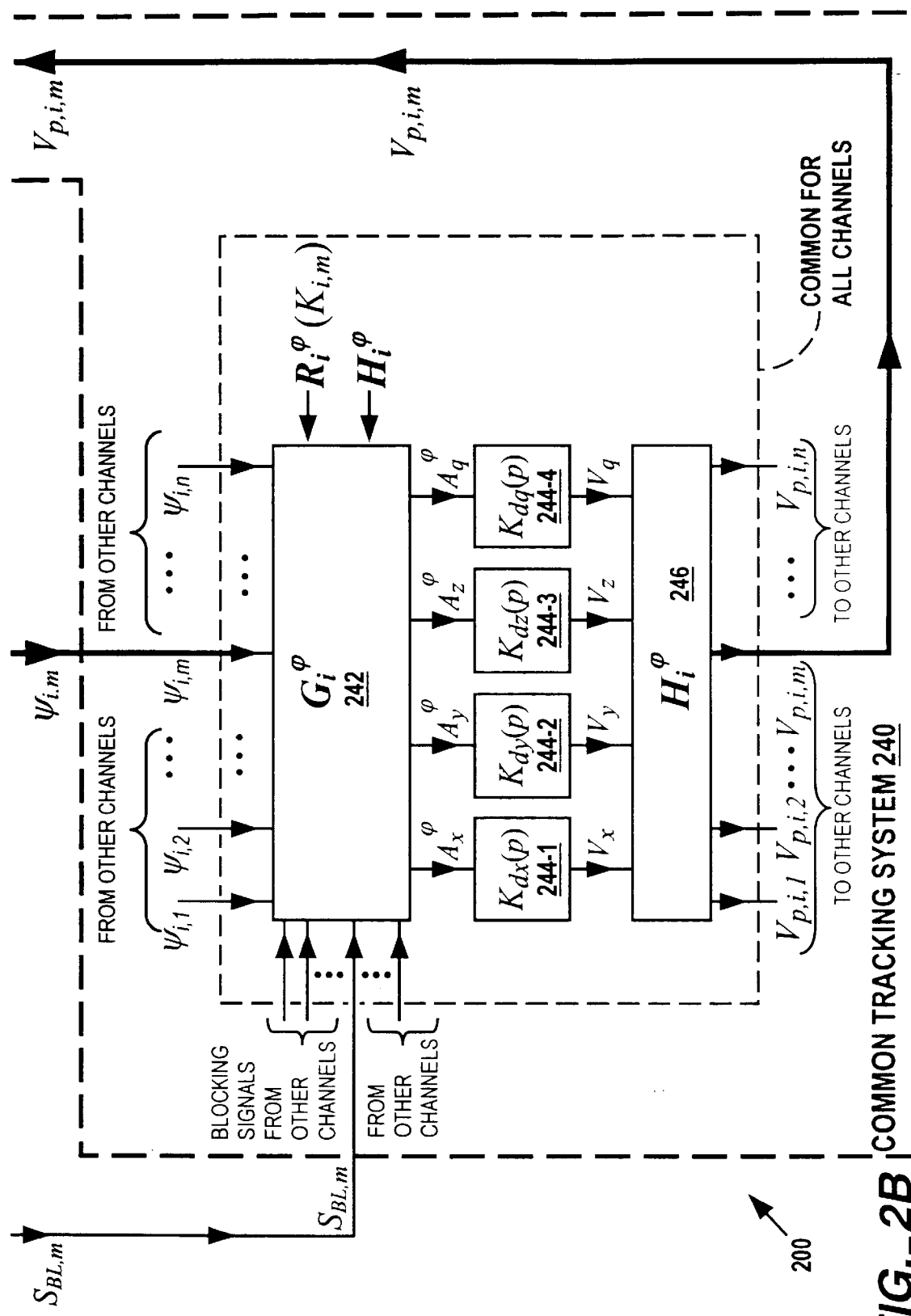
FIG._2B COMMON TRACKING SYSTEM 240

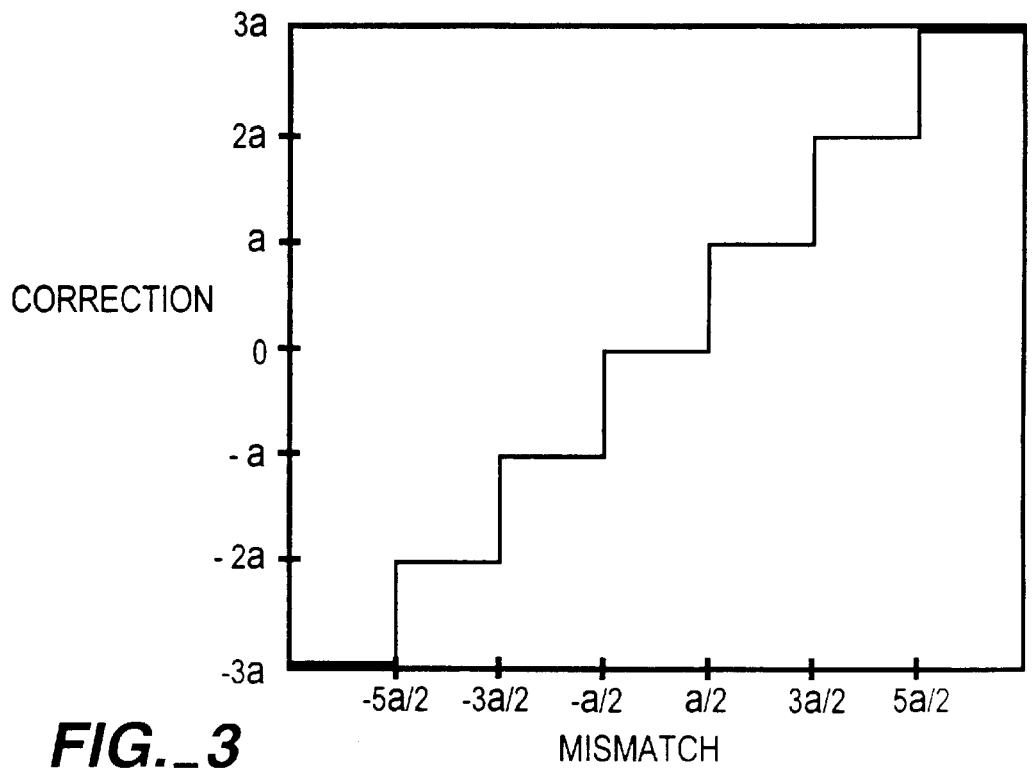
FIG._3
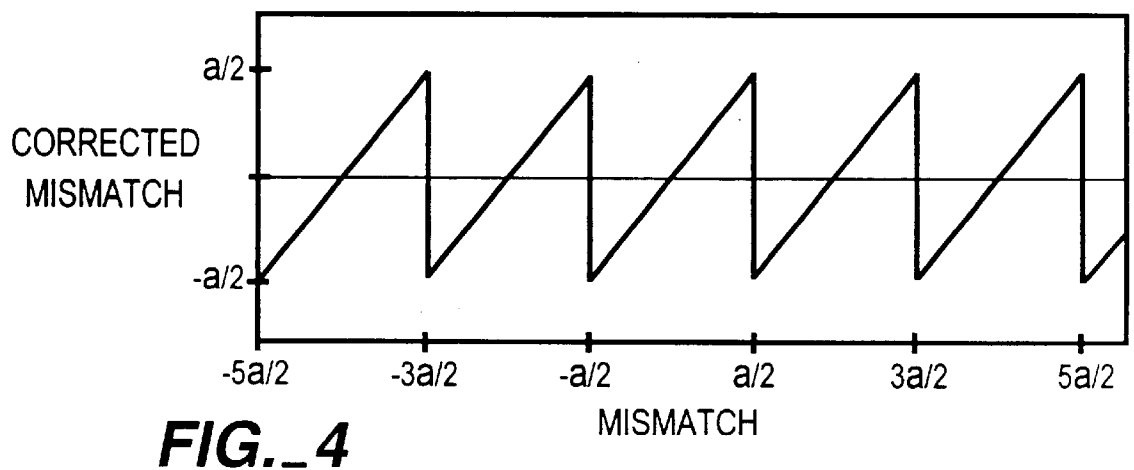
FIG._4

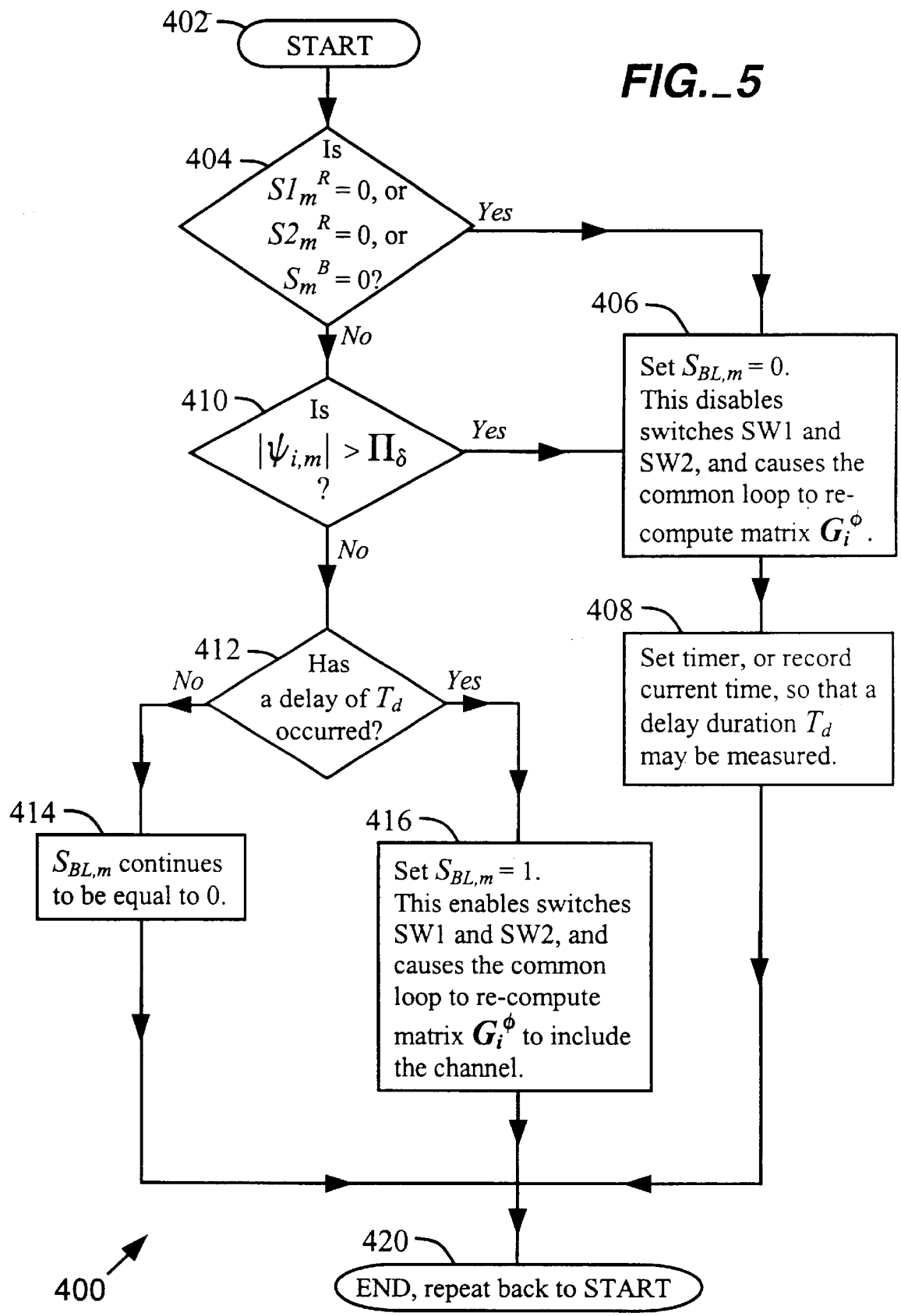
FIG._5

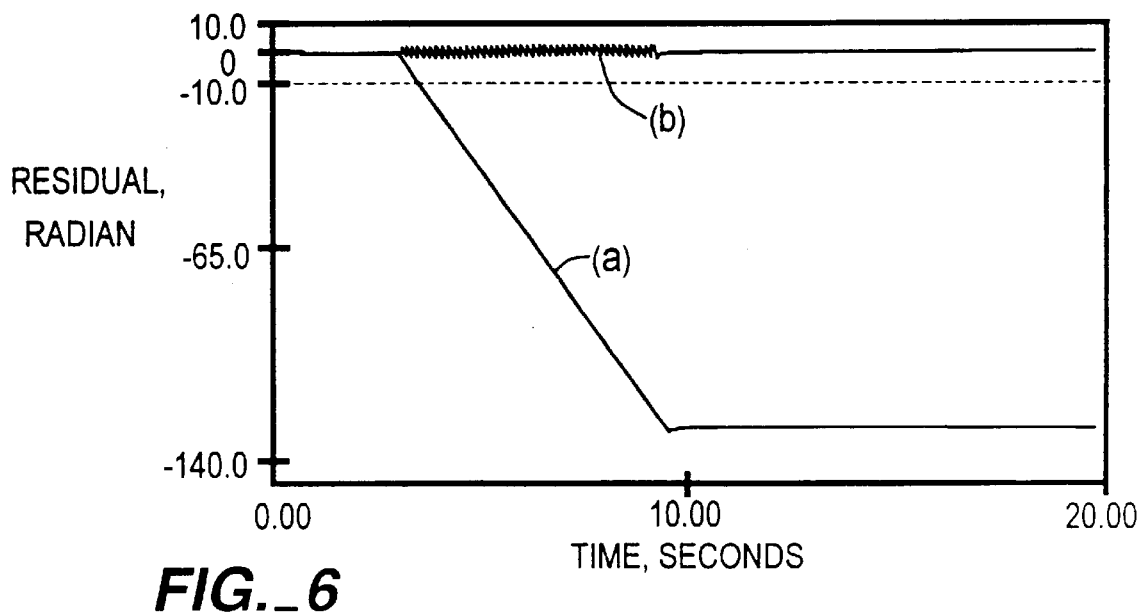
FIG._6
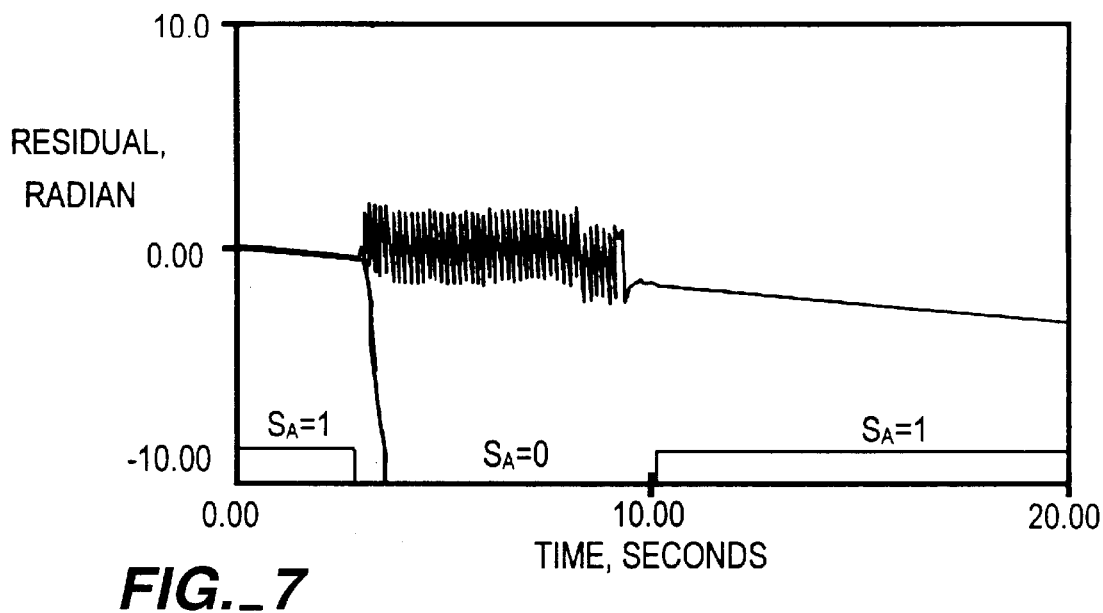
FIG._7

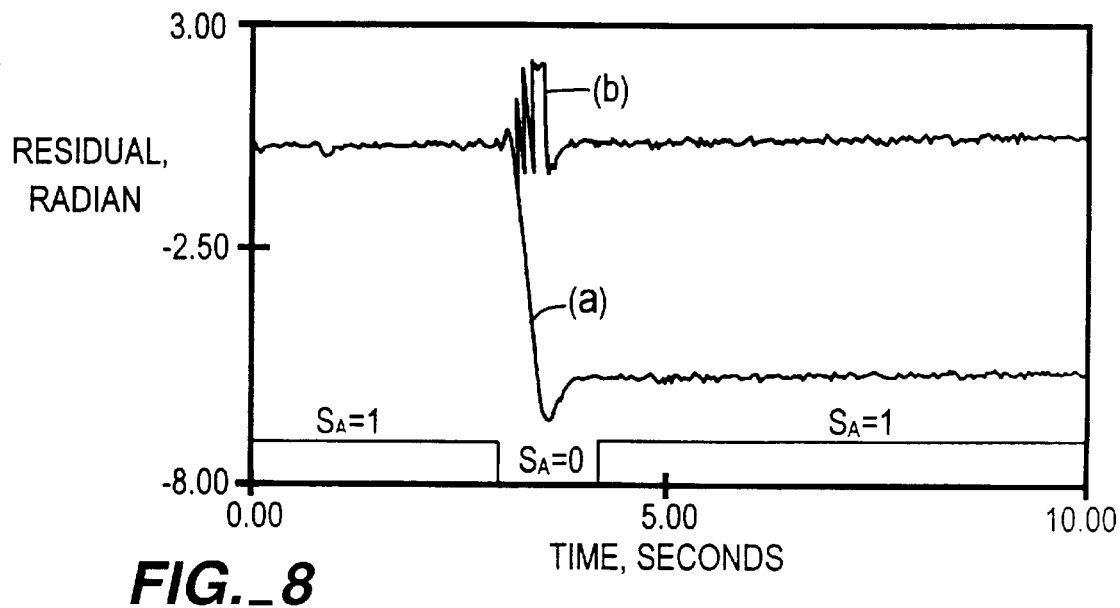
FIG._8
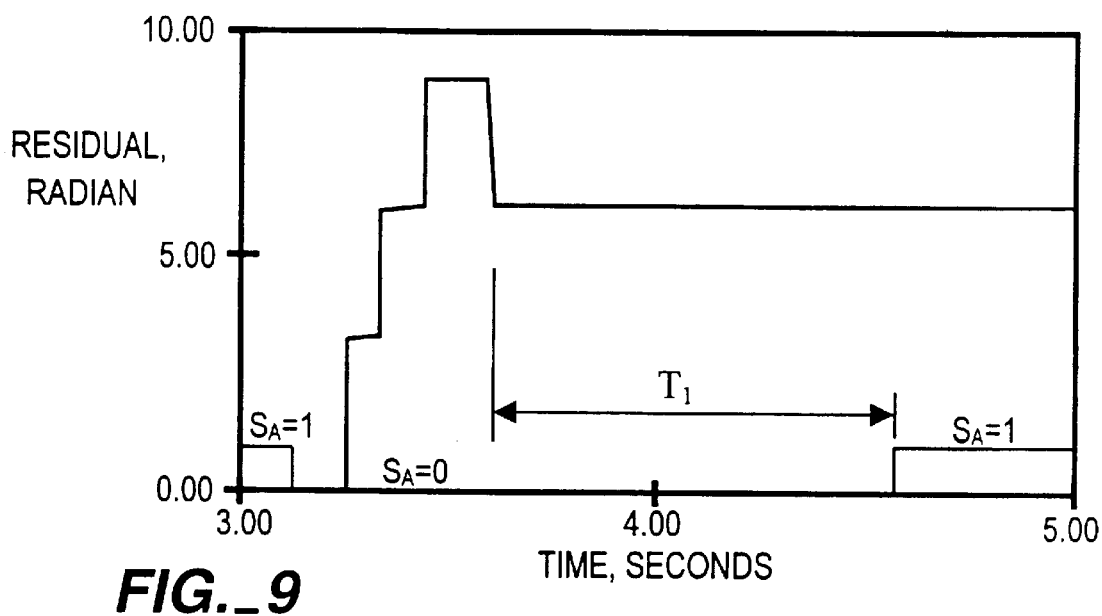
FIG._9

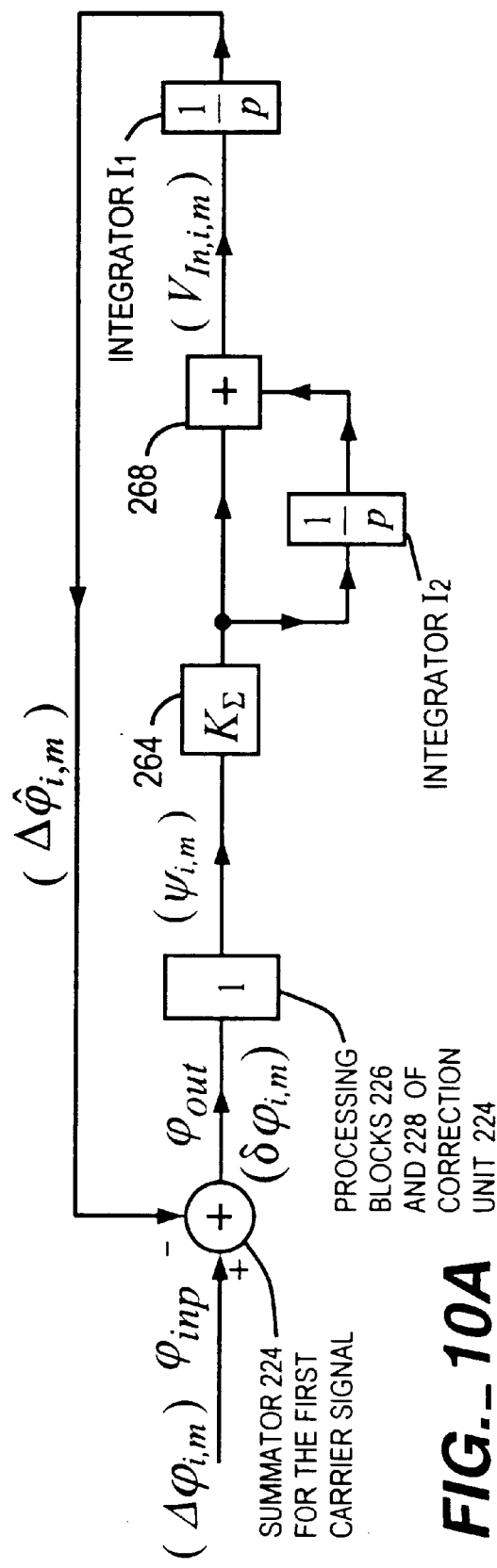
FIG._10A
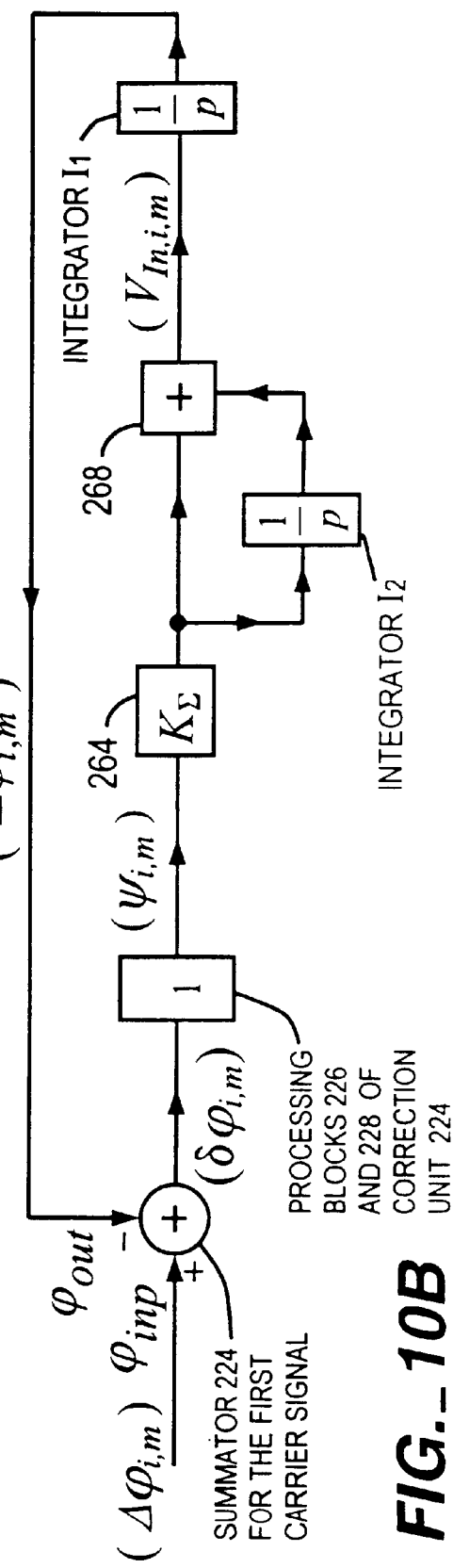
FIG._10B

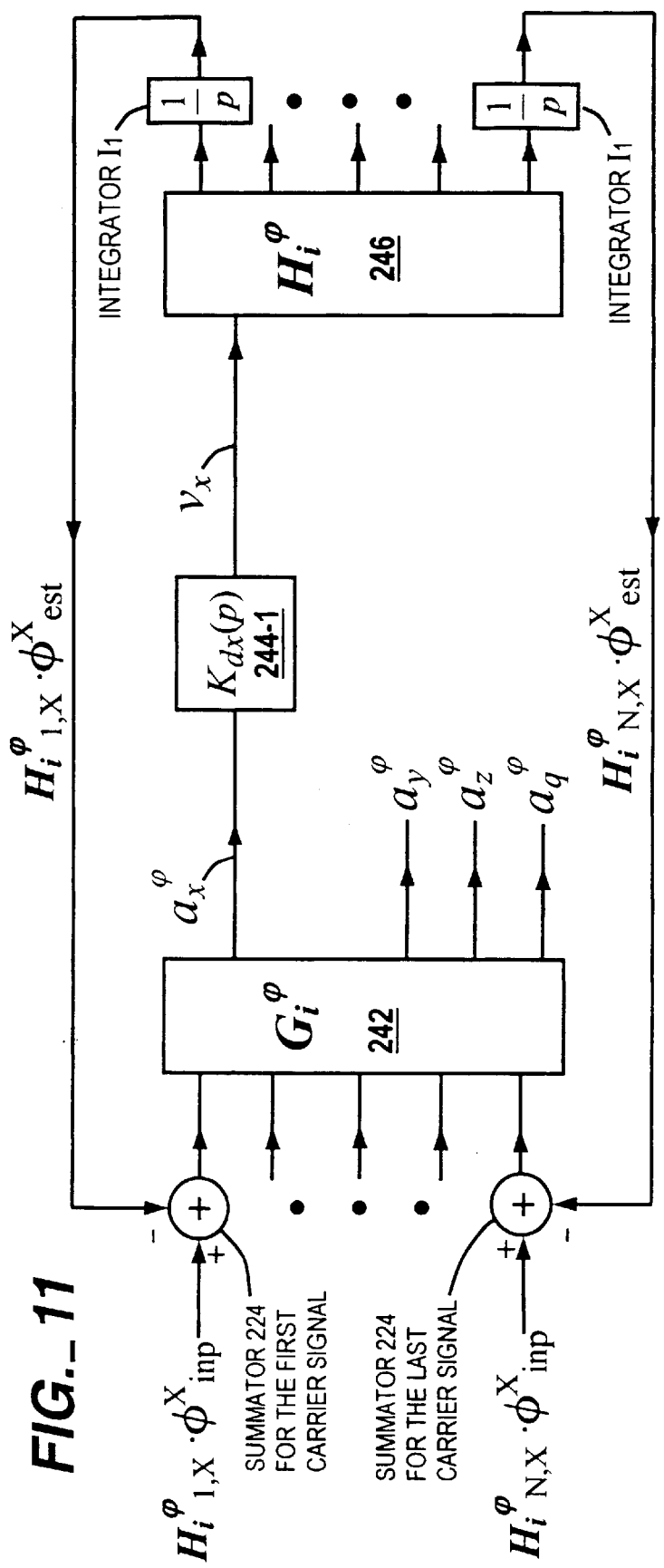
FIG._11

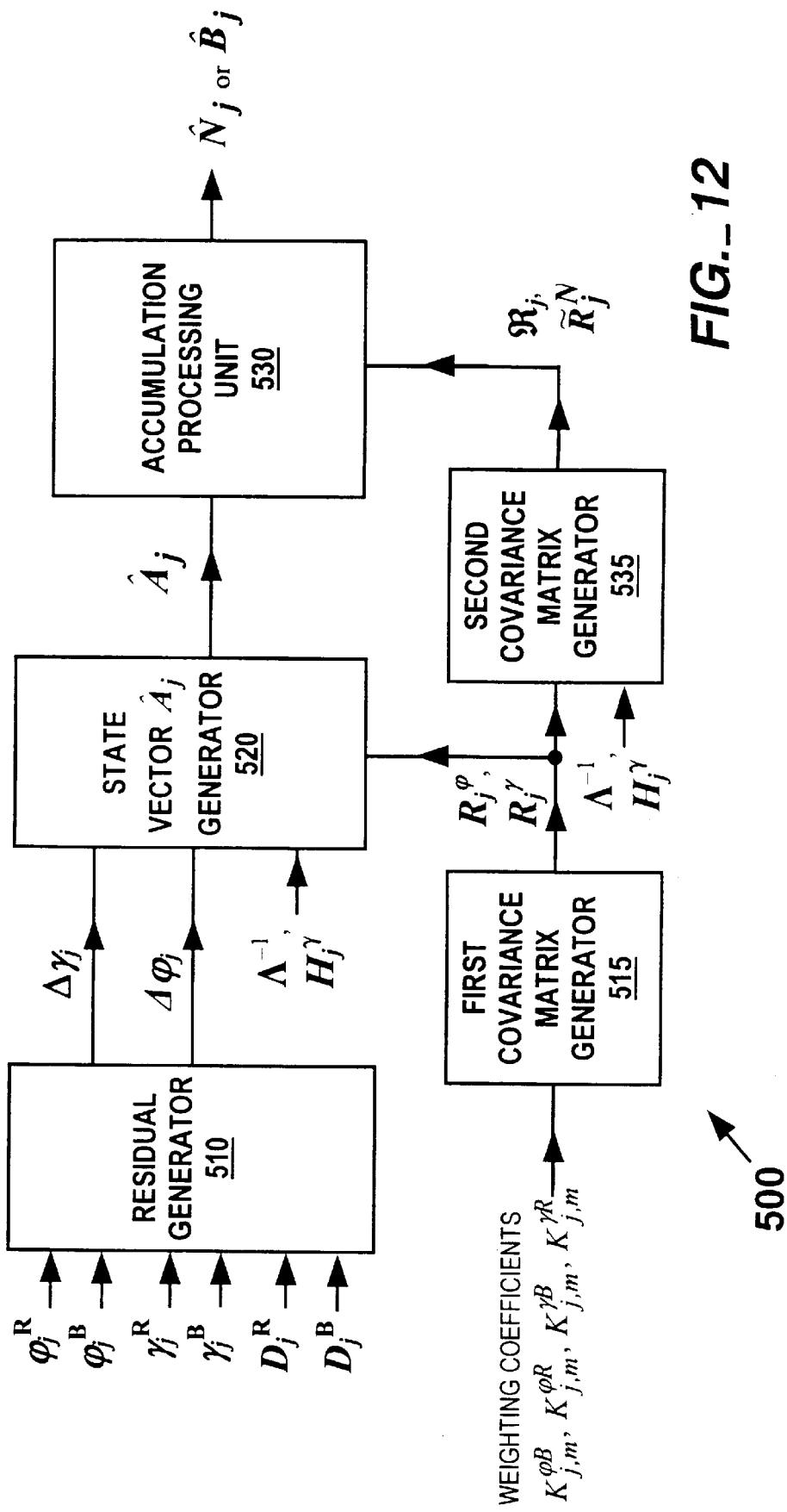
FIG._12

METHODS AND APPARATUSES OF POSITIONING A MOBILE USER IN A SYSTEM OF SATELLITE DIFFERENTIAL NAVIGATION

CROSS-REFERENCE TO RELATED APPLICATIONS

This application claims the benefit of priority to U.S. patent application Ser. No. 60/100,837, filed Sep. 18, 1998, the contents of which is incorporated herein. In addition, this application is a divisional of U.S. patent application Ser. No. 09/399,077, Filed Sep. 18, 1999 now U.S. Pat. No. 6,268,824.

FIELD OF THE INVENTION

The present invention relates to methods of information processing in satellite navigation systems with differential positioning of a mobile user.

BACKGROUND OF THE INVENTION

Satellite navigation systems, such as GPS (USA) and GLONASS (Russia), are intended for high accuracy self-positioning of different users possessing special navigation receivers. A navigation receiver receives and processes radio signals broadcasted by satellites located within line-of-sight distance. The satellite signals comprise carrier signals which are modulated by pseudo-random binary codes, which are then used to measure the delay, relative to local reference clock or oscillator. These measurements enable one to determine the so-called pseudo-ranges between the receiver and the satellites. The pseudo-ranges are different from true ranges (distances) between the receiver and the satellites due to variations in the time scales of the satellites and receiver and various noise sources. To produce these time scales, each satellite has its own on-board atomic clock, and the receiver has its own on-board clock, which usually comprises a quartz crystal. If the number of satellites is large enough (more than four), then the measured pseudo-ranges can be processed to determine the user location (e.g., X, Y, and Z coordinates) and to reconcile the variations in the time scales. Finding the user location by this process is often referred to as solving a navigational problem or task.

The necessity to guarantee the solution of navigational tasks with accuracy better than 10 meters, and the desire to raise the stability and reliability of measurements, have led to the development of the mode of "differential navigation ranging", also called "differential navigation" (DN). In the DN mode, the task of finding the user position is performed relative to a Base station (Base), the coordinates of which are known with the high accuracy and precision. The Base station has a navigation receiver which receives the signals of the satellites and processes them to generate measurements. The results of these measurements enable one to calculate corrections, which are then transmitted to the user that also uses a navigation receiver. By using these corrections, the user obtains the ability to compensate for the major part of the strongly correlated errors in the measured pseudo-ranges, and to substantially improve the accuracy of his or her positioning.

Usually, the Base station is immobile during measurements. The user may be either immobile or mobile. Later on, we will call such a user "the Rover." The location coordinates of a moving Rover are continuously changing, and should be referenced to a time scale.

Depending on the navigational tasks to be solved, different modes of operation may be used in the DN mode. They differ in the way in which the measurement results are transmitted from the Base to the Rover. In the Post-processing (PP) mode, these results are transmitted as digital recordings and go to the user after all the measurements have been finished. In the PP mode, the user reconstructs his or her location for definite moments in the past.

Another mode is the Real-Time Processing (RTP) mode, and it provides for the positioning of the Rover receiver just during the measurements. The RTP mode uses a communication link (usually it is a radio communication link), through which all the necessary information is transmitted from the Base to the Rover receiver in digital form.

Further improvement of accuracy of differential navigation may be reached by supplementing the measurements of the pseudoranges with the measurements of the phases of the satellite carrier signals. If one measures the carrier phase of the signal received from a satellite in the Base receiver and compares it with the carrier phase of the same satellite measured in the Rover receiver, one can obtain measurement accuracy to within several percent of the carrier's wavelength, i.e., to within several centimeters.

The practical implementation of those advantages, which might be guaranteed by the measurement of the carrier phases, runs into the problem of there being ambiguities in the phase measurements.

The ambiguities are caused by two factors. First, the difference of distances $\Delta D$ from any satellite to the Base and Rover is usually much greater than the carrier's wavelength $\lambda$. Therefore, the difference in the phase delays of a carrier signal $\Delta \phi = \Delta D/\lambda$ received by the Base and Rover receivers may substantially exceed one cycle. Second, it is not possible to measure the integer number of cycles in $\Delta \phi$ from the incoming satellite signals; one can only measure the fractional part of $\Delta \phi$. Therefore, it is necessary to determine the integer part of $\Delta \phi$, which is called the "ambiguity". More precisely, we need to determine the set of all such integer parts for all the satellites being tracked, one integer part for each satellite. One has to determine this set along with other unknown values, which include the Rover's coordinates and the variations in the time scales.

In a general way, the task of generating highly-accurate navigation measurements is formulated as follows: it is necessary to determine the state vector of a system, with the vector containing $n_\Sigma$ unknown components. Those include three Rover coordinates (usually along Cartesian axes X, Y, Z) in a given coordinate system (sometimes time derivatives of coordinates are added too); the variations of the time scales which is caused by the phase drift of the local main reference oscillator; and n integer unknown values associated with the ambiguities of the phase measurements of the carrier frequencies. The value of n is determined by the number of different carrier signals being processed, and accordingly coincides with the number of satellite channels actively functioning in the receiver. At least one satellite channel is used for each satellite whose broadcast signals are being received and processed by the receiver. Some satellites broadcast more than one code-modulated carrier signal, such as a GPS satellite which broadcasts a carrier in the $L_1$ frequency band and a carrier in the $L_2$ frequency band. If the receiver processes the carrier signals in both of the $L_1$ and $L_2$ bands, the number of satellite channels (n) increases correspondingly.

Two sets of navigation parameters are measured by the Base and Rover receivers. respectively, and are used to determine the unknown state vector. Each set of parameters includes the pseudo-range of each satellite to the receiver, and the full (complete) phase of each satellite carrier signal. Each pseudo-range is obtained by measuring the time delay of a code modulation signal of the corresponding satellite. The code modulation signal is tracked by a delay-lock loop (DLL) circuit in each satellite tracking channel. The full phase of a satellite's carrier signal is tracked by a phase-lock-loop (PLL) in the corresponding satellite tracking channel. An observation vector is generated as the collection of the measured navigation parameters for specific (definite) moments of time.

The relationship between the state vector and the observation vector is defined by a well-known system of navigation equations. Given an observation vector the system of equations may be solved to find the state vector if the number of equations equals or exceeds the number of unknowns in the state vector. In the latter case, conventional statistical methods are used to solve the system: the least squares method, the method of dynamic Kalman filtering, and various modifications of these methods.

Practical implementations of these methods in digital form may vary widely. In implementing or developing such a method on a processor, one usually must find a compromise between the accuracy of the results and speed of obtaining results for a given amount of processor capability, while not exceeding a certain amount of loading on the processor.

The most used general scheme comprises the following steps. The measured values of the pseudo-ranges and full phases at specific (definite) moments of time, along with an indication of the satellites to which these measurements belong to and the time moments of the measurements, are transmitted from the Base to the Rover (such as through the communication link or as recordings). Corresponding values are measured in the Rover receiver. The processing includes the determination of the single differences of the pseudo-ranges and full phases between the Base and Rover measurements for each satellite. The strongly correlated errors are compensated (i.e., substantially cancelled) in the single differences. Then, the residuals of the single differences are calculated by subtraction of calculated values from the measured results. The processing of residuals allows one to linearize the initial system of navigation equations (sometimes several subsequent iterations are necessary for that), which makes possible the use of the well developed body of mathematics for solving systems of linear equations. The components of the state vector with the n ambiguities included, are found as a result of the solution. But the calculated values of the ambiguities are not necessarily integer numbers, and are often floating point numbers. Because of this, they are called "float ambiguities", or "floating ambiguities, at this stage of the solution. To find true values of the integer ambiguities one uses the procedure of rounding off the float ambiguity vector to the nearest set of integers. This process is called 'the ambiguity resolution'. Only after the ambiguity resolution has been done is it possible to determine the true values of residuals and then, by solving the system of equation again, to find the coordinate values for the baseline connecting the Base and Rover, and consequently to determine the exact coordinates of Rover and the correction to its clock drift.

The described general scheme of computations is presented in more detail in the literature on satellite navigation. This presentation is the most complete in English in the book by Bradford W. Parkinson and James J. Spilker Jr., *Global Positioning Theory and Applications*, Volume 163 of Progress In Astronautics and Aeronautics, published by the American Institute of Aeronautics and Astronautics, Inc, Washington D.C., 1996. In Russian. the most complete presentation is in the book *Network Satellite Radionavigating Systems*, editor V. S. Shebshaevich, 2-nd edition, Publ. House Radio and Communication, Moscow. 1993.

The particular problems connected to the processing of the navigation information are considered in many articles, manuals and patents. Here we will dwell only on some of these problems which directly concern the subjects of the present inventions.

The first problem concerns the task of aligning (or synchronizing) the Base and Rover measurements to the same moment of time. This is a necessary condition for good compensation in the single differences of strongly correlated errors which change with time. The task of aligning can be solved by two ways: the first way, which is called the mode of "matched observation processing", delays the use of the Rover measurements until the corresponding Base measurements are received. This mode is poorly suited for Rovers in speedy motion, for which the positioning at definite, precisely fixed moments of time is required. The second way, which is called the mode of "low latency position processing" extrapolates the Base measurements forward in time up to the moment of reception of the corresponding Rover measurements. This mode is better suited to the task of generating accurate Rover coordinate at time moments which are arbitrarily chosen by a user or an application program at the Rover location.

In existing systems, different extrapolation methods are used, starting from the elementary linear prediction, which sometimes is sufficient for small prediction times (about several seconds). For longer prediction times (such as between 30 s and 60 s) it is recommended to take into account the statistic characteristics of the processes to be predicted. which mainly depend on the presence of selective access (in the system GPS), and on fluctuations of reference generators on board the satellites and the Base receiver. For such cases, one uses the extrapolation with the help of the Kalman filter. One of the possible variants of such an extrapolation unit is described in the article by J. Neumann, et al., entitled "Test Results from a New 2 cm Real Time Kinematics GPS Positioning System," *The Proceedings of the 9-th International Technical Meeting of the Satellite Division of the Institute of Navigation* (ION GPS-96), 1996, pp. 873–882. The essential difficulty in applying conventional extrapolation methods is that these methods are not designed for the occurrence of large abnormal errors in measurements which are used to base the predictions. The abnormal errors usually occur when the communication link between the Base and Rover operates in an environment having a large number of buildings and other objects which generate a large number of reflected signals. The signal received by moving Rover frequently fades, and the transmitted information is deformed by noise. To guarantee good predictions, it is necessary to analyze the incoming information and to exclude intervals of time containing abnormal errors. One set of methods for such an analysis is proposed as a first invention of this patent application.

Another problem arising-during the solution of a navigation problem using the phase measurements is caused by the possible appearance of cycle slips in the PLL circuits which are tracking the satellite carrier signals. After a cycle slip occurs, the PLL circuit transits to a new point of steady balance, after which it goes on with tracking the satellite carrier signal. As a result of a cycle slip, an abnormal error equal to several integer number of semi-cycles (half-cycles) is introduced into the full phase measurements. Such an error may make computed position coordinates completely worthless. Sometimes it is possible to detect the appearance of a cycle slip by directly observing the rate of change of the full phase. During a cycle slip, this rate usually jumps in value, and this provides an opportunity to detect the slip. In some cases, it is possible to detect a cycle slip from implicit symptoms and signs. For example, a cycle slip is often accompanied with a deep fading of the signal amplitude, and the occurrence of the slip can be detected by detecting the fading of the signal. However, such a method of cycle slip detection does not have sufficient reliability. The characteristics of the slip process, as well as the reasons causing it, are very variable. There exist 'slow' slips where the rate of the phase change differs only slightly from the usual rate of phase change due to the Rover's movement, and correspondingly, the cycle slip often cannot be detected by this symptom. The amplitude fading does not always coincide with the cycle slip appearance either. When measurements from a large number of satellite channels are used, it is possible to identify the channels for which the measurement results strongly differ from predictions made on the basis of data from other channels, and thereby to detect the slip. However, a substantial increase in the volume of calculations might be necessary to determine which set of channels have generated bad measurements. In addition, the sufficient amount of redundancy is often lacking. If the slip is nevertheless detected, it is necessary to make a decision on how to react to the slip. Thus, for example, if the number of active satellite channels is large enough, it is possible to exclude the channel for which the cycle slip is detected from further consideration. One may also act differently: having waited until the completion of the slip, one can resolve the ambiguity of phase measurements anew, with the affected channel included. For that it would be necessary to spend some time during which the generation of highly-accurate coordinates would stop, which is sometimes extremely undesirable.

The correction for the cycle slip immediately after its completion would be the best solution; but to do so, one has to measure the sign and value of the cycle slip. One of the methods to correct the phase slip was proposed by Isomura in U.S. Pat. No. 5,502,641. The following steps were proposed in that method:

1. Recording the time moment at which a satellite carrier signal first disappears, and determining the rate of change in the carrier's full phase during the time period just before the disappearance; this rate of change is called the "initial rate of change";

2. Recording the time moment at which the satellite carrier signal reappears and determining the rate of change in the carrier's full phase just after the reappearance, this rate of change is called the "final rate of change";

3. Calculating a predicted value of the full phase at the time moment of its reappearance based on the initial and final values of the rate of change, and on the measured value of the full phase before the signal disappearance;

4. Comparing the predicted value with the value of the full phase measured accumulated by the tracking channel at the time of the signal's reappearance. If these values differ by more than a semi-cycle (half-cycle), one may assume that a cycle slip took place and take the corresponding correction.

We must note the fact that this method would give satisfactory results only in cases when the Rover does not change its velocity during the disappearance of the satellite carrier signal. We also point out that when a satellite signal is blocked from the receiver's antenna, the satellite signal can be reflected off of a nearby object or the ground and reach the antenna by a different path as a reflected signal. If this occurs, cycle slips may occur because of the difference in path lengths, and the Isomura method may not detect the slips because the method may not see the disappearance of the direct satellite signal. A second invention of the present application is directed to apparatuses and methods of cycle-slip detection which are based on a set of specific symptoms of the cycle slip, and therefore have higher reliability for Rover's making fast maneuvers.

A third problem relating to the solution of a navigation problem using the phase measurements concerns the ambiguity resolution stage. As it was already noted, the first part of this stage comprises the step of obtaining sufficiently accurate estimates of the float ambiguities. Typical computational methods for this task provide for the gradual accumulation of information that depends on the number and locations of the satellites, and correspondingly, the accuracy of estimation of the float ambiguities increases with time due to the smoothing of fluctuations in the measurements, and due to the geometry change in the satellite constellation.

A substantial number of works have been published that considered computational procedures for obtaining the float ambiguity estimations with sufficient accuracy in the shortest possible time. The computational speed of the processor used imposes the natural limitations here. That is why one tries to lower the loading on the processor, sometimes even to the detriment of accuracy.

Several of the publications use computations based upon Kalman filtering. The previously-mentioned article by J. B. Neumann, et al., (ION GPS-96) describes a Kalman Filter method which simultaneously estimates the coordinates of the baseline and the floating ambiguities. The estimations are generated with delay after the corresponding measurements of the Base station have been received by the Rover. In the article entitled "Instant RTK cm with Low Cost GPS+GLONASS™ C/A Recievers" by D. Kozlov and M. Tkachenko, in *The Proceedings of the* 10-*th International Technical Meeting of the Satellite Division of the Institute of Navigation* (ION GPS-97), 1997, pp. 1559–1569, a method of generating the Kalman filter that provides the separate smoothing of float ambiguity estimates was considered. Various different methods for improving or simplifying the numerical computations have been proposed in several issued patents. In U.S. Pat. No. 4,812,991 to R. R. Hatch, it was proposed to smooth the code measurements by increments of the phase measurements separately for each satellite. After that smoothing, the baseline vector is estimated by the least squares method which uses the smoothed values of the pseudo-ranges. The method allows one to diminish the processor load substantially as it completely omits the step of ambiguity resolution. But this is achieved at the expense of a substantial decrease in the positioning accuracy. A similar idea of smoothing was used in the U.S. Pat. No. 5,451,964 to B. A. Babu, et al. Here the code measurements smoothing allows one to decrease the search zone for the integer ambiguity vector and, as a result, to reduce the time to find the correct resolution. A third invention of the present application is directed to methods which smooth the floating ambiguity estimates by a recurrent least squares method which is applied simultaneously and jointly to all of the satellite channels. It enables one to accelerate the obtaining of reliable integer ambiguities at an acceptable processor load.

SUMMARY OF THE INVENTION

The present application discloses three general invention areas (methods and apparatuses therefor), each of which pertains to the navigation parameters (pseudorange and full phase) with the object of determining the baseline coordinates in the system of differential satellite navigation with greater and more reliable accuracy. The three inventions are preferably used together, but may be used separately, if desired. As a basis for practicing the inventions, the navigation parameters are measured by a receiver situated at a Base station (also called the reference station), and by a Rover receiver, which is usually mobile. The coordinates of the Base receiver are known exactly. The coordinates of the Rover receiver are estimated relative to Base receiver. The coordinates of the Base receiver are typically transmitted to the Rover through the communication links. However, post-processing of the measurements by the inventions may be performed at a subsequent time, either at the Rover location or the Base location, or another location. The processing processor and the user of navigation information are both typically situated at the Rover receiver. However, this is not necessarily the case if one wishes to use the inventions in a post-processing mode.

The first invention relates to the extrapolation of measurements from the Base station, the second invention relates to the detection and correction of cycle slips in the PLL circuits of one or both of the Base and Rover receivers, and the third invention relates to the computation of the floating ambiguity estimates. These inventions enable one to improve the accuracy, reliability and efficacy of the determination of relative position using differential navigation measurements.

Each of the inventions relates to one of a number of general stages that are used to generate accurate baseline coordinates to the Rover by differential navigation. The three general stages implemented by the three inventions of this application are intermediate stages in the overall process of computing the coordinates of the baseline. The subsequent processing stages comprise the integer ambiguity resolution stage, the stage of computing the baseline coordinates, and the stage of correcting the time scale. These subsequent stages are implemented according to well-known methods described in the literature. A detailed description of these well-known methods in this application is not needed for one of ordinary skill in the art to make and use the present inventions.

The first invention related to extrapolation takes into account abnormal and anomalous errors in the measurements of the navigation parameters made by the Base receiver and computes the predicted values for the Rover receiver only on the basis of reliable measurements from the Base receiver.

The second invention related to cycle slip detection and correction is based upon the system of the measurement of cycle mismatch in a multi-loop tracking system which tracks the Rover movement with the signals from several of the visible satellites. The channel where the cycle slip took place is detected from the mismatch value, and the corresponding correction is introduced. The method provides for switching off channels with the abnormal or anomalous errors, which prevents their influence upon the measurement results.

The third invention related to estimations of the floating ambiguities comprises recurrent procedures which are based upon the joint processing by a least-squares method of the set of code and phase measurements in all satellite channels. The third invention provides the gradual smoothing of errors of those components of the state vector which remain constant, and achieves the necessary accuracy in a relatively short time and at a tolerable processor load.

Some embodiments of these inventions also employ the joint tracking loops for jointly tracking the phases of the satellite carrier signals which are described in our co-pending U.S. patent application Ser. No. 09/330,221, filed Jun. 10, 1999, entitled "The Joint Tracking of the Carrier Phases of the Signals Received from Different Satellites", now U.S. Pat. No. 6,313,789, assigned to the assignee of the present application and incorporated herein by reference, and claiming priority to the earlier provisional U.S. patent application Ser. No. 60/091,004, filed Jun. 10, 1998, incorporated herein by reference. As a brief summary, the joint tracking loops generate correction signals to many or all of the PPL circuits which account for events which affect the tracking the PLL circuits in a common manner. These are called "common events." Such common events include the drift in the receiver's clock and the movement of the receiver's position. When the satellite signal tracked by a PLL circuit is temporarily blocked, the correction signal for that PLL circuit enables the PLL circuit to adjust its phase to account for the phase changes caused by common events that occur during the blockage. As a result, the number of cycle slips that could occur during a blockage of the satellite signal is reduced. While the use of the joint tracking loops provides many benefits, is it not necessary for one to make, use, and practice the inventions disclosed in this application.

BRIEF DESCRIPTION OF THE DRAWINGS

FIG. 1 shows a schematic diagram of the registers and the main units of the extrapolation methods and apparatuses according to the first invention of the present application;

FIG. 2 shows the general block schematic diagram of the cycle-slip detection and correction methods and apparatuses according to the second invention of the present application;

FIG. 3 shows a graph of the non-linear characteristic of a first output from the cycle-slip correction unit according to the second invention of the present application;

FIG. 4 shows a graph of the non-linear characteristic of a second output of the cycle-slip correction unit according to the second invention of the present application;

FIG. 5 shows a flow diagram of an exemplary method of generating the blocking signal according to the second invention;

FIG. 6 is a time graph showing the residual of the single phase difference in the channel No. 8 measured with the simulation model: curve (a) shows the residual without the cycle slip correction ($\Delta\phi_i$), and curve (b) shows the residual with the cycle slip correction ($\Delta\phi_i^c$) according to the second invention;

FIG. 7 is a time graph showing the residual of the single phase difference in the channel No. 8 on an enlarged scale (the fragment 'A' of the plot in FIG. 6): curve (a) shows the residual without the slip correction ($\Delta\phi_i$), and curve (b) shows the residual with the slip correction ($\Delta\phi_i^c$) according to the second invention;

FIG. 8 is a time graph showing the residual of the single phase difference in the channel No. 7 determined with the aid of a simulation model: curve (a) ) shows the residual without the slip correction ($\Delta\phi_i$), and curve (b) ) shows the residual with the slip correction ($\Delta\phi_i^c$) according to the second invention; and FIG. 9 is a time graph showing the form of the cycle slip correction in the channel No. 7 according to the second invention.

FIGS. 10A and 10B are small signal models of the individual loop of the cycle-slip correction and detection methods and apparatus according to the present invention.

FIG. 11 is a small signal model of the common loops of the cycle-slip correction and detection methods and apparatus according to the present invention.

FIG. 12 is a schematic diagram of an exemplary processor for implementing the floating ambiguity resolution according to the present invention.

DETAILED DESCRIPTION OF THE INVENTION

Tutorial on the Structure of the Satellite Signals and Coherent Navigation Receivers.

Before describing the inventions of the present application, we briefly describe the structure of the satellite signals and of a typical receiver suitable for differential navigation applications.

Each of the satellites radiates signals in two frequency bands: the L1 band and the L2 band. Two carrier signals are simultaneously transmitted in the L1-band; both carrier signals have the same frequency, but are shifted in phase by $\pi/2$ (90°). The first L1 carrier signal is modulated by the clear acquisition C/A-code signal and the second L1 carrier signal is modulated by the precision P-code signal. One carrier signal is transmitted in the L2 band, and uses a different frequency than the L1 carrier signals. The L2 carrier signal is modulated by the same P-code signal used to modulate the second L1 carrier signal. These carrier frequencies are between 1 GHz and 2 GHz in value. Each C/A-code signal and P-code signal comprises a repeating sequence of segments, or "chips", where each chip is of a predetermined time period ($\Delta$) and has a pre-selected value, which is either +1 or −1. The segment values follow a pseudo-random pattern, and thus the C/A-codes and the P-codes are called pseudo-random code signals, or PR-code signals. Additionally, before each C/A-code signal and P-code signal is modulated onto its respective carrier signal, each code signal is modulated by a low frequency (50 Hz) information signal (so-called information symbols).

The approximate distance between a satellite and a receiver is equal to the speed of light c multiplied by the transmission time it takes the satellite signal to reach the receiver. This approximate distance is called the pseudorange $\gamma$, and it can be corrected for certain errors to find a corrected distance D between the satellite and the receiver. There is a pseudorage between each visible satellite and the receiver. The transmission time from satellite to receiver is measured with the aid of clocks in the receiver and the satellite, and with the aid of several time scales (i.e., timing marks) present within the received satellite signal. The clocks in the satellites and the receiver are set to substantially the same time, but it is assumed that the receiver clock has a time offset $\tau$ because the receiver clock is based upon a quartz-crystal whereas each satellite clock is based upon a more accurate atomic reference clock. The receiver has the orbital patterns of the satellites stored in a memory, and it can determine the orbital position of the satellites based on the time of its clock. The receiver reads the timing marks on the satellite's signal, and compares them against it own clock to determine the transmission time from satellite to receiver. The satellite's low-frequency (50 Hz) information signal provides the least precise timing information, the C/A-code signal provides the next most precise timing information, and the P-code signal provides the most precise timing information. The pseudorange is determined from the low-frequency information signal and the C/A-code signal for civilian users and some military users, and is determined from the low-frequency information signal and the P-code signal for most military users. Accurate use of the P-code signal requires knowledge of a certain code signal which is only known to military users. Precision better than that provided by the P-code signal can be obtained by measuring the phase of the satellite carrier signal in a differential navigation mode using two receivers.

A typical receiver for differential navigation applications has a frequency down-conversion unit and several individual tracking channels of the coherent type. The down-conversion unit provides down-converted versions of the satellite signals to the channels, with the down-converted signals having frequencies generally in the range of 10 MHz to 20 MHz. Each channel tracks a selected one of the satellite signals. Each tracking channel measures the delay of one PR-code signal within the satellite signal (e.g., C/A-code or P-code signal), and also the phase of the down-converter version of the satellite's carrier signal. A typical tracking channel comprises a Delay-Lock Loop (DLL) circuit for tracking the delay of the PR-code, a Phase-Lock Loop (PLL) circuit for tracking the phase of the satellite's carrier signal, and three correlators which generate the input signals for the DLL and PLL circuits. Each correlator multiplies the combined collection of the down-converted satellite signals with a reference carrier signal from the PLL circuit and with a reference code signal from the DLL circuit, and then accumulates (or integrates) the resulting multiplication products over set time intervals $\Delta T_A$ in an accumulator. At the end of each interval $\Delta T_A$, the value held in the accumulator is output as the correlation signal of the correlator, and the contents of the accumulator is reset to zero in preparation for the next accumulation interval. The outputs of the correlators are, therefore, discrete-time signals which are generated at a rate of $1/\Delta T_A$ values per second.

The DLL circuit in each channel generates two or more reference code signals which are different from one another (such as by form and/or by phase shift). Each reference code is based upon the PR-code signal of the satellite being tracked, and each reference code signal has a range of high correlation with the satellite code signal being tracked. Also, for GPS satellite signals, each of the channel's reference code signals has substantially no correlation with the code signals of other satellites. This enables a receiver channel to select and isolate one of the down-converted GPS satellite signals from the collection of down-converted GPS satellite signals provided by the down-convert unit. In the GLN system, the same C/A-code is used, but each satellite has a different carrier frequency, which enables a receiver channel to distinguish the satellites from one another.

The reference carrier signal from the PLL circuit is coherently generated by a controlled oscillator of the PLL circuit, and its frequency and phase is controlled to correspond to the frequency and phase of the down-converted carrier signal for the satellite being tracked by the channel. We denote the frequency of the reference carrier signal as $f_{NCO}$ since the reference carrier frequency is often generated by a numerically-controlled oscillator. The reference carrier signal is in quadrature format (e.g., $\cos(2\pi \cdot f_{NCO} \cdot t)$ and $\sin(2\pi \cdot f_{NCO} \cdot t)$), and each correlator effectively multiplies the input signal by one of the quadrature components. Each quadrature component of the reference carrier signal may be a sinusoid, a square wave, a triangular wave, or other periodic waveform.

The first correlator generates the "in-phase" correlation signal $I(i \cdot \Delta T_A)$. It is generated by multiplying the collection of down-converted satellite signals with the in-phase component (e.g., $\cos(2\pi \cdot f_{NCO} \cdot t)$) of the coherent reference carrier signal, and with a reference code signal that is a scaled replica of the satellite's PR-code signal, and then accumulating the multiplication products as indicated above. The quantity $i \cdot \Delta T_A$ represents the discrete time moments at which signal $I(i \cdot \Delta T_A)$ is generated. The correlation signal $I(i \cdot \Delta T_A)$ is used to demodulate the information symbol present within the satellite signal and to normalize the discriminator outputs generated in the DLL and PLL circuits to make them relatively invariant to changes in the signal strength of the received satellite signal.

The second correlator of the tracking channel generates the quadrature correlation signal $Q(i \cdot \Delta T_A)$. It is generated by multiplying the collection of down-converted satellite signals with a second reference PR-code signal, and with the quadrature component (e.g., $\sin(2\pi \cdot f_{NCO} \cdot t)$) of the coherent reference carrier signal, and then accumulating the resulting multiplication products as indicated above. The second reference PR-code signal is usually the same as the reference code signal used in the first correlator. The correlation signal $Q(i \cdot \Delta T_A)$ is used by the PLL circuit to synchronize the reference carrier signal to the satellite's carrier signal. Correlation signals $I(i \cdot \Delta T_A)$ and $Q(i \cdot \Delta T_A)$ may be used together to measure the signal strength Z of the satellite carrier: $Z^2 = I^2(i \cdot \Delta T_A) + Q^2(i \cdot \Delta T_A)$.

The third correlator generates the main correlation signal $dI(i \cdot \Delta T_A)$, which is used by the DLL circuit to control the generation of the reference code signals and to synchronize the reference code signal to the satellite's code signal. Signal $dI(i \cdot \Delta T_A)$ may be generated by multiplying the collection of down-converted satellite signals with a strobed version of the satellite's PR-code signal, and with the in-phase component (e.g., $\cos(2\pi \cdot f_{NCO} \cdot t)$) of the coherent reference carrier signal, and then accumulating the resulting multiplication products.

A strobed version of the satellite's PR-code signal may comprise a sequence of short strobe-pulses, each pulse corresponding to a boundary (also called "end") between two chips of the input PR-code signal where there is a change in the sign of the input PR-code signal, and having a polarity which corresponds that of the later chip.

The phase-lock loop (PLL) circuit is used to adjust the frequency ($f_{NCO}$) of the reference carrier signal so that its phase follows the phase of the down-converted version of the satellite's carrier signal. The PLL circuit has a carrier-phase discriminator which generates a phase-error signal Ep as a function of the difference between the phase of the down-converted satellite carrier signal and the phase of the reference carrier signal. The phase-error signal Ep may be generated from the correlation signals in any of the following ways:

$Ep = Q(i \cdot \Delta T_A)$, or (1A)

$Ep = \arctan[Q(i \cdot \Delta T_A)/I(i \cdot \Delta T_A)]$, or (1B)

$Ep = Q(i \cdot \Delta T_A)/I(i \cdot \Delta T_A)$, or (1C)

$Ep = Q(i \cdot \Delta T_A) * \text{Sgn}[I(i \cdot \Delta T_A)]$, or (1D)

$Ep = Q(i \cdot \Delta T_A)/\text{Sgn}[I(i \cdot \Delta T_A)]$, or (1E)

$Ep = Q(i \cdot \Delta T_A) * I(i \cdot \Delta T_A)$, (1F)

Where arctan(*) is the arctangent function (also called the "inverse tangent" function), and where Sgn(*) is the sign function, which has an output value of +1 when its input is zero or positive, and an output value or −1 when its input is negative. Each of these forms contains correlation function $Q(i \cdot \Delta T_A)$, which is proportional to $\sin(\phi)$, where $\phi$ is the phase difference between the phases of the down-converted satellite signal and the reference carrier signal.

The phase-error signal Ep from the PLL's discriminator is provided to a loop filter of the PLL circuit which determines the pass band and the servo-system type of the PLL circuit. The output of the PLL filter provides the control signal of the PLL circuit, and is provided to the generator of the reference carrier signal, where it is used to adjust the frequency ($f_{NCO}$) of the reference carrier signal. The PLL circuit adjusts the phase shift y until the achievement of the condition Ep=0 (i.e., Q=0, $\sin(\phi)=0$) and thus aligns the phases of the reference carrier signal with the satellite's carrier signal. This point (Ep=0) is known as the operating point, or the "point of steady balance," for the PLL circuit.

The relationship of the PLL's phase-error signal $Ep(\phi)$ and the phase shift $\phi$ is substantially linear in a limited range of phase shifts $\phi$ nearby the point of steady balance for the PLL circuit, which is Ep=0. When large shifts are present, which can occur under the effect of large noise spikes or other strong disturbances, the PLL circuit can move to another point of steady balance which is an integer number of phase half-cycles away from the previous point of steady balance ($\pm n^* \pi$, n=1, 2, 3, ... ). This event is known as the "cycle slip effect," and it impedes navigational measurements using the phase of the satellite's carrier signal.

The above-described satellite signal structure and coherent receiver structure are well known to the art and do not form a part of the present inventions.

Tutorial on the Navigation Parameters.

Because of the time offset $\tau$ and other error effects, the pseudorange $\gamma$ between a satellite and a receiver is usually not the actual distance between the satellite and the receiver. By looking at the pseudoranges of four or more satellites, there are well-known methods of estimating the time offset $\tau$ of the receiver and of accounting for some of the error effects to generate the computed distance D between the satellites and the receiver. The receiver's position may then be computed. However, because of various sources of noise and the relatively low resolution of the pseudo-random code signal, the true distances (i.e., true ranges), and receiver's position coordinates will not be exactly known, and will have errors.

In theory, more precise values for the receiver's position and clock offset could be obtained by measuring the number of carrier cycles that occur between each satellite and the receiver. The phase of the carrier of the satellite signal as transmitted by a satellite can be expressed as:

$$\varphi^S(t) = \Phi_0^S + \int_0^t f_S \cdot dt \qquad (2)$$
$$= \Phi_0^S + f_S \cdot t$$

where $\Phi_0^S$ is an initial phase value, $f_S$ is the satellite carrier frequency, and t is the satellite's time. Because the satellite carrier frequency is generated from a very precise time base, we may assume that $f_S$ is a constant and not time dependent, and we may replace the above integral with $f_S \cdot t$, as we have shown in the second line in the above equation. The phase of his signal when it reaches the receiver's antenna over the range distance D(t) is denoted as $\phi^S_A(t)$, and its value would be:

$$\varphi_A^S(t) = \varphi^S(t - D(t)/c - \tau_{ATM}(t)) \qquad (3)$$
$$= \Phi_0^S + f_S \cdot (t - D(t)/c - \tau_{ATM}(t))$$
$$= \Phi_0^S + f_S \cdot t - f_S \cdot D(t)/c - f_S \cdot \tau_{ATM}(t),$$

where c is the speed of light, and where $\tau_{ATM}(t)$ is a delay due to anomalous atmospheric effects which occur mostly in the upper atmosphere. The number of cycles $f_S \cdot \tau_{ATM}(t)$ due to the atmospheric effects cannot be predicted or determined to within an accuracy of 1 carrier cycle by a stand-alone receiver (i.e., cannot be determined by absolute positioning). Therefore, one cannot reach the full potential accuracy of the carrier frequency in a stand-alone receiver configuration. However, the carrier phase can be very useful in a differential GPS mode where the phase of the satellite is measured at a rover station and a base station. $\phi^S_{A,R}(t)$ and $\phi^S_{A,B}(t)$ respectively, and then subtracted from one another. Over the short baseline between the rover and base stations, the atmospheric delay $\tau_{ATM}(t)$ in both of these phases is equal for practical purposes, and the difference in phases is:

$$\phi^S_{A,R}(t) - \phi^S_{A,B}(t) = f_S \cdot D_R(t)/c - f_S \cdot D_B(t)/c. \qquad (4)$$

Notice that the terms $\Phi_0^S$ and $f_S \cdot t$ have also been cancelled from the difference. Presuming that the wave fronts of the satellite carrier signal are nearly planar by the time then reach the base and rover stations (because the satellites are at least 22.5 km away), and assuming that a wave front of the satellite carrier reaches one of the antennas first (either rover or base), the above difference is the number of additional wave fronts that the satellite carrier must travel before it reaches the second antenna (either base or rover). Given the angle between the base-rover baseline vector and the line-of-sight vector to the satellite from either of the stations. one can determine by trigonometry the number of carrier cycles that would lie along the baseline.

However, the task of measuring carrier phase is not as easy at it appears. In practice. we must use non-ideal receivers to measure the phases $\phi^S_{A,R}(t)$ and $\phi^S_{A,B}(t)$, with each receiver having a different clock offset with respect to the GPS time, and with each receiver having phase errors occurring during the measurement process. In addition, at the present time, it is not practical to individually count the carrier cycles as they are received by the receiver's antenna since the frequency of the carrier signal is over 1 GHz. However, the PLL loop can easily track the Doppler-shift frequency $f_D$ of the carrier signal, which is in the kHz range. With a few assumptions, the phases $\phi^S_{A,R}(t)$ and $\phi^S_{A,B}(t)$ can be related to their respective Doppler-shift frequencies. As is known in the art, the satellite transmits at a fixed frequency of $f_S$, but the relative motion between the satellite and receiver causes the frequency seen by the receiver to be slightly shifted from the value of $f_S$ by the Doppler frequency $f_D$. We may write the frequency seen by the receiver's antenna as $f_S + f_D$, where $f_D$ has a positive value when the distance between the satellite and receiver's antenna is shrinking, and a negative value when the distance is increasing. Each receiver can then assume that the received phase is proportional to the predictable amount $f_S \cdot t$, minus the amount $f_D \cdot t$ due to the Doppler-shift. The Doppler amount $f_D \cdot t$ is subtracted from $f_S \cdot t$ because the Doppler frequency increases as the distance between the satellite and receiver's antenna decreases. The predictable amount $f_S \cdot t$ will be the same for each receiver, but the Doppler frequencies will usually be different.

As previously mentioned, the reference oscillator (e.g., NCO) of the PLL circuit tracks the frequency of a selected one of the down-converted satellite signals. As a result, it inherently tracks the Doppler-shift frequency of the satellite's carrier signal. Before being provided to the PLL circuit, the carrier signal is down-converted from the GHz range by a local oscillator having a frequency $f_L$. The frequency seen by the PLL circuit is $(f_S + f_D) - f_L$, which can be rearranged as: $(f_S - f_L) + f_D$. The quantity $(f_S - f_L)$ is known as the pedestal frequency $f_p$, which is typically around 10 MHz to 20 MHz. The PLL's reference oscillator tracks the down-converted frequency of $f_p + f_D$. We would like to integrate the frequency of the reference oscillator to obtain a phase observable which is proportional to $-f_D \cdot t$. Starting at a time moment $T_p$ when the PLL circuit initially locks onto the down-converted satellite signal, with the time moment $T_p$ being measured by the receiver's clock, we will generate a phase observable $\phi_i(T_i)$ at discrete time moments $T_i$ of the receiver's clock T as follows:

$$\phi_i(T_i) = f_{p,nom} \cdot (T_i - T_p) - \phi_{iNCO}(T_i) \qquad (5)$$

where $f_{p,nom}$ is the nominal value of the pedestal frequency, and where $\phi_{iNCO}(T_i)$ is the phase (integrated frequency) of the PLL's reference oscillator (e.g., NCO). The time moments $T_i$ are spaced apart from each other by a time interval $\Delta T_i$, as measured by the receiver's clock, and may be express as $T_i = i \cdot \Delta T_i$, where i is an integer. $\phi_i(T_i)$ is in units of cycles, and is proportional to the negative of the integrated Doppler-shift frequency. This is because $\phi_{iNCO}(T_i)$ is proportional to the quantity $(f_p + f_D) \cdot (T_i - T_p)$.

We will now like to relate the change in phase of the satellite signal $\phi_{iNCO}(t_i)$ as received by the receiver's antenna to the change in phase of $\phi_{iNCO}(T_i)$, but neglecting the atmospheric delay $\tau_{ATM}(t_i)$ since this delay will be canceled out when we take the difference between receivers. To do this, let use assume a hypothetical situation where the satellite is not in orbit, but is placed adjacent to the receiver's antenna with zero distance between them. We will first account for the time offsets between the clocks of the receiver and satellite, and then we will separate the satellite from the receiver and move it into its orbit. Finally, we will account for the phase shifts in the down-conversion and PLL circuits of the receiver. Without loss of generality, we will assume that the satellite time clock t and the receiver time clock T are nearly the same, but that there is a time-dependent offset $\tau$ between them. At discrete time moments $T_i$ of the receiver clock, the two clocks may be related as follows: $T_i = t_i + \tau_i$, with it being understood that $\tau_i$ varies with time. The hypothetical satellite signal at the receiver's antenna (with zero distance) is:

$$\phi^S(t_i) = \Phi_0^S + f_S \cdot t_i. \qquad (6)$$

Now, let us create a reference phase in the receiver which is of the form:

$$\phi^R(T_i) = \Phi_0^S + f_S \cdot T_i, \qquad (7)$$

where we start the reference phase at time $t_i = 0$ with $T_i = 0$, and where $\Phi_0^S$ and $f_S$ will be taken as fixed, known constants. At $t_i = 0$, the offset $\tau_i$ will be zero, but can be a non-zero value for $T_i > 0$ due to the frequency and phase instability of the receiver's main oscillator which is used to generate the receiver's time moments $T_i$. As a practical matter, we will have to measure the Doppler phase observable $\phi_i(T_i)$ against the receiver's reference phase $\phi^R(T_i)$, and we therefore need to correct $\phi^R(T_i)$ for the effects time offset $\tau_i$. If the satellite and receiver time clocks are exactly the same ($\tau_i = 0$), the receiver's reference phase $\phi^R(T_i)$ will measure out the same amount of phase at its time $T_i$ as the satellite has provided by its time $t_i$. However, if the receiver clock is advanced in time by an amount $\tau_i > 0$, the reference phase has counted out $f_S \cdot \tau_i$ cycles more than actually transmitted by the satellite. To correct this, we need to subtract $f_S \cdot \tau_i$ from $\phi^R(T_i)$ to get the actual number of cycles transmitted by the satellite in the time span measured by the receiver's clock. The corrected phase reflects the satellite phase as received at the receiver's antenna, and we denote is as $\phi^S_A(T_i)$:

$$\phi^S_A(T_i) = \Phi_0^S + f_S \cdot T_i - f_S \cdot \tau_i. \tag{8}$$

Now, let us move the satellite to its normal orbital position, which will be a distance $D_i$ away from the receiver. As we do this, the phase seen by the receiver antenna decreases by the number of carrier cycles which spans the distance between the receiver and the satellite. When we reach the final distance $D_i$, the number of carrier cycles occurring over the distance is $f_S \cdot D_i/c$, where c is the speed of light. The satellite phase seen by the receiver's antenna is then:

$$\phi^S_A(T_i) = \Phi_0^S + f_S \cdot t_i - f_S \cdot D_i/c - f_S \cdot \tau_i. \tag{9}$$

The signal received by the antenna is down-converted with a local oscillator, which has a phase of:

$$\phi_{LO}(T_i) = \Phi_{LO} + f_{L,nom} \cdot T_i = \Phi_{LO} + (f_S - f_{L,nom}) \cdot T_i, \tag{10}$$

where $f_{L,nom}$ is the nominal frequency of $f_L$, and where the nominal frequency $f_{L,nom}$ is related to the nominal pedestal frequency $f_{p,nom}$ as follows: $f_{p,nom} = f_S - f_{L,nom}$. The down-converted signal is provided to the input of the PLL, and we will denote its phase as $\phi^S_B(T_i)$. The down-conversion process effectively causes the phase $\phi^S_B(T_i)$ to be equal to the difference of $\phi^S_A(t_i)$ and $\phi_{LO}(T_i)$ as follows:

$$\begin{aligned}\varphi^S_B(T_i) &= \varphi^S_A(t_i) - \varphi_{LO}(T_i) \\ &= (\Phi_0^S + f_S \cdot T_i - f_S \cdot D_i/c - f_S \cdot \tau_i) - (\Phi_{LO} + (f_S - f_{L,nom}) \cdot T_i) \\ &= \Phi_0^S - f_S \cdot D_i/c - f_S \cdot \tau_i - \Phi_{LO} + f_{p,nom} \cdot T_i \end{aligned} \tag{11}$$

Because the PLL circuit does not know which carrier cycle it first locks onto, the PLL phase $\phi_{iNCO}(T_i)$ tracks $\phi^S_B(T_i)$ to within an unknown integer number $N_{nco}$ of carrier cycles, which may have a positive or negative value. There is also a small tracking error $\zeta_{\phi i}$ due to the operation of the PLL circuit. Taking these two factors into account, we may write:

$$\begin{aligned}\varphi_{iNCO}(T_i) &= \varphi^S_B(T_i) + N_{nco} + \zeta_{\varphi i} \\ &= [\Phi_0^S - f_S \cdot D_i/c - f_S \cdot \tau_i - \Phi_{LO} + f_{p,nom} \cdot T_i] + N_{nco} + \zeta_{\varphi i}\end{aligned} \tag{12}$$

We have thus related the change in phase of the satellite signal $\phi^S_A(t_i)$ as received by the antenna to the change in phase of $\phi_{iNCO}(T_i)$. The above equation shows that the offset in clocks has an effect of $-f_S \cdot \tau_i$, and the distance has an effect of $-f_S \cdot D_i/c$. Our phase observable $\phi_i(T_i) = f_{p,nom} \cdot (T_i - T_p) - \phi_{iNCO}(T_i)$ can now be written out as:

$$\phi_i(T_i) = f_S \cdot D_i/c + f_S \cdot \tau_i - f_{p,nom} \cdot T_p - \Phi_0^S + \Phi_{LO} - N_{nco} - \zeta_{\phi i} \tag{13}$$

Using the relation $f_{p,nom} = f_S - f_{L,nom}$ we may further rewrite this as:

$$\phi_i(T_i) = f_S \cdot D_i/c + f_S \cdot (\tau_i - T_p) + (\phi'_0 - \Phi_0^S) - N_{nco} - \zeta_{\phi i} \tag{14}$$

where $\phi' = \Phi_{LO} + f_{L,nom} \cdot T_p$. As it turns out, if we chose the time increments $\Delta T_i$ for $T_i(T_i = i \cdot \Delta T_i)$ to be equal to $\Delta T_i = 2$ ms, the term $-f_S \cdot T_p$ is an integer number which can be consolidated with the integer ambiguity $-N_{nco}$ into a single ambiguity $+N$.

$$\phi_i(T_i) = f_S \cdot D_i/c + f_S \cdot \tau_i + (\phi'_0 - \Phi_0^S) + N - \zeta_{\phi i} \tag{15}$$

Thus, our Doppler phase observable $\phi_i(T_i)$ has been related to the distance $D_i$ between the satellite and receiver, the time offset $\tau_i$ of the receiver, an integer ambiguity N, and some initial phase offsets ($\phi'_0 - \Phi_0^S$) which can be readily determined.

We will now write equation (15) for the base and rover stations, adding superscripts "B" and "R" for the base and rover stations, and subscript "m" to indicate the m-th satellite signal and the m-th tracking channel.

$$\phi_{i,m}^B(T_i) = f_S \cdot D_{i,m}^B/c + f_S \cdot \tau_i^B + (\phi'_0^B - \Phi_0^S) + N_m^B - \zeta_{\phi i,m}^B \tag{16A}$$

$$\phi_{i,m}^R(T_i) = f_S \cdot D_{i,m}^R/c + f_S \cdot \tau_i^R + (\phi'_0^R - \Phi_0^S) + N_m^R - \zeta_{\phi i,m}^R \tag{16B}$$

For the differential navigation mode, the difference of these phases is formed:

$$\begin{aligned}\phi_{i,m}^B(T_i) - \phi_{i,m}^R(T_i) &= f_S \cdot D_{i,m}^B/c - f_S \cdot D_{i,m}^R/c + f_S \cdot (\tau_i^B - \tau_i^R) + (N_m^B - N_m^R) + \\ &(\phi'_0^B - \phi'_0^R) - (\zeta_{\phi i,m}^B - \zeta_{\phi i,m}^R)\end{aligned} \tag{17}$$

Using $N^m = (N_m^B - N_m^R)$ to represent the difference between the ambiguities, and using the well-known relationship $f_S/c = 1/\lambda_m$, where $\lambda_m$ is the wavelength of the satellite carrier signal. we have:

$$\begin{aligned}\phi_{i,m}^B(T_i) - \phi_{i,m}^R(T_i) &= (1/\lambda_m) \cdot (D_{i,m}^B - D_{i,m}^R) + f_S \cdot (\tau_i^B - \tau_i^R) + N^m + (\phi'_0^B - \\ &\phi'_0^R) - (\zeta_{\phi i,m}^B - \zeta_{i,m}^R)\end{aligned} \tag{18}$$

The values for $\phi'_0^B$ and $\phi'_0^R$ can be readily determined. The values of $\zeta_{\phi i,m}^B$ and $\zeta_{\phi i,m}^R$ cannot be determined, but they have zero mean values.

Our Inventions Relating to Differential Navigation.

Real time processing (RTP) in the differential navigation mode determines the baseline vector using the results of the pseudo-range and full phase measurements front satellites of the GPS and/or GLN systems. In a real time processing application, the computation of the baseline vector is made in the rover equipment that receives pseudo-range and full phase measurements obtained in the base equipment through the communication link.

The RTP methods and apparatuses include four main units: the extrapolating unit for the base measurements, the cycle slip detection and correction unit, the ambiguity resolution unit, and the unit of computation of the baseline vector. In addition to these main units there are several auxiliary units that generate vectors and matrices for the operation of the main units.

The present application discloses three inventions for the first three of the four main units, respectively, which enables one to improve the quality of the operation of the first three units. The accuracy and reliability of the baseline determination, especially under conditions where the rover is moving, is improve as a result. While our three inventions are preferably used together, they may be used separately.

In the previous tutorial discussion, we used the symbol "$t_i$" to indicate the time as measured by the GPS system clock, and the symbol "$T_i$" to indicate the time as measured by either of the base and rover receivers ("$T_i$" is not to be confused with a time interval "$T_I$" provided below). While the time $T_i$(rover) as measured by rover clock will deviate from the true GPS system time $t_i$ of the satellites, the navigation unit in the rover typically corrects the rover's time so its difference with the true GPS time is substantially less than any of the processing time intervals used in extrapolation unit, the cycle-slip detection unit, the and ambiguity resolution unit. This may also be said of the time $T_i$(base) as measured by the base station. This is the conventional practice in the GPS are, and we will adopt this convention in th discussion of our invention. Thus, while the base and rover times may have small offsets from the true GPS time, they are still referring to the same processing time moment, and in some cases we can (and will for convenience) interchange the time $t_i$ with either of times $T_i$(rover) and $T_i$(base) in many of the equations where the time offsets $\tau_i^B$ and $\tau_i^R$ have been introduced and accounted for. This will be the case for most of the equations that follows.

A. The Extrapolating Unit for Base Measurements

In the differential navigation mode of operation, both of the Base and Rover receivers generate navigation parameters at specific moments $T_M$ of time, and each receiver organizes its navigation parameters for each time moment into a data frame which contains the navigation parameters along, with the value of the time moment. In real-time processing (RTP) of differential navigation, the frames of the Base station are transmitted serially to the Rover station over a communication link, and a processing unit at the Rover station takes the information in the Base frames and processes it with the data frames of the Rover to compute the baseline between the Base and Rover stations. Additional information, such as the signal quality of the communication link between the Base and Rover stations, can be added to each frame of the Base receiver. The baseline can also be computed in a post-processing mode instead of a real-time mode. In this case, the frames from both of the Base and Rover stations are recorded and then used at a later time at any location.

The extrapolating unit is necessary in the cases when the base-rover communication link has a limited carrying capacity (i.e., limited bandwidth, or data rate) and, as a consequence, has a limited speed of transmission. As a result, the sequential series of frames containing information and navigation parameters measured in the Base receiver arrive at the Rover equipment with an interval $\Delta T_k$ between frames which substantially exceeds the time intervals at which the main units need to received the information from the Base receiver in order to perform real-time processing (RTP) in the differential navigation mode at the desired rate.

The purpose of the extrapolating unit is to use the information parameters from the Base receiver which have been received in previous data frames and to generated extrapolated values for the navigation parameters from time moments which are between the time moment of the last fully-received Base frame and the time moment of the next fully-received Base frame. The extrapolated values are generated periodically at shorter time intervals $T_l$ required by the desired rate of RTP processing. Because the shorter interval $T_l$ is associated with processing the navigation parameters, such as in the baseline computation or the ambiguity resolution, we call it the processing time interval $T_l$. The value of interval $T_l$ is often different for each processing task.

General principles of extrapolation are well known to the art. Yet in the case under consideration one has to take into account some specific problems. First of all, it is necessary to take into account that the base-rover communication link often operates in an environment where there are strong additive and modulating interference signals. As a result, the conditions arise for the reception to be blocked or corrupted for limited intervals of time. Such intervals are usually detected in the receiver channel of the connection link by measuring signal-to-noise ratio and determining when it is below an admissible threshold. Other ways of detecting errors in the transmitted information parameters, such as those based upon the use of special codes and checksum codes, may also be used.

As a second problem, the measurements of navigation parameters in some channels of the base receiver may also turn out to be missing or inaccurate during some time intervals. This may happen, for example, if a local object near, the Base station directs a strong reflected signal to the antenna of the Base receiver or if the object blocks the direct satellite signal from the antenna.

Indicators of Interference Events and the Generation of Alarm Signals in Navigation Receivers Interference events, such as interference signals and blockages of signal reception by intervening objects, can cause inaccurate and inauthentic measurements of the navigation parameters. Indicators of interference events can help prevent the use of inaccurate and inauthentic measurements. Such an indicator may comprise, for example, an "amplitude indicator" which measures the signal-to-noise ratio in a satellite channel. An interference indicator may also comprise an "Angle indicator", which indicates the presence of large peaks in the output Ep of a PLL discriminator.

An exemplary amplitude indicator for the m-th tracking channel may use the in-phase and quadrature phase correlation signals, denoted herein as $I_m(i \cdot \Delta T_A)$ and $Q_m(i \cdot \Delta T_A)$, respectively, to generate a first indicator signal $G1_m$ as $$G1_m(i \cdot \Delta T_A) = Z_m^2 = I_m^2(i \cdot \Delta T_A) + Q_m^2(i \cdot \Delta T_A), \tag{19}$$

where $Z_m$ is proportional to the signal strength of the m-th satellite carrier being tracked by m-th the channel, and where both $G1_m$ and $Z_m^2$ are proportional to the signal's power level. Signal $G1_m$ may be generated as $G1_m = Z_m$ instead of $G1_m = Z_m^2$. These forms are suitable for both coherent and incoherent channels. If the value of indicator signal $G1_m$ falls below a preset threshold value $Th^1$, an alarm signal $S1_m$ is generated to indicate that the output phase of the PLL circuit is unreliable and may be inaccurate. Here, we will take a value of $S1_m = 1$ to indicate that signal $G1_m$ is above $Th^1$ and that the phase of the PLL circuit is probably accurate (alarm in inactive state); and a value of $S1_m = 0$ to indicate that signal $G1_m$ is below $Th_1$ and the phase of PLL circuit is unreliable (alarm in active state). Of course, the reverse assignment of the 0 and 1 values may be chosen.

An exemplary angle indicator may use the output Ep of the PLL discriminator of the m-th tracking channel to generate signal $G1_m = \text{abs}(Ep_m)$, where abs(*) is the absolute value function. In this case, $Ep_m$ is preferably generated as $Ep_m = \arctan[Q_m(i \cdot \Delta T_A)/I_m(i \cdot \Delta T_A)]$, or as $Ep_m = Q_m(i \cdot \Delta T_A)/I_m(i \cdot \Delta T_A)$. In this case, if the value of $G1_m$ rises above a preset threshold value $Th_1$, the alarm signal $S1_m$ is generate in its active state as $S1_m = 0$ to indicate that the output phase of the PLL circuit is unreliable and may be inaccurate (otherwise it is generated in its inactive state as $S1_m = 1$).

Another exemplary indicator, which is suitable for coherent channels, generates indicator signal $G1_m$ as:

$$G1_m(i \cdot \Delta T_A) = I_m^2(i \cdot \Delta T_A) - Q_m^2(i \cdot \Delta T_A), \tag{20}$$

which provides an indicator signal which is related to the signal power level of the satellite input signal, and also to the PLL's tracking phase error. This form of signal $G1_m$ can determine the loss of tracking in the situation when the satellite's signal power level is within acceptable limits but the difference between frequencies of the satellite carrier signal and the PLL reference carrier signal is greater than an acceptable value. If the value of signal $G1_m$ falls below a preset threshold value $Th_1$, alarm signal $S1_m$ is generated in its active state as $S1_m = 0$ to indicate that the output phase of the PLL circuit is unreliable and may be inaccurate (otherwise it is generated in its inactive state as $S1_m = 1$).

Indicator signal $G1_m$ and alarm signal $S1_m$ may be generated at the end of each accumulation period of the channel's correlators. Typical accumulation period are 2 ms and 5 ms. Other forms for signal $G1_m$ are also possible, and a combination of different forms may be used depending on the conditions of the receiver operation.

Indicator signal $G1_m$ and alarm signal $S1_m$ are based upon the most recent values of the correlation signals $I_m^2(i \cdot \Delta T_A)$ and $Q_m^2(i \cdot \Delta T_A)$ at time $i \cdot \Delta T_A$, and are not based on previous values of these signals. Therefore, we refer to these signals as being "inertia free", or "non-inertial." A second type of the indicator and alarm signals uses past values of the correlation signals as well present values. Such a second type of indicator signal $G2_m$ may be generated from a running average of the first indicator signal $G1_m$, or from an un-weighted average of signal $G1_m$ over a span of several accumulation periods, or from a weighted average of signal $G1_m$ over a span of several accumulation periods. Because of its inertia. indicator signal $G2_m$ is more smooth over time than the first type of indicator signal $G1_m$, and is less prone to the influences of noise. However, it is slower than signal $G1_m$ at detecting shadowing events. An example of a running average for indicator signal $G2_m$ is as follows:

$$G2_m(i \cdot \Delta T_A) = \alpha \cdot G1_m(i \cdot \Delta T_A) + (1-\alpha) \cdot G2_m((i-1) \cdot \Delta T_A), \quad (21)$$

where "$i \cdot \Delta T_A$" represent the end of the current accumulation period. "$(i-1) \cdot \Delta T_A$" represent the end of the previous period, where $G1_m(i \cdot \Delta T_A)$ is the most recent value of $G1_m$ at the end of the most recent accumulation period, where $G2_m(i \cdot \Delta T_A)$ is the most recent value of signal $G2_m$, where $G2_m((i-1) \cdot \Delta T_A)$ is the previous value of signal $G2_m$, and where $\alpha$ is a weight coefficient between 0 and 1. Previous values of signal $G1_m$ are effectively accounted for by the term $(1-\alpha) \cdot G2_m((i-1) \cdot \Delta T_A)$ in the above expression. An example of an un-weight average is where signal $G2_m$ is generated as the average of the proceeding N values of signal $G1_m$:

$$G2_m(i \cdot \Delta T_A) = (1/N) \cdot \sum_{k=0}^{k=N-1} G1_m((i-k) \cdot \Delta T_A). \quad (22)$$

In this example, signal $G2_m$ is generated after N accumulation periods and at time moments $i \cdot \Delta T_A$. However, this rate of generating signal $G2_m$ is usually higher than is typically needed. and one usually generates signal $G2_m$ once every N accumulation periods: $N \cdot \Delta T_A$. An example of a weighted average for generating signal $G2_m$ is as follows:

$$G2_m(i \cdot \Delta T_A) = \sum_{k=0}^{k=N-1} \beta_k \cdot G1_m((i-k) \cdot \Delta T_A). \quad (23)$$

where $\beta_k$ are weight coefficients which sum to a value of 1. In each of the above examples, signal $G2_m$ is slower acting than signal $G1_m$, but has less noise. We call the second-type signal $G2_m$ an "inertial signal."

A second alarm signal S2 is generated from the inertia signal $G2_m$ in the sane a that the first alarm signal S1 is generated from the inertia signal $G1_m$. If the inertia-free indicator signal $G1_m$ is generated from an amplitude indicator for the m-th tracking channel, then the inertial alarm signal $S2_m$ is generate in its active state when the inertial indicator signal $G2_m$ falls below a second preset threshold value $Th_2$ to indicate that the output phase of the PLL circuit is unreliable and may be inaccurate. Here, we will take a value of $S2_m=1$ to indicate that signal $G2_m$ is above $Th_2$ and that the phase of the PLL circuit is probably accurate (inactive state); and a value of $S2_m=0$ to indicate that signal $G2_m$ is below $Th_2$ and the phase of PLL circuit is unreliable (active state). Of course, the reverse assignment of the 0 and 1 values may be chosen. Likewise, if the inertia-free indicator signal $G1_m$ is generated from the expression $G1_m(i \cdot \Delta T_A) = I_m^2(i \cdot \Delta T_A) - Q_m^2(i \cdot \Delta T_A)$, the inertial alarm signal $S2_m$ is also generate in its active state when the inertial indicator signal $G2_m$ falls below a second preset threshold value $Th_2$. If signal $G1_m$ is generated from an angle indicator for the m-th tracking channel, such as $G1_m = abs(Ep_m)$, then the alarm signal $S2_m$ is generated in its active state as $S2_m=0$ when the value of $G2_m$ rises above threshold value $Th_2$ to indicate that the output phase of the PLL circuit is unreliable and may be inaccurate (otherwise it is generated in its inactive state as $S2_m=1$).

For reliable implementations of differential navigation, one or both of the indicator signals $G1_m$ and $G2_m$ and their corresponding alarm signals $S1_m$ and $S2_m$ are preferably generated for each of the visible satellite signals at both the base and rover receivers, and the alarm signals are used to discard measured navigation parameters which may be unreliable. Herein, the alarm signal are denoted with a superscript "B" for the base receiver ($S1_m^B$ and $S2_m^B$), and with the superscript "R" for the rover receiver ($S1_m^R$ and $S2_m^R$). Because the rover receiver is in an environment which has more complicated electromagnetic interference than the base receiver, the alarm signals in the rover will be generated more frequently than the alarm signals in the base receiver.

As we indicated in the Summary of Invention section, some embodiments of our inventions use receivers which employ joint tracking loops (our co-pending patent application Ser. No. 09/330,221, now U.S. Pat. No. 6,313,789). These loops, which are separate from the individual PPL circuits, are for jointly tracking changes to the satellite carrier phases which are caused by comment events. In a typical embodiment, there are three common loops for tracking changes in the position coordinates of the receiver s antenna, one loop for each coordinate, and there is one common loop for tracking the drift in the receiver's time clock. The four common tracking loops use the PLL phase discriminator signals $Ep_m$ as inputs, and generate output correction signals for the individual PLL circuits which correct the phases of PLLs' reference carrier signals to account for changes that are caused by the common events. If a satellite signal is blocked from the receiver's antenna, the phase discriminator signal Ep from the channel tracking that signal will become unreliable and should not be used for the common loops. In a preferred implementation, alarm signal $S1_m$ and $S2_m$ are generated for each tracking channel, and discriminator signal $Ep_m$ is disconnected from the input of the common loops when the inertia-free alarm signal $S1_m$ indicates that the phase of the PLL circuit is unreliable or may be inaccurate because the satellite signal has weakened or has been blocked. However, the common correction signal from the common loops to the affected PLL circuit remains connected to the PLL circuit since it can still provide the affected PLL circuit with valid corrections for the common events, with the corrections being determined by the good satellite signals. If the inertia alarm signal $S2_m$ is also generated, the discriminator signal $Ep_m$ is disconnected from the PLL loop filter, and the phase of the reference carrier signals of the PLL circuit is adjusted by the correction signal from the common loops until both alarm signals change to indicate that the satellite signal has strengthened or re-appeared.

Exemplary Composition of the Information Parameters of a Base Frame

The following values are among information parameters which are transmitted through the communication link from the base receiver to the rover receiver for each m-th satellite channel at each k-th frame:

the full phase $\phi^B_{k,m}$ (preferably in cycles, 1 cycle=$2\pi$ radians) of the m-th satellite carrier signal as measured in the base receiver, such as expressed by equation (5) above;

the pseudorange $\gamma^B_{k,m}$ (preferably in meters) between the m-th satellite and the Base receiver as measured in the base receiver;

the time moment $t_k$ (in seconds) for the measurements of $\phi^B_{k,m}$ and $\gamma^B_{k,m}$ with the time $t_k$ being the GPS time as measured by the base receiver's clock.

a weight coefficient $K^B_{k,m}$ representative of the estimated quality of the measured values of $\phi^B_{k,m}$ and $\gamma^B_{k,m}$.

The full phase $\phi^B_{k,m}$ may be constructed in the form provided by equation (5):

$$\phi^B_{k,m}(T_i) = f_{p,nom} \cdot (T_i - T_p) - \Phi_{i,m,NCO}(T_i),$$

or may be constructed in the form which includes the phase offsets of the base receiver:

$$\phi^B_{k,m}(T_i) = [f_{p,nom} \cdot (T_i - T_p) - \Phi_{i,m,NCO}(T_i)] - \Phi'_0.$$

In either case, we will use the convention practice and have the base receiver correct its clock so that the base time $T_i$ will be equivalent to the GPS time $t_k$ for the purposes of implementing our inventions (the time offset has already been accounted for in the above equations). For all practical purposes, times $T_i$ and $t_k$ will refer to the same processing time increment, and can be interchanged in the above equations.

The weight coefficient $K^B_{k,m}$ is set equal to zero if any of the alarm signals $S1^B_m$ and $S2^B_m$ in the m-th channel of the base receiver are generated in their active state (0) during the k-th frame; otherwise, the value of $K^B_{k,m}$ is made proportional to the signal-to-noise ratio in the m-th tracking channel. For example, the weight coefficient may be set as $K^B_{k,m} = Z_{k,m}^2$ if both of the alarm signals $S1^B_m$ and $S2^B_m$ are equal to 1. As a further approach, it is often useful to take into account that signals from satellites situated at low angles of elevation with respect to the receiver antenna usually have lower accuracy because these low-elevation signals are more likely to reflect off of objects near the antenna and generate multipath signals which interfere with the reception of the signal itself. In this case, the elevation angle of the m-th satellite signal may be denoted as $\xi^B_{k,m}$, and it may be measured against a minimum elevation angle $\xi^B_{min}$ at which the signal becomes visible at the base station. The weight coefficient may be generated in the form:

$$K^B_{k,m} = Z_{k,m}^2 \cdot \sin(\xi^B_{k,m} - \xi^B_{min}) \quad (24)$$

when $\xi^B_{k,m} > \xi^B_{min}$ and the alarm signals $S1^B_m$ and $S2^B_m$ are not generated in an active state (e.g., $S1^B_m \neq 0$ and $S2^B_m \neq 0$). If either of the alarm signals is generated in an active state, or if $\xi^B_{k,m} < \xi^B_{min}$, the weight coefficient is generated as $K^B_{k,m} = 0$.

Other expressions for the determination of $K^B_{k,m}$ are possible too.

The Procedure of the Extrapolation Unit Operation

The information parameters from several (Mr) successive frames (k=1,2 ... Mr) for each satellite channel, as received by the base receiver, are written to a memory unit 110 (e.g., a register bank) of an extrapolating unit 100. The organization of the memory unit for the parameters ($\phi^B_{k,m}$, $\gamma^B_{k,m}$, $t_k$, and $K^B_{k,m}$) for one satellite is shown in FIG. 1. If the differential navigation task is performed in real time, then these parameters are transmitted over the communication link between the base and rover stations, with the extrapolating unit being located at the rover station. In this case, the following two characteristics of the communication link, as measured during each frame, are preferably also stored in the memory unit: the signal-to-noise ratio $snr_k$ in the communication link and a bit flag $v_k$ indicating that the data has been corrupted in transmission over the link, and/or cannot be repaired ($v_k=0$ or $v_k=1$). The generation of the value of $v_k$ is preformed by an assessment unit 140 described below in greater detail. The above-described stored values are used for the computation of the extrapolating function parameters by a processing unit 160, which are also described in greater detail below. When a new frame is received, the oldest frame is discarded from the memory unit to make room for the new frame. The frames are received by a receiving unit 120, which provides the data (after optional decoding) to memory 110 and assessment unit 140. The signal-to noise ratio of the communication link is monitored by monitoring unit 130, which provides an output signal for each frame to memory unity 110 and assessment unit 140. Assessment unit 140 uses this signal to determine whether the frame is satisfactory.

In a preferred implementation, the navigation parameters are encoded by an error-correcting method before being transmitted over the communication link by the base station. In the rover receiver, the encoded parameters are decoded by a decoding method in receiving unit 120 which can detect errors in the parameters caused by the transmission, and can correct many, but not all, of the errors. If receiving unit 120 finds errors that it cannot correct, it sends a corresponding signal to assessment unit 140. There are several well-know error-correcting encoding methods, and descriptions thereof are not needed for one of ordinary skill in the art to make and use the present inventions. These methods are modified to cause assessment unit 140 to set the value of $v_k$ to zero ($v_k=0$) when the encoded parameters have errors which cannot be corrected ($v_k$ in active state), and to set the value of $v_k$ to one ($v_k=1$) when the encoded parameters have no errors or have errors which have been corrected by the decoding method ($v_k$ in inactive state). (Of course, the reverse assignment of one and zero values may be used.) A more simple approach for transmitting the navigation parameters is to add a checksum word to each frame, or to each sub-frame (a sub-frame may comprise just the navigation parameters of one satellite or the parameters of a small number of satellites). The value of each checksum word is chosen such that sum of it and all the digital words in its frame or sub-frame forms a predetermined value in the least significant bits of the total. At the rover receiver, the digital words of each frame or sub-frame (including the checksum) are summed together and the least significant bits are tested to see if they match the predetermined number. If they do, the navigation parameters in the frame or sub-frame are assumed to be good, and the value of $v_k$ is set to one ($v_k=1$). If not, the values are assumed to be bad and the value of $v_k$ is set to zero ($v_k=0$). The checksum method can only detect errors in the transmitted data, and cannot correct them. An even simpler approach, but less reliable method, is to judge the reliability of the transmitted parameters only from the measured signal-to-noise ratio ($snr_k$) of the communication link. This ratio may be measured by monitoring unit 130 during the transmission of each frame by any number of well-known techniques. In this case, the parameter $v_k$ would not be needed.

The purpose of the extrapolation unit is to extrapolate the full phase $\phi^B_{k,m}$ and pseudorange $\gamma^B_{k,m}$ of each satellite signal received by the base receiver to a time selected by the rover station. The inventors have found that the most suitable extrapolation approach. from the point of view of striking a balance between the extrapolation accuracy and complexity, is the choice of the extrapolating function in the form of a polynomial of degree $n_p$. In particular, for the degree $n_p=2$, such an extrapolating function is defined by three parameters, A, B, and C, and has the form: $At^2+Bt+C$. The storage capacity Mr for the stored frames needs to be sufficient to hold at least $n_p$ frames (Mr>$n_p$). Because Some of the transmitted frames may have bad data or may be corrupted during transmission, the number Mr of frames stored by the memory unit should be much larger than $n_p$. In practice, the number Mr of frames depends upon the time interval (duration) $\Delta T_k$ between frames and on the specific characteristics of the fluctuations of the phase (delay) in the satellite signal received by the base station. [There is a limited time period Tmax where a polynomial approximation is sufficiently accurate; periods longer than Tmax will lead to inadmissible errors. Therefore, we set Mr·$\Delta T_k$<Tmax. Thus if $\Delta T_k$ decreases, we should increase Mr, and vice versa. Increase of phase fluctuations decreases the value of Tmax; in this case, if $\Delta T_k$=constant, then Mr decreases. Thus, for $\Delta T_k$=1 second, it is reasonable to take Mr≦5.

A binary quality estimation (satisfactory/unsatisfactory) is made by assessment unit 140 for each frame and is stored in the memory unit. The frame quality is considered to be unsatisfactory if at least one of the following conditions is fulfilled:

the signal-to-noise ratio ($snr_k$) in the communication link during the reception of the k-th frame by the rover is lower than the allowed threshold (in particular, if the signal is missing);

an error is detected in a received digital word representing an information parameter which cannot be corrected by the decoding methods used in the communication link ($v_k$=0 is written to the memory unit);

a checksum error is detected in the frame (or sub-frame); or the weight coefficient of the frame is equal to zero ($K^B_{k,m}$=0 is stored in the memory unit).

Assessment unit 140 receives these signals from units 120 and 130.

While all of these conditions are tested in preferred embodiments, less preferred embodiments may test fewer of the conditions. Then a true group comprising $n_s$ satisfactory frames is selected from memory unit 110, by a discriminator unit 150, for each satellite parameter to be extrapolated. The true group must include the number of frames which is not less than the number of parameters in the extrapolating function ($n_s$>$n_p$). It is also important that the frames in the true group are in immediate sequential order. The extrapolating function parameters are determined from just the true group of frames. When extrapolating the full phase of a satellite signal, it is important that all the measured values $\phi^B_{k,m}$ in the true croup be referenced to the same steady balance point of the PLL, circuit (i.e., that there were no cycle slips occurring between the frames in the true group). Usually the beginning of a cycle slip will be detected by the indicator of the affected tracking channel in the base receiver, and marked as unsatisfactory by setting $K^B_{k,m}$=0 The subsequent frame may already be satisfactory. Yet it is impossible to use it for computation together with the preceding frames because the phase readings between these frames might be different by an integer number of half-cycles, and such a difference would lead to the erroneous computation of the extrapolating function parameters (e.g., A, B, and C). If Mr>3, then several groups of frames for each satellite parameter ($\phi^B_{k,m}$ and $\gamma^B_{k,m}$) may reside in the memory unit, each of which satisfies the conditions for usable data. In this case, it is necessary to choose one of these groups as the true one, it being better to choose the latest one (i.e., the group having data from the most recent frames). This will improve the extrapolation accuracy. The case is also possible when there is no group of frames in the memory unit which may be considered as the true one for any one of the parameters of the satellite signal. In this case, a signal "NO BASE MEASUREMENTS" ($S_m^B$=0) is generated if any one of the parameters of the m-th satellite signal has no group of usable frames, and the extrapolating function parameters (e.g., A, B, and C) for the parameters of the m-th satellite signal are not recalculated until the disappearance of this signal (i.e., until $S_m^B$=1), or if this condition continues for a long time, the measurements will be stopped and will be resumed only at the restoration of standard mode.

The extrapolating function parameters are computed from the selected group (as determined by discriminator unit 150) by the least-squares method, which is performed by processing unit 160. As is known in the art, the least-squares method uses a measurement vector to represent several measured values, at separate time moments, of navigation parameter which is being fitted by the polynomial model, a state vector A to represent the extrapolating function parameters to be found from the measured values of the navigation parameter, an observation matrix $H_e$ which relates the function parameters to the measured values according to the model, and optionally a covariance matrix $R_e$ which represents the reliability of the measured data values. In our case, for extrapolating one navigation parameter from one satellite (generally represented as the m-th satellite), the measurement vector includes the measured navigation parameters (either the phases $\phi^B_{k,m}$ or the pseudoranges $\gamma^B_{k,m}$) of the true group ($n_s$ components), and the state vector $A_e$ of the extrapolating function parameters includes ($n_p$+1) components. In the specific case when $n_p$=2, we have $$A_e = \begin{bmatrix} A \\ B \\ C \end{bmatrix}$$

The observation matrix $H_e$ in this case comprises the time of the measurement of the navigation parameters of the true group stored in the memory unit, and for the case $n_p$=2 is given as:

$$H_e = \begin{bmatrix} t_1^2 & t_1 & 1 \\ t_2^2 & t_2 & 1 \\ \vdots & \vdots & \vdots \\ t_k^2 & t_k & 1 \\ \vdots & \vdots & \vdots \\ t_{ns}^2 & t_{ns} & 1 \end{bmatrix}$$

The covariance measurement matrix $R_e$ is determined by the weight coefficients $K^B_{k,m}$ and is given in the form:

$$R_e = \begin{bmatrix} (K^B_{1,m})^{-1} & 0 & \cdots & 0 & \cdots & 0 \\ 0 & (K^B_{2,m})^{-1} & \cdots & 0 & \cdots & 0 \\ \vdots & \vdots & \ddots & 0 & \cdots & \vdots \\ 0 & 0 & \cdots & (K^B_{k,m})^{-1} & \cdots & 0 \\ \vdots & \vdots & \cdots & \vdots & \ddots & \vdots \\ 0 & 0 & \cdots & 0 & \cdots & (K^B_{ns,m})^{-1} \end{bmatrix}$$

According to the least-squares method, the extrapolation function parameters (in the $A_e$ vector) for fitting the phase of the m-th satellite are defined as follows:

$$A^\phi_e = (H_e^T \cdot R_e^{-1} \cdot H_e)^{-1} \cdot H_e^T \cdot R_e^{-1} \cdot \phi^B,$$

where $\phi^B$ is the vector of the $n_S$ full phase measurements of the m-th satellite in the true group: $\phi^B = (\phi^B_{1,m}, \phi^B_{2,m}, \ldots \phi^B_{k,m}, \ldots \phi^B_{n,ms})^T$. In a similar way, for pseudo-range measurements we have:

$$A^\gamma_e = (H_e^T \cdot R_e^{-1} \cdot H_e)^{-1} \cdot H_e^T \cdot R_e^{-1} \cdot \gamma^B,$$

where $\gamma^B$ is the vector of the $n_S$ pseudorange measurements of the m-th satellite in the true group: $\gamma^B = (\gamma^B_{1,m}, \gamma^B_{2,m}, \ldots \gamma^B_{k,m}, \ldots \gamma^B_{ns,m})^T$. (Here, and further on, the superscript "T" means the matrix transposition, and the superscript "−1" means the matrix inversion.) As we indicated above, the use of the covariance matrix $R_e$ is preferred but optional. If matrix $R_e$ is not used, then the identity matrix E is used in its place in the above equations (The identity matrix has ones for its diagonal elements, and zeros for its off-diagonal elements.) The above steps are performed by processing unit 160.

After the determination of the extrapolating function parameters, the extrapolation is performed by a generator unit 170 at the processing time intervals $T_I$ required by the desired rate of RTP processing. Unit 170 receives the extrapolating function parameters from processing unit 160. During the time interval $\Delta T_k$ between the last received frame and the next frame, the extrapolation may, for example, be done at time moments $t_i = i \cdot T_I$ for $i = 1, 2 \ldots I$, where $I = \Delta T_k / T_I$. In the particular case, having calculated three parameters, we may generate the extrapolation for the phase measurements as:

$$\phi^B(t_i) = A_\phi t_i^2 + B_\phi t_i + C_\phi, \text{ where } [A_\phi, B_\phi, C_\phi]^T = A^\phi_e.$$

and we may generate the extrapolation of the pseudo-range measurements as:

$$\gamma^B(t_i) = A_\gamma t_i^2 + B_\gamma t_i + C_\gamma, \text{ where } [A_\gamma, B_\gamma, C_\gamma]^T = A^\gamma_e.$$

When a new frame is received and stored in the register, all of the above steps are repeated by the units 120–170.

As indicated above, the extrapolation is made independently for each satellite channel. so the above steps are performed for the full phase and pseudorange of each satellite received by the Base receiver.

Through their work, the inventors have found that the following values are most suitable for use in navigation receivers of GPS and GLN systems:

A frame duration of $\Delta T_k = 1$ second; a number Mr of frames stored by the memory unit of Mr=5; the degree of the extrapolating polynomial of $n_p = 2$, correspondingly $n_s = 3$, 4 or 5 are possible. The processing time interval $T_I$ may be different for the solution of different tasks. Thus for the unit of detection and correction of cycle slips, which will be discussed next, a short processing time interval of $T_I = 5–10$ ms is used, coinciding with the clock time interval in tracking systems of the receiver. A longer processing time interval of $T_J = 0.05$ s–1.0 s may be needed for the ambiguity resolution unit and the unit of the baseline vector computation.

B. The Cycle Slip Detection and Correction Unit Characteristics and Symptoms of a Cycle Slip.

As described in the above tutorial section on the structure of coherent navigation receivers, a cycle slip is the process of a PLL circuit transitioning (or changing) from one point of steady balance to another point of steady balance (also called herein as a "steady balance point"). The cycle slip is characterized by two main parameters: the value (e.g., the number of cycles or sometimes half-cycles) and the duration of the cycle slip.

The value of a cycle slip is random, but is always equal to a multiple of the phase interval ($\alpha$) between two neighboring steady balance points of the PLL circuit. This interval depends upon the type of PLL circuit used. The typical value of $\alpha$ for receivers of navigation systems is $\alpha = 0.5$ cycles if the phase is measured in cycles, or $\alpha = \pi$ if the phase is measured in radians. In this case, the slip value may be equal to $\pm m/2$ cycles (where $m = 1, 2 \ldots$).

The duration of a cycle slip is also random. The minimum duration is determined by the time lag (i.e., sluggishness) of the PLL circuit, and the maximum duration depends upon the reason which caused the cycle slip, and it may reach several seconds.

A loss in PLL tracking, which is different from a cycle slip, can be viewed as a very long cycle slip if the PLL circuit does not need to undergo the re-acquisition process alter the PLL tracking loss has ended. In those cases where the re-acquisition process is used to reestablish PLL tracking, the initial loss in PLL tracking cannot be viewed as a cycle slip.

Sometimes it is possible to detect a cycle slip in an individual channel by observing the rate of change in the phase of the PLL's controlled oscillator (e.g., NCO), and noting, time intervals when this rate grows substantially. Yet such a detection is very unreliable, especially in the case of the rover receiver, as its velocity may change in a rather wide range.

The occurrence of a cycle slip is often connected with the shading (blockage) of the signal by a local object. At the disappearance of the signal, the feedback loop of the PLL circuit is usually opened, but the noise potential remaining on the PLL dynamic filter integrator continues to change the reference oscillator phase; and at the reappearance of the signal, the PLL may lock onto a new steady balance point. In this case, the duration of the cycle slip practically coincides with the duration of the blockage, and the cycle slip value is random and depends on the energetic potential and the characteristics of the PLL circuit. A cycle slip caused by a blockage is usually detected with sufficient reliability for all its duration by the amplitude and angle indicators of the affected channel, as we have described above. However, the situation is more complicated when the receiver functions in the presence of reflected signals. The reflected signal may be received also during the blockage of the direct signal. In this case, if the reflected signal is strong enough, the indicators usually produce only short pulses in the beginning and at the end of the cycle slip. During the major part of the blockage of the direct signal, the reflected signal acts as a substitute for the direct signal, and the receiver indicators cannot detect the cycle slip. At some values of the amplitude and phase of the reflected signal, the short pulses from the indictors at the beginning and at the end of the cycle slip may remain unnoticed against a noisy background, although the probability of that occurring is not very high given the average energetic potential of the signal.

Also possible are occurrences of short-time cycle slips due to strong impulse noise or interference, violent shocks to the antenna or the quartz crystal in the main signal oscillator. or even an occasional large spike in the receiver's intrinsic noise.

All of the cycle slip detection methods for a single channel, taken separately are one way or another connected with (i.e., rely upon) the observation of the cycle slip process itself. After the slip has ended and the PLL circuit has locked onto a new steady balance point, it is impossible to detect the cycle slip in the affected tracking channel. In the majority of cases, it is also impossible to determine the cycle slip value in the affected channel, and consequently it is impossible to correct it.

As a rule, many satellite tracking channels operate simultaneously in a navigation receiver, and some redundancy exists. Using the redundancy, one can detect a tracking channel whose measurements differ strongly from those of another, and can consider that this difference is most probably the consequence of a cycle slip. By this way, it is possible to detect the cycle slip also after its completion. The existence of redundancy allows, in principle, one to estimate the slip value and to apply a correction after its completion. Yet, this method taken in itself is not sufficiently reliable either, especially if cycle slips occur in several channels simultaneously, or if the rover moves randomly and quickly enough, or if the energetic potential in some channels is not very high.

The second invention of the present application relates to methods and apparatuses to detect and simultaneously correct cycle slips based upon the use of the many characteristics and specific symptoms of cycle slips. The methods and apparatuses enable one to notice the occurrence of a cycle slip with high probability, and to exclude from the navigation processing tasks, during the entire duration of the cycle slip, the measurements of the navigation parameters from the channels where the slips were detected. After the completion of the cycle slip, it is possible to estimate the value and sign of the cycle slip, and to apply the corresponding correction.

Input Values for the Cycle Slip Detection and Correction Unit

The cycle slip detection and correction units (apparatuses) and methods of this invention use, as input data, a set of residuals $\Delta\phi_{i,m}$ of single phase differences and corresponding weight coefficients $K_{i,m}^R$ and $K_{i,m}^B$ at the chosen clock time moments $t_i(t_i=i\cdot\Delta T_I)$ for each channel. In the discussion below, each satellite and satellite signal will be generically indicated as the m-th satellite and m-th satellite signal, respectively, and a subscript "m" or a superscript "m" may be added to the symbols for various parameters to indicate that there is an instance of the parameter for each satellite being tracked by the receivers.

The residual of single phase differences $\Delta\phi_{i,m}$ (also called the "phase residual $\Delta\phi_{i,m}$") related to the m-th satellite signal is defined as follows:

$$\Delta\phi_{i,m}=\phi_{i,m}^B-\phi_{i,m}^R-1/\lambda_m\cdot[D_{i,m}^B-D_{i,m}^R],$$

where $\lambda_m$ is the wavelength of the m-th satellite signal, where $D_{i,m}^B$ and $D_{i,m}^R$ are the computed distances from the m-th satellite to the base and the rover receivers at the i-th clock time moment, respectively, where $\phi_{i,m}^R$ is the full phase (in cycles) of the m-th satellite signal measured in the rover receiver at the m-th clock time moment, and where $\phi_{i,m}^B$ is the full phase (in cycles) of the i-th satellite signal measured in the rover receiver at the i-th clock time moment. Each residual signal $\Delta\phi_{i,m}$ represents the deviation of the single difference of the phases $(\phi_{i,m}^B-\phi_{i,m}^R)$ from the value predicted from the computed distances $(1/\lambda_m[D_{i,m}^B-D_{i,m}^R])$.

For real-time processing applications, the full phase $\phi_{i,m}^B$ is preferably computed by the extrapolating unit of our first invention at the i-th clock time moment from the information parameters received through the communication link between the base and rover stations. If a highly-reliable, high-bandwidth communication link is being used over a short distance (e.g., less than 0.5 km), it is possible that the full phase $\phi_{i,m}^B$ may be received directly. The full phases $\phi_{i,m}^B,\phi_{i,m}^R$ may be constructed in the form provided by equation (5):

$$\phi_{i,m}^B(T_i)=f_{p,nom}\cdot(T_i-T_p^B)-\phi_{i,m,NCO}^B(T_i),$$

$$\phi_{i,m}^R(T_i)=f_{p,nom}\cdot(T_i-T_p^R)-\phi_{i,m,NCO}^R(T_i),$$

or may be constructed in the form which includes the phase offsets of the base receiver:

$$\phi_{i,m}^B(T_i)=[f_{p,nom}\cdot(T_i-T_p^B)-\phi_{i,m,NCO}^B(T_i)]-\phi'^B_0,$$

$$\phi_{i,m}^R(T_i)=[f_{p,nom}\cdot(T_i-T_p^R)-\phi_{i,m,NCO}^R(T_i)]-\phi'^R_0.$$

In either case, we will use the convention practice and have the base receiver correct its clock so that the base time $T_i$ will be equivalent to the GPS time $t_i$ for the purposes of implementing our inventions (the time offset has already been accounted for in the above equations). For all practical purposes, times $T_i$ and $t_i$ will refer to the same processing time increment, and can be interchanged in the above equations.

For each satellite signal, indicated herein generally as the m-th satellite signal, we define a weight factor $K_{i,m}$ for the phase residual and generate it from the weight coefficients obtained in the rover receiver $(K_{i,m}^R)$ and the base receiver $(K_{i,m}^B)$ The coefficient $K_{i,m}^R$ is generated in the rover receiver at processing time intervals $T_I$ by the approach as previously described above where $K_{i,m}^R$ depends on the energetic potential and the angle of elevation of the m-th satellite signal as it is seen from the rover position.

The weight coefficient $K_{i,m}^B$ from the base receiver is extrapolated from the value of $K_{k,m}^B$ transmitted through the communication link. As it turns out, high accuracy is not needed in this extrapolation, and one can use the zero-order extrapolation of: $K_{i,m}^B=K_{k,m}^B$. The value $K_{i,m}$ takes into account both weight coefficients, and it may be generated as:

$$K_{i,m}^{-1}=(K_{i,m}^B)^{-1}+(K_{i,m}^R)^{-1}.$$

If either of the weight coefficients $K_{i,m}^B$ or $K_{i,m}^R$ is zero, the weight factor $K_{i,m}$ is set to zero.

The single phase difference residuals of all of the operating channels may be grouped together as a vector which we call the phase residual vector $\Delta\phi_i$. This vector includes n components, which we may identify as follows: $\Delta\phi_i[m]$, where m=1, 2 . . . , n.

The Structure of The Common Inertial Tracking Loop

The general block schematic diagram of an exemplary apparatus and method of cycle-slip detection and correction for the rover receiver is shown at 200 in FIGS. 2A and 2B. Here the structure of the apparatus and method of control for one channel of the rover receiver is shown in detail, which is indicated generally as the m-th channel for the m-th satellite signal. The structure for the other channels is similar. The part of the apparatus and method that is shown in FIG. 2B is common for all of the channels.

The detection and correction apparatus and method for each channel receive the phase residual $\Delta\phi_{i,m}$ for each channel on a line 201, and generate an estimate $\Delta\hat{\phi}_{i,m}$ of the phase residual for each channel at each i-th time moment on a line 202 (top of FIG. 2A). Each estimate $\Delta\hat{\phi}_{i,m}$ is generated as an output of a common inertial tracking system 240 (FIGS. 2B and 2A). As described in greater detail below, the common tracking system 240 detects a change in the baseline vector between the base and rover stations caused by the motion of the rover or a drift in the rover's reference oscillator, and then changes the values of the estimates $\Delta\hat{\phi}_{i,m}$ to reflect the detected change. A correction unit 220 (FIG. 2A) uses the phase residuals $\Delta\phi_{i,m}$ on line 201 and the phase estimates $\Delta\hat{\phi}_{i,m}$ on line 202 to generate an input ($\psi_{i,m}$) for the common tracking system on a line 222, and to generate a cycle slip correction $\phi_{i,m}^C$ on a line 221 which is representative of the value of a cycle slip when it occurs. The cycle slip correction $\phi_{i,m}^C$ is subtracted from the phase residual $\Delta\phi_{i,m}$ by an adder 205 to generate a corrected phase residual $\Delta\phi_{i,m}^C$. This signal is passed through a switch SW0 and provided on a line 204 as an output, which can be used in the ambiguity resolution and the baseline computation. Switch SW0, which is discussed in greater detail below, blocks the corrected phase residual $\Delta\phi_{i,m}^C$ from being used when a cycle slip is occurring.

A summation node 224 of correction unit 220 generates a phase mismatch $\delta\phi_{i,m}$ for each satellite signal as the difference between the phase residual $\Delta\phi_{i,m}$ and its estimates $\Delta\hat{\phi}_{i,m}$:

$$\delta\phi_{i,m} = \Delta\phi_{i,m} - \Delta\hat{\phi}_{i,m}.$$

The mismatch $\delta\phi_{i,m}$ is provided to a transformation unit 226 of correction unit 220, where it is transformed by a nonlinear operator which includes the round(*) operation. The round (*) operation computes the nearest integer to its argument (*), and provides this integer as its output. A cycle slip correction $\phi_{i,m}^C$ is generated from this operator output as:

$$\phi_{i,m}^C = \alpha \cdot \text{round}(\delta\phi_{i,m}/\alpha),$$

where $\alpha$ is the distance (interval) in cycles between two neighboring points of steady balance of PLL circuit. The value $\alpha$ is a constant (fixed) parameter and is determined by the characteristics of the PLL discriminator. If a PLL discriminator with the transformation characteristic of the form arctan(Q/I) is used, then $\alpha$=0.5.

The nonlinear transfer function of $\phi_{i,m}^C$ versus $\delta\phi_{i,m}$ is shown in the plot of FIG. 3. As one can see from this plot, the transfer function has a stepwise characteristic. When the input mismatch $\delta\phi_{i,m}$ (shown as X-axis) reaches each of the specific points of $\pm\alpha/2$, $\pm 3\alpha/2$, and so on, the value of the correction $\phi_{i,m}^C$ jumps by a step of $\pm\alpha$, as shown in the plot. Between these specific points, the value of the correction $\phi_{i,m}^C$ does not change.

From $\phi_{i,m}^C$ and $\delta\phi_{i,m}$, a corrected mismatch $\psi_{i,m}$ is generated by a summation node 228 of correction unit 220 as:

$$\psi_{i,m} = \delta\phi_{i,m} - \phi_{i,m}^C.$$

The dependence of $\psi_{i,m}$ on $\delta\phi^{i,m}$ is shown in the plot of FIG. 4. The plot of FIG. 4 shows the transfer function, also called the characteristic response, of the correction unit presented in FIG. 2A.

The corrected mismatches for all n channels may be grouped together as a vector $\psi_i$ which has n components. The corrected mismatches $\psi_i$ of all the channels are provided to common tracking system 240 (FIG. 2B), which uses them to detect a change in the baseline between the base and rover stations. The common tracking system generates a state vector $A^\Phi_c$ that has three components ($A^\Phi_x$, $A^\Phi_y$, $A^\Phi_z$) which estimate the baseline vector bias along three directional coordinates (which are usually Cartesian coordinates), and a fourth component ($A^\Phi_q$) that estimates the phase bias of the rover's reference generator (i.e., estimates the clock drift). The vector $A^\Phi_c$ is related to the mismatches $\psi_i$ through the observation matrix H, also called the Jacobian matrix H. This matrix is already generated in the rover's navigation unit and is used to determine the position coordinates of the rover. Matrix H is also called the "geometric function matrix", the "Jacobian geometric matrix", and for the most commonly-used Cartesian coordinate-system definitions it is called the "matrix of directional cosines." For the purposes of describing the cycle-slip detection and correction unit, we will denote the observation matrix as $H_i^\Phi$, where the superscript "$\phi$" symbolically denotes that the matrix is being used in the cycle slip and correction process, and where the subscript "i" represents the time moment $t_i$ for which the matrix has been generated. Vector $A^\Phi_c$ is related to the mismatches $\psi_i$ as: $H_i^\Phi \cdot A^\Phi_c = \psi_i$. Matrix $H_i^\Phi$ enables one to directly find $\psi_i$ if $A^\Phi_c$ is known. However, we have the opposite situation where we want to find $A^\Phi_c$ from $\psi_i$. We perform the reverse task by multiplying $\psi_i$ with a pseudo-inverse matrix $G_i^\Phi$ of matrix $H_i^\Phi$, where matrix $G_i^\Phi$ is determined from the least-squares method using matrix $H_i^\Phi$ and a covariance matrix $R_i^\Phi$ which represent the degree of error in the mismatches $\psi_i$. The use of matrix $R_i^\Phi$ is optional, but is preferable. Pseudo-inverse matrix $G_i^\Phi$ is also called a generalized inverse matrix for matrix $H_i^\Phi$. To be a pseudo-inverse matrix of $H_i^\Phi$, matrix $G_i^\Phi$ need only satisfy the relationships $G_i^\Phi \cdot H_i^\Phi \cdot G_i^\Phi = G_i^\Phi$ and $H_i^\Phi \cdot G_i^\Phi \cdot H_i^\Phi = H_i^\Phi$. We will now describe the specifics of the least squares process.

There are a number of spatial coordinate systems which may be used to specify the positions of the base receiver, the rover receiver, and the satellites. The selection affects the specifics of how the observation matrix $H_i^\Phi$ is generated. For the purposes of explaining the common tracking system, we will use the Earth-centered Earth-fixed (ECEF) system, but we will describe how $H_i^\Phi$ may be generated for other coordinate systems at the end of this section. The observation matrix $H_i^\Phi$ includes four columns ($m_1$=1,2,3,4) in accordance with the number of the state vector components, and n rows ($m_2$=1, 2 . . . , n) in accordance with the number of satellite channels (m=1, 2 . . . , n). Here, we will use the indices $m_2$ and m interchangeably for indexing the rows of $H_i^\Phi$. The elements of the first three columns of the m-th row at the i-th time moment are determined by the direction cosines ($\alpha_{i,m}$, $\beta_{i,m}$, $h_{i,m}$) of the vector which points from the rover to the corresponding m-th satellite, and are computed by the formulas:

$$\alpha_{i,m} = -(x_i^m - x_i^R)/D_{i,m}^R,$$

$$\beta_{i,m} = -(y_i^m - y_i^R)/D_{i,m}^R,$$

$$h_{i,m} = -(z_i^m - z_i^R)/D_{i,m}^R,$$

where $x_i^m$, $y_i^m$, and $z_i^m$ are the satellite coordinates in the geocentric coordinate system at the moment of transmission of the m-th satellite signal; where $x_i^R$, $Y_i^R$, $Z_i^R$ are the computed coordinates of the rover at the moment of transmission of the m-th satellite signal; and where $D_{i,m}^R$ is the calculated distance from the rover to the satellite at the same moment.

The fourth column of the $H_i^\Phi$ matrix is the unit column.

The covariance observation matrix $R_i^\Phi$ is a square matrix with the dimensions n×n. It contains as its main diagonal elements the weight factors $K^{-1}_{i,m}$ for the phase residuals: $R_{i\,m,m}^\Phi = K^{-1}_{i,m}$ for m=1, 2 . . . , n. All of the off-diagonal elements are zero.

The state vector $A_c^\Phi$ is generated as $$A_c^\Phi = G_i^\Phi \cdot \psi_i,$$

Where $G_i^\Phi$ is generated as $G_i^\Phi = [(H_i^\Phi)^T \cdot (R_i^\Phi)^{-1} \cdot (H_i^\Phi)]^{-1} \cdot (H_i^\Phi)^T \cdot (R_i^\Phi)^{-1}$.

In common tracking system 240, processing block 242 generates matrix $G_i^\Phi$ from matrices $H_i^\Phi$ and $R_i^\Phi$, and generates vector $A_c^\Phi$ from matrix $G_i^\Phi$ and the mismatch vector $\psi_i$, from the steps described above. We may view each of the four components of the state vector $A_c^\Phi$ as a signal at the start of a respective common tracking loop of the common tracking system. From this point, the four component signals will be initially processed separately, and then combined together to form the estimates $\Delta\hat\phi_{i,m}$. The estimates $\Delta\hat\phi_{i,m}$, as previously described above, are provided to the correction units 220, which in turn generate their respective corrected mismatches $\psi_{i,m}$, which in turn are provided as inputs to common tracking system 240. The four signals thereby come back to generate themselves, and four closed feedback loops are thereby formed.

We will now describe the processing of these four component signals through the four feedback loops. Starting at the beginning point, the four obtained components of the state vector $A_c^\Phi$ then pass through four corresponding dynamic filters 244-1 through 244-4 which have the transfer functions $K_{dx}(p)$, $K_{dy}(p)$, $K_{dz}(p)$, and $K_{dq}(p)$. Four dynamic estimates $V_{dx}$, $V_{dy}$, $V_{dz}$, and $V_{dq}$, are obtained as a result. Together they form the dynamic estimation vector $V_{d,i}$. The transfer functions of the dynamic filters 244 define the pass band (e.g., the sluggishness, or time lag, of the four feedback loops) and the dynamic characteristics of four the common inertial tracking loops. The filters are preferably chosen to guarantee a sufficiently low tracking error of the rover movement and possible drifts of the rover's reference generator. This requirement means that the amount of the mismatch $\delta\phi_{i,m}$ which is caused by these perturbations, together with the noise fluctuations in the system, is preferably much less than $\alpha/2$. If it is so, these perturbations do not effect the value of the Correction $\phi_{i,m}^C$, as one can see from the plot of FIG. 3, and also do not upset the linearity of the common loop, as one can see from the plot of FIG. 4 (In FIGS. 3 and 4, the points of steady balance correspond to the points $\delta\phi_{i,m} = 0, \pm\alpha, \pm 2\alpha, \pm 3\alpha, \ldots$ etc.). Indeed, the total aggregate of the dynamic errors and noise errors in the vicinity around each point of steady balance (corresponding to $\delta\phi_{i,m} = 0, \pm\alpha, \pm 2\alpha, \pm 3\alpha, \ldots$ etc. in FIG. 4) is much less than the span of each sloping line section of the curve given in FIG. 4. Tutorial information on selecting the filter parameters is provided in Appendix A of this application.

Our research shows that in the case where the dynamics of the rover's movement approximate those of an ordinary car, the transfer functions $K_{dx}(p)$, $K_{dy}(p)$, $K_{dz}(p)$, and $K_{dq}(p)$ should be the same, and should include two integrators and have the form:

$$K_d^*(p) = K1 + K2/p + K3/p^2,$$

where the asterisk star "*" symbol is a place holder for "x", "y" "z" or "q", where K1, K2, and K3 are constants (which can be dynamically changed during operation if so desired), and where p is the Laplacian operator (p=jω=j2πf). The above form, in combination with integrator $I_1$, provides a third order of astaticism (type 3 servo system) for the common tracking loops. (The order of astaticism of the overall loop transfer function K(p) is equal to the polynomial degree of "p" appearing in the numerator K(p), with K(p) in rational form—meaning no fractions 1/p appearing the numerator or denominator of K(p).) The factors K1. K2, K3 are preferably chosen so that the equivalent noise band of the common loop is in the range of 15–25 Hz at a computation clock time interval of $T_I$=5–10 milliseconds. (In this case, the time discretization only slightly affects the loop's frequency response characteristics and the noise band can be defined with the corresponding linearized analog equivalent of the circuit taken separately, without taking into account the effects of other circuits).

As the next step, the vector of dynamic estimates $V_{d,i}$ is projected onto the directions of distances to satellites by multiplying it with the observation matrix $H_i^\Phi$ to generate the n-dimensional projection vector $V_{p,i}$:

$$V_{p,i} = H^\Phi_i V_{d,i}$$

Each component of the obtained vector $V_{p,i}$ corresponds to a respective channel, and we identify each component of the vector as $V_{p,i,m}$ for m=1, 2, . . . , n satellites. Processing block 246 generates matrix $H_i^\Phi$ or receives matrix from the navigation unit which computes the baseline vector. Processing block 246 generates vector $V_{p,i}$ from matrix $H_i^\Phi$ and the dynamic estimate vector $V_{d,i}$.

Each component $V_{p,i,m}$ of the vector is provided to the input of its own accumulator $I_1$ (FIG. 2A) through an adder 248. Both accumulator and adder 248 are part of common tracking system 240. Adder 248 is used to inject a signal from local feedback loop, which is described in greater detail below. Accumulator $I_1$ functions as a time integrator, and scales its input by the processing time interval $T_I$. The output of accumulator $I_1$ generates the estimate $\Delta\hat\phi_{i,m}$, which closes the feedback loop of the common tracking loop:

$$\Delta\hat\phi_{i,m} = T_I \cdot \sum_i V_{p,i,m}.$$

If a cycle slip begins in one or more of the channels, but with a sufficiently high number of channels functioning normally without cycle slips, then the cycle-slips in this small number of channels do not appreciable affect the vectors $A_c^\Phi$ and $V_{d,i}$ of the common tracking system. As a consequence, the phase residual $\Delta\phi_{i,m}$ of an affected channel changes with time but the estimate $\Delta\hat\phi_{i,m}$ for the affected channel practically varies only slightly, and consequently the magnitude of the mismatch $\delta\phi_{i,m}$ increases with time $t_i$ because the phase residual $\Delta\phi_{i,m}$ is changing with time. When the value of the mismatch $\delta\phi_{i,m}$ reaches the threshold $\alpha/2$, the correction $\phi_{i,m}^C = \alpha$ is generated, as might be seen from the plot in FIG. 3. As the mismatch increases further, the magnitude of the correction $\phi_{i,m}^C$ grows by additional leaps (2α, 3α, . . . , and so on). This correction is used to correct the single phase difference residual $\Delta\phi_{i,m}$. The corrected residual is denoted as $\Delta\phi_{i,m}^C$, and is generated as:

$$\Delta\phi_{i,m}^C = \Delta\phi_{i,m} - \phi^C_{i,m},$$

and the task of generating $\Delta\phi_{i,m}^C$ is preformed by adder 205 (FIG. 2A).

After the cycle slip has been completed, the value of the correction $\phi^C_{i,m}$ will coincide with the cycle slip value, and the corrected residual $\Delta\phi_{i,m}^C$ turns out to be independent from the particular point of steady balance which the PLL circuit settled on.

Individual Circuits

The common tracking loops, with properly chosen parameters, tracks quite well the perturbations common for all the channels, specifically, those connected with the rover movement and the drift in the rover's reference generator. Yet individual systematic variations of the phase residual $\Delta\phi_{i,m}$ may also take place in one or more channels, and which are different in each of the channels, and which cannot be compensated by the common tracking system. As a result of such individual variations, a drift in the mismatch $\delta\phi_{i,m}$ in each channel occurs, which begins to increase systematically, and ultimately reaches the threshold of $\alpha/2$. Then a false correction will be generated, and the system operation will be disrupted. The cause of the individual systematic variations of the phase residual $\Delta\phi_{i,m}$, and thus the cause of the false correction, is due to an error in the computed position coordinates of the rover. Indeed, as it was noted earlier, the residuals $\Delta\phi_{i,m}$ are defined relative to their computed values, and to compute these values one needs the computed distances $D_{i,m}{}^R$ and $D_{i,m}{}^B$. But the distances may be computed only if the receiver coordinates are known. The base coordinates may be supposed to be known with high accuracy, but the rover coordinates are not as accurate; especially in the beginning of measurements before the ambiguity resolution is completed when the rover coordinates are measured only with estimates of the pseudoranges. Consequently, the rover coordinate error may reach 10 meters to 15 meters. As a result of that, an error in the initial value of the computed distances $D_{i,m}{}^R$ arises, which varies slowly due to the satellite movement. This means that the residuals $\Delta\phi_{i,m}$ vary correspondingly too, and the rates of their respective variations can reach ±0.05 cycles per second. The variations will be different in different channels, which leads to the arising of the drift. After the ambiguity resolution step is completed, the rover coordinates become substantially more accurate. Correspondingly, the rates of variation in the residuals and drifts decrease by approximately two or three orders of magnitude.

To prevent a substantial increase in the mismatch and the occurrence of a false correction, an individual loop 260 for each satellite channel is included into the cycle-slip detection and correction unit (see FIG. 2A). Each individual loop 260 measures the amount of systematic drift in the mismatch $\delta\phi_{i,m}$ and corrected mismatch $\psi_{i,m}$ of its channel, and generates a correction signal for the channels estimate $\Delta\hat{\phi}_{i,m}$ which compensates for the systematic drift.

The corrected mismatch $\psi_{i,m}$ of each channel is provided to an input of the individual loop 260 for each channel. The output of each individual loop is denoted as $V_{In,i,m}$, and is added with the corresponding component $V_{p,i,m}$ of the vector $V_{p,i}$ by an adder 248 of the common tracking system 240. In this way, the correction is made to the estimate $\Delta\hat{\phi}_{i,m}$. Thus, with the addition of the individual loop, the estimation $\Delta\hat{\phi}_{i,m}$ is generated as:

$$\Delta\hat{\phi}_{i,m} = T_I \cdot \sum_i (V_{p,i,m} + V_{In,i,m}).$$

Each individual loop 260 samples the value of its corrected mismatch $\psi_{i,m}$ at each i-th clock time moment, or periodically samples the value of its corrected mismatch $\psi_{i,m}$ at selected time moments by the use of a switch SW2, and generates a value at its output $V_{In,i,m}$ which would be representative of a systematic drift. For this, the sampled value is scaled by a gain value $K_\Sigma$ by a processing block 264, and optionally integrated by an accumulator $I_2$. Specific ways of generating the output $V_{In,i,m}$ are discussed below in greater detail. $V_{In,i,m}$ is accumulated with signal $V_{p,i,m}$ by accumulator $I_1$, and thus affects the value of the estimate $\Delta\hat{\phi}_{i,m}$, which in turn affects the value of the corrected mismatch $\psi_{i,m}$, thus forming a negative feedback control loop which corrects small drifts in the corrected mismatch $\psi_{i,m}$. The addition of the individual loops makes the cycle-slip detection and correction unit become a multi-loop system.

Each individual loop tracks the drift in its corresponding mismatch $\delta\phi_{i,m}$ through the corrected mismatch $\psi_{i,m}$, and keeps the mismatch value $\delta\phi_{i,m}$ at a rather low level. preventing a false correction. However, here another danger arises, that of failing to detect a cycle slip. Specifically, an increase in the magnitude of the mismatch $\delta\phi_{i,m}$ due to a cycle slip could also be tracked by an individual loop, and the individual loop could change the value of the estimate $\Delta\hat{\phi}_{i,m}$ to reduce the magnitude of the mismatch $\delta\phi_{i,m}$ and the corrected mismatch $\psi_{i,m}$. If this occurs to a sufficient degree, a cycle slip would not be detected b tie common tracking system and the correction unit.

The following three ways may be used to eliminate this danger.

The first way is based upon the fact that the rate of drift in a phase residual $\Delta\phi_{i,m}$ caused by the movement of satellites is rather low. Therefore, to prevent the dangerous increase of the mismatch $\delta\phi_{i,m}$ the individual loop should react slowly to the mismatch, and should generate a slow-acting correction output $V_{In,i,m}$. This may be done by sampling the value of the corrected mismatch $\psi_{i,m}$ only at selected time moments $t_i$ spaced at long time intervals $\Delta T_{In}$ relative to the processing time internal $T_1$ ($\Delta T_{In} > T_I$), scaling the sampled value by a factor $K_\Sigma$ such as $K_\Sigma = 1/T_I$, and then outputting the scaled sample as $V_{In,i,m}$ for only those time moments $t_i$ in which the sampling occurred. At other time moments $t_i$, the value of the output $V_{In,i,m}$ is zero. The sampling is performed by switch SW2 shown in FIG. 2A, as controlled through a logical AND gate 261 which receives a periodic gating signal having interval $\Delta T_{In}$ and denoted in FIG. 2A by the symbol "$\Delta T_{In}$". When switched on during a selected time moment $t_i$, switch SW2 couples the value of $\psi_{i,m}$ to gain block $K_\Sigma$. Integrator $I_2$ and the corresponding adder are not used in this implementation. If there is a slow drift in the mismatch, then the sampled values of $\psi_{i,m}$ will have the same sign, and the periodic values of $V_{In,i,m}$ which are added to accumulator $I_1$ will have the same sign and will constructively add over a long period of time to change the estimate $\Delta\hat{\phi}_{i,m}$ to follow the drift in the phase residual $\Delta\phi_{i,m}$. If one chooses a sampling interval $\Delta T_{In} < 4-5$ seconds, it will be sufficient to prevent the occurrence of a false correction, even before the ambiguity resolution is completed. After the ambiguity resolution is completed and more precise rover coordinates are thereby obtained, it is possible to increase the interval $\Delta T_{In}$ up to several minutes. At such intervals, most cycle-slips will occur when switch SW2 is not sampling the corrected mismatch $\psi_{i,m}$. However, there is a finite possibility that switch SW2 will be switched on during a cycle slip, and such would distort the value of the correction $\phi_{i,m}{}^c$. This possibility is significantly reduced by detecting when a cycle slip is occurring and preventing switch SW2 from closing (i.e., switching on) during a cycle slip. Below, we describe a unit which detects the occurrence of a cycle slip and generates a blocking signal $S_{BL}$, which is coupled to the AND gate 261 which operates switch SW2. While blocking signal $S_{BL}$ is active (e.; $S_{BL} = 0$), switch SW2 is prevented from being switching on by the periodic gating signal because of the logic low signal at the lower input of AND gate 261.

The second way of preventing the individual loop from inadvertently correcting a cycle slip is a modification of the first way. In the modification, switch SW2 is maintained continually switched on (in the closed state) except when blocking signal $S_{BL}$ is active, and the gain factor $K_\Sigma$ is substantially decreased in value, such as by a factor of $5/T_I$. This provides for continual monitoring of the corrected mismatch signal, and for a narrow banded feedback loop.

The third way of preventing the individual loop from inadvertently correcting a cycle slip is based upon the fact that the rate of drift due to a systematic cause is almost constant over a rather large interval of time (up to 10–15 minutes). Therefore, the rate of the drift may be measured and stored in memory right at the beginning of the measurement, and then used for the compensation of the drift. To store the rate of the drift in an individual circuit, a memory unit comprising an accumulator $I_2$ and having a transfer function of $(1+K4/p)$ (FIG. 2A) is used in one exemplary embodiment. The switch SW2 is switched on once in the beginning of measurement for a time period $T_w$ sufficient for storing the rate of change of $\psi_{i,m}$ in accumulator $I_2$. A signal applied to the upper input of AND gate 261 may be used for this purpose. During the switching on of switch SW2, an individual loop with the second order of astaticism (type 2 servo system) is formed. The amplification factor $K_\Sigma$ is selected to provide an equivalent noise bandwidth of 1–3 Hz for the individual loop. In this case, it will be sufficient to use an period of $T_w$=0.5 seconds to 3 seconds for storing. The rate of drift stored at the first turning on compensates for the growth of the mismatch for the time up until the ambiguity resolution. If the typical time up until the resolution of ambiguity exceeds 10–15 minutes, it may be required to increase the order of astaticism (increase the servo number) of the individual loop. To do that, one more integrator is added to the memory unit, which will now have the transfer function of a kind $(1+K4'/p+K5'/p^2)$ and will store not only the rate, but also the acceleration of drift.

After the ambiguity resolution, the rover coordinates are defined more accurately, and it is necessary to switch on switch SW2 again for a brief time to store a new, and considerably smaller, rate of drift. In the subsequent period, switch SW2 is infrequently turned on for brief periods of time, such as approximately once every 10–15 minutes, to set the memory with corrected rate of drift. In the second way, the occurrence of a cycle slip during the turning on of switch SW2 will distort the correction value for the cycle slip. However, since the switching on of switch SW2 is made rarely, and since the occurrence of a cycle slip is a relatively rare event, the probability of their coincidence is very small. In addition, one may delay the sampling of switch SW2 with the coupling of the blocking signal $S_{BL}$ to the lower input of AND gate 261 until all cycle slips have ended.

The main drawback of the second way is due to its strong sensitivity to the reflected signals having a Doppler frequency shift. Such reflections can arise from the rover movement. The multipath error in the measured phases due to the movement will vary, and the rate of its variation will bring an error into the rate of drift stored in the individual circuit. This may result in an erroneous correction. Therefore it is best to use the second way when the switching on of switch SW2 may be made when the rover is motionless (for example, prior to the beginning of the rover's movement), or when the Doppler shift of the reflected signal is negligibly small, or when there are only very weak signal reflections in the rover's environment. The first way, in contrast, has little sensitivity to reflected signals, but can ensure the correct amount of correction only when there are cycle slips of relatively short time duration (up to a maximum time duration of 4–5 seconds). This is because the sampling interval $\Delta T_{In}$ is set to a value in the range of 4 to 5 seconds. The second way has a longer sampling period $T_w$ and can correct systematic drifts in the presence of long duration cycle slips.

Signal of Blocking/Interlocking

Whenever the operation of a channel is disturbed, such as by a cycle slip, it is advisable to disconnect the corrected mismatch signal $\psi_{i,m}$ of the disturbed channel from the common tracking system, and to stop the sampling of switch SW2 of independent loop 260 until the disturbed channel resumes normal operation. The timely disconnection of the corrected mismatch signal of a disturbed channel prevents the occurrence of interchannel interferences, and increases the reliability of the common tracking system and the entire system. The timely stopping of switch SW2 prevents the individual loop from generating a correction based on false data. For this purpose, a blocking signal generator 270 receives the corrected mismatch signal $\psi_{i,m}$ of the channel, the status signal $S_m^B$ from the extrapolation unit on the status of the measurements from the base station for the satellite signal being tracked by the channel, and the alarm signals $S1_m^R$ and $S2_m^R$ from the rover receiver, and generates a blocking signal $S_{BL,m}$ whenever it detects a disruption to the channel. For the purposes of discussion, and without loss of generality, we will use a value of $S_{BL,m}$=1 to indicate a normal operation of the channel, and value of $S_{BL,m}$=0 to indicate a disruption of the channel. However, it should be understood that the reverse assignment of 0 and 1 values, or the assignment of other values, may be equivalently used. When $S_{BL,m}$=0, switch SW1 is switching off, and switch SW2 is prevented from being switched on by AND gate 261 for sampling by the individual loop. When $S_{BL,m}$=1 switch SW1 is switched on, and switch SW2 is allowed to be switched on by either of the periodic signals $\Delta T_{In}$ or $T_w$.

At the occurrence of the signal of blocking ($S_{BL,m}$=0) in any channel, the switch SW1 in FIG. 2A of the affected is disconnected, and the corrected mismatch signal $\psi_{i,m}$ of the affected channel does not go to the common tracking system. Whenever a channel is disconnected, matrix $G_i^\Phi$ at processing block 242 should be recomputed from a reduced observation matrix $H_i^\Phi$ which has the corresponding row for the affected channel removed, and from a reduced covariance matrix $R_i^\Phi$ which has the corresponding row and column for the affected channel removed. To perform this task, the blocking signal $S_{BL,m}$ is provided to the $G_i^\Phi$ matrix processing block 242 of common tracking system 240. Whenever a channel is reconnected, matrix $G_i^\Phi$ is recomputed at block 242 with augmented matrices $H_i^\Phi$ and $R_i^\Phi$ which have the previously removed rows and column included. There is no matrix recalculation for the $H_i^\Phi$ matrix processing block 246 of the common tracing system hen a channel is disconnected, or when it is reconnected.

The disconnected channel ceases to influence the generation of the estimates $\Delta\hat{\phi}_{i,m}$ by common tracking system 240, but the estimate $\Delta\hat{\phi}_{i,m}$ for the disconnected channel continues to be generated by common tracking system 240 from the data provided by the other channels. The mismatch $\delta\phi_{i,m}$ and correction $\phi_{i,m}^C$ of the disconnected channel continue to be generated too. Therefore, a cycle slip in the disconnected channel call he corrected.

To prevent this correction from being distorted because of the influence of individual loop 260, the sampling of this individual loop is disabled by switch SW2 (FIG. 2A) hell the blocking signal is active (i.e., at $S_{BL,m}$=0)

The blocking signal $S_{BL,m}$ is generated in blocking signal generator 270 shown in FIG. 2A. The method of operation of this unit is explained by a flow diagram 400 shown in FIG. 5. Flow diagram 400 comprises a start block 402, and end block 420, and several processing blocks 404–416. The process repeats through the blocks 402–420 at each processing time increment $T_I$ (e.g., $t_i, t_{i+1}, t_{i+2}, t_{i+3}, \ldots$), or at a small multiple of the processing time increment $T_I$ (e.g., $t_i, t_{i+2}, t_{i+4}, t_{i+6}, \ldots$). At block 404, the alarm signals $S1_m^R$ and $S2_m^R$ from the rover, and alarm signal $S_m^B$ from the base station are tested to see if any one of them is active (e.g., is zero). An active alarm signal indicates that the channel has most likely been disturbed, and that cycle slips are likely to occur. If one of the alarm signals is active, then the processing moves to block 406, where the blocking signal $S_{BL,m}$ is set in an active state, e.g., $S_{BL,m}=0$. This disables switches SW1 and SW2, and causes the common tracking system to recompute matrix $G_i^\Phi$ so as to exclude the channel's contribution and prevent its corrected mismatch $\psi_{j,m}$ from influencing the generation of the estimates $\Delta\hat{\phi}_{j,i}$. From block 406, the processing proceeds to block 408, where a timer is set so that a delay duration $T_d$ may be subsequently measured in another processing path of flow diagram 400. Instead of setting a timer, one can equivalently record a representation of the current time in a memory location, which can be later compared against the current time to find the delay. From block 408, the processing proceeds to end block 420, and waits for the next processing time increment. As long as one of the alarm signals $S1_m^R$, $S2_m^R$ and $S_m^B$ is active, the process will follow the processing path through blocks 402, 404, 406, 408, and 420.

Another condition which indicates that the channel has likely been disturbed is when the magnitude of the corrected mismatch $\psi_{i,m}$ is near its maximum value of $\alpha/2$, where a is the distance between the steady balance points in the PLL circuit. If the magnitude of the corrected mismatch ($|\psi_{i,m}|$) is within 85% to 100% of $\alpha/2$, it would be advisable to activate the blocking signal $S_{BL,m}=0$ if it has not already been activated by the alarm signals $S1_m^R$, $S2_m^R$ and $S_m^B$, or to maintain it in an activated state if the alarm signals have subsequently become deactivated. This test is done at processing block 410, which tests magnitude of the corrected mismatch ($|\psi_{i,m}|$) against a threshold value $\Pi_\delta$. The threshold value $\Pi_\delta$ is typically in the range of 85% to 95% of $\alpha/2$, and preferably around 90% of $\alpha/2$. For a value of $\alpha=0.5$ cycles (corresponding to 3.14159 radians), a threshold of 90% of $\alpha/2$ corresponds to $\Pi_\delta=0.225$ cycles (corresponding to approximately 1.4 radians). Processing block 410 is reached from block 404 if the test preformed at block 404 indicates that all of the alarm signals $S1_m^R$, $S2_m^R$ and $S_m^B$ are not active. At block 410, if the magnitude of the corrected mismatch ($|\psi_{i,m}|$) exceeds the threshold $\Pi_\delta$, the process proceeds through blocks 406, 408, and 420, where the same steps are performed in the case where one or more of the alarm signals are active.

When all the alarm signals are deactivated, and when the magnitude of the corrected mismatch ($|\psi_{i,m}|$) falls below the threshold $\Pi_\delta$, the disturbance may have ended and we want to consider deactivating the blocking signal $S_{BL,m}$, e.g., by setting $S_{BL,m}=1$. However, the mere disappearance of all of the alarm signals is usually not a sufficient condition to deactivate the blocking signal $S_{BL,m}$, and the deactivation of the blocking signal $S_{BL,m}$ should be made with some amount of delay. The reason for this is that, as it was already stated earlier, the alarm signals can become deactivated during the middle of a cycle slip while, at the same time, there is an abnormal increase in the phase residual $\Delta\phi_{i,m}$ and of the corrected mismatch $\psi_{i,m}$. The latter condition indicates that the channel should still not be connected to the common tracking system. Therefore, after an activation of the alarm signals, and after all of the alarm signals have been subsequently deactivated, switches SW2 and SW1 should remain switched off for a time delay $T_d$ after the deactivation of the last active alarm signal. The delay $T_d$ is set by processing block 408, as previously described. During the duration of the delay $T_d$, the corrected mismatch $\psi_{i,m}$ will be large due to the effects of the cycle. When the cycle slip is finished, the corrected mismatch $\psi_{i,m}$ will return to a value near zero. Thus we have to wait a time delay of $T_d$ to return mismatch $\psi_{i,m}$ near zero.

This above-described methodology for deactivating the blocking signal $S_{BL,m}$ may be achieved by the topology of the processing blocks 410, 412, 414, and 416 shown in FIG. 5. Once all of the alarm signals have been deactivated, the process will go to processing block 408 to test the magnitude of the corrected mismatch ($|\psi_{i,m}|$) As long as this is above the threshold $\Pi_\delta$, the process will keep going through blocks 406 and 408, and the start of the time delay $T_d$ will keep being reset. This prolongs the active state of the blocking signal ($S_{BL,m}=0$) past a time interval of $T_d$. As soon as the corrected mismatch is returned to normal, which is at a level below the threshold $\Pi_\delta$, the process proceeds to block 412 instead of block 406, and the resetting of the timer for delay $T_d$ is stopped. At block 412, the process tests whether the time delay has finished. If not, the process proceeds to block 414, where the blocking signal continues to be activated during the time delay $T_d$. The process will continue going through the path of blocks 402, 404, 410, 412, 414, and 420 until the time delay $T_d$ has finished, at which point the process will go from block 412 to block 416 when it next encounters block 412. At block 416, the blocking signal is disabled ($S_{BL,m}=1$). At this point, the process will continue going through the path of blocks 402, 404, 410, 412, 416, and 420 until an alarm signal is activated, or until the magnitude of the corrected mismatch exceeds its threshold.

At processing block 412, the determination of whether the time delay $T_d$ has been reached may be done by looking at the contents of the timer, if a timer was used in step 408. If the value of the time has exceeded $T_d$, the delay has been reached. If, instead of a timer, a representation of the staring time of the delay was stored to memory in step 408, the determination of whether the time delay has been reached may be done by subtracting the representation of the starting time from the representation of the current time, and then testing that value against the value of $T_d$.

Compromises are made in the selection of values of the threshold $\Pi_\delta$ and the time delay $T_d$. At too small of a threshold $\Pi_\delta$, the probability of a false disconnection of the channel due to transient noise spikes will increase. We have found that a value of around 90% of $\alpha/2$ is a good compromise (approximately 1.4 radians for $\alpha=0.5$ cycles).

A too large of a delay $T_d$ will result in an excessive time for the disconnection of the channel after the cycle-slip has terminated. On the other hand, a too small of a delay $T_d$ will result in the channel being connected to the common loops before the cycle slip in the channel has finished. A satisfactory compromise is a choice of $T_d=1$ to 2 seconds.

Exclusion of Measurements of the Channel From the Further Processing (Signal "Observation Missing").

The navigation measurements from any channel in which cycle slip occurs should not be used for the resolution of ambiguity or the calculation of the baseline vector until the cycle slip ends and is corrected. The previously-described disconnection of a channel from common tracking system 240 does not necessarily mean that the measurements should be excluded from the ambiguity resolution or the baseline calculation. Some channels of the rover receiver, particularly those tracking satellites positioned at small elevation angles, may be tracking signals having relatively low energy potential, and their fast-response indicators frequently generate $S1^R$ alarm signals which cause these channels to be disconnected from common tracking system 240. However, the low energy potential may still be appreciably above a usable threshold value, and the channels which have been disconnected from common tracking system 240 operate with stability in the individual mode (i.e., disconnected mode). The measurements from these channels (with their weight factors taken into account) may turn out to be rather useful for the computation of the baseline vector.

In order to determine when the navigation measurements of a channel should be excluded from the ambiguity resolution or the baseline computation because of a cycle slip, we may generate an alarm signal called the "observations missing" signal $S_{A,m}$. This alarm signal is generated in each channel by a respective observation missing detector 280, and the subscript "m" identifies the channel to which the particular alarm signal belongs. For the purposes of discussion, and without loss of generality, we can assign a value of $S_{A,m}=0$ to indicate an active alarm state, and a value of $S_{A,m}=1$ to indicate a deactivated state.

The observation missing signal $S_{A,m}$ in the in-th rover channel is generated in an active state ($S_{A,m}=0$) whenever one or more of the following events occur:

(1) the slow acting alarm signal $S2_m^R$ of the channel is activated ($S2_m^R=0$).

(2) the base measurements are missing ($S_m^B=0$), or (3) whenever the correction $\phi_{i,m}^C$ value is incremented or decremented.

The fast acting alarm signal $S1_m^R$ is not used. When a cycle slip occurs, one or both of the first two events is likely to occur before the third event (that of a change in the correction $\phi_{i,m}^C$) occurs. Additionally, when a cycle slip is nearing completion, both of the first two events are likely to disappear before the changes to the correction $\phi_{i,m}^C$ are finished. Determining the end of the changes to the correction $\phi_{i,m}^C$ is the most important factor for determining when it is safe to deactivate the missing observation signal ($S_{A,m}=0$). Because the correction $\phi_{i,m}^C$ changes in discrete steps, and does not change at each processing time increment $T_I$, one has to observe the value of the correction $\phi_{i,m}^C$ over a relatively long duration (i.e., over several time increments $T_I$) before one can come to the conclusion that the cycle-slip has finished. To do this, we may use the same time delay approach ($T_d$) in detector 280 that was used in the generation of the blocking signal (FIG. 5) in generator 270 (FIG. 2A). During each processing time increment $T_I$ (e.g., $t_i$, $t_{i+1}$, $t_{i+2}$, $t_{i+3}$, ... ), or at a small multiple of the time increment $T_I$ (e.g., $t_i$, $t_{i+2}$, $t_{i+4}$, $t_{i+6}$, ... ), the above five conditions are examined to see if any are active. If one or more are active, then the missing observation signal is activated (e.g., $S_{A,m}=0$), and a timer for measuring a delay $T_1$ is started. At each subsequent processing time increment, the timer is restarted if any of the above five conditions exists. When all of the five conditions are no longer present, and when the timer reaches the value of $T_1$, the missing observation signal is deactivated (e.g., $S_{A,m}=1$). A flow control structure similar to that shown in FIG. 5 may be used to implement the time delay $T_1$. We have found that a value of $T_1 \cong 1$ second is generally sufficient.

Features of the Cycle Slip Detection and Correction Apparatus and Method in the Postprocessing (PP) Mode.

In the PP mode, there is no communication link operating, and the ambiguity resolution and the baseline calculation are performed after the termination of measurements at the rover and base stations. The information and navigation parameters of the base and rover receivers are recorded at periodic intervals at their respective locations, and the recorded parameters are assembled together at one location and processed to resolve the ambiguity and calculate the baseline vector. The time interval between recorded parameters is usually between 0.05 seconds and 1 second, and usually considerably exceeds the clock rate at which the PLL circuits are operated at, which is usually between 0.001 and 0.020 seconds. At such large periods between recorded parameters, the extrapolation of measurements for a moving rover with the required accuracy is practically impossible. In addition, the common tracking system of the cycle-slip detection and correction unit cannot track the rover movement with the required accuracy, and in a number of cases cannot track the phase drift of the rover's reference generator. For these reasons, the use of the our apparatuses and methods for the detection and correction of cycle slips in the PP mode is preferably limited to the case where the base and rover receivers are motionless and where highly-stable reference generators are used in the receivers. The required stability can be readily achieved in the receivers by using the joint tracking loops disclosed in our co-pending patent application Ser. No. 09/330,221. filed Jun. 10, 1999, entitled "The Joint Tracking of the Carrier Phases of the Signals Received from Different Satellites", now U.S. Pat No. 6,313,789, which was previously described above, and which is incorporated herein by reference.

Thus, in the above case, our apparatuses and methods of detection and correction of cycle slips can be used in the PP mode with the following changes:

1. Residuals $\Delta\phi_{i,m}$ of the single differences of the phases are calculated directly, without extrapolation, from the records of information parameters received from the base and rover receivers, and are generated periodically at a time interval which coincides with the duration of the frame, and which lies in the range of 0.05 seconds to 1.0 second. This range corresponds to a frame clock frequency of 20 Hz to 1 Hz.

2. Each loop of the common tracking system has an astaticism of the second order (type 2 servo system) and an equivalent noise band which is considerably smaller than the frame clock frequency, i.e., from 4.0 Hz to 0.2 Hz depending on the chosen frame clock frequency.

Model Experiments Which Demonstrate the Operation of the System of Detection and Correction of Cycle Slips The operation of the apparatuses and methods of detection and correction of cycle slips according to the second invention of this application can be clearly illustrated with the help of a simulation model. The model simulated the operation of two receivers (Base and Rover), tracking simultaneously 8 satellites (n=8). In each satellite channel of the Base and Rover receivers, there is a PLL circuit which tracks the corresponding satellite carrier and a slave DLL circuit which tracks the C/A-code (GPS) of the satellite. (The DLL circuit is a slave unit in this case because it receives a Doppler-shift correction signal generated by the PLL circuit). Each receiver has 4 joint tracking loops as disclosed in our previously-mentioned co-pending patent application Ser. No. 09/330,221, now U.S. Pat No. 6,313,789, three of which track the rover displacement along three coordinates, and one tracks the phase of the reference generator. The adjustment frequency of the joint tracking loops is set in the range of 100 Hz to 200 Hz. and the joint tracking loops have an astaticism of the 3-rd order (type 3 servo system) and an equivalent noise band of about 20 Hz. The channel DLLs have an astaticism of the 1-st order (type 1 servo system), have an equivalent noise band of about 1 Hz, and use strobed reference code signals. The channel PLLs have an astaticism of the 2-nd order (type 2 servo system). an equivalent noise band in the range of 2 Hz up to 5 Hz, and a typical discriminator with the characteristic of the form arctan(Q/I). The outputs of the channel PLLs which are provided to the joint tracking loops are blocked by respective alarm signals $S1_m$ which indicate when the quality of the satellite carrier has fallen below acceptable levels. These alarm signals have been previously described above, and take the form of fast-response angular and amplitude indicators, which can perform a quality measurement at each adjustment clock time (e.g., once every 5–10 ms). Each channel also has an inertial amplitude indicator with an accumulation period of 250 ms which measures the signal-to-noise ratio of the satellite carrier signal. The inertial amplitude indicator generates a corresponding alarm signal $S2_m$, which indicates a loss or fade of the satellite carrier signal and is used to open the feedback loops of the PLL and DLL circuits when the alarm signal is active. The alarm signals $S1_m$ and $S2_m$, together with the measured full phase and the signal-to-noise ratio in the channel, are provided to cycle-slip detection and correction unit 200.

In the model, rover movements with accelerations of up to 1.5 g are simulated. The acceleration affects the rover position as well as the frequency shift of the rover's reference generator (a quartz oscillator is modeled). In addition, a systematic frequency drift of up to 5 Hz to 10 Hz in the generator's oscillator due to instability is simulated, and random fluctuations in the oscillator due to vibrations in the band of up to 2 kHz with full dispersion of up to 100 $g^2$ are also simulated. In the channels of the receiver, independent noise sources with energy potentials from 50 dB·Hz to 40 dB·Hz are also simulated. In specific test intervals of time, a reflected signal with the relative amplitude of up to 70% (0.7) of the direct-signal amplitude and Doppler frequency of up to 10 Hz is simulated. The blockage of a direct satellite signal by local objects is also simulated.

As a general rule, the blockage results in the cycle slip of the PLL circuit, which ends with the establishment of the PLL circuit at a new steady balance point, after which the tracking of the satellite carrier signal resumes. Typical results from the simulation are shown in the graphs of FIGS. 6–9. In one test experiment, two of the eight satellite signals were simultaneously blocked. The blocked signals were being tracked in channels No. 7 and No. 8. In channel No. 8, the blockage lasted for 6 seconds (from 3.1 seconds to 9.1 seconds). and in channel No. 7 the blockage lasted 0.3 seconds (from 3.1 seconds to 3.4 seconds). Simultaneously with the blockage, a reflected signal appears in each of channels No. 7 and 8 with a relative amplitude of 0.7 in relation to the direct signal and with a Doppler shift of 4 Hz. Such a scenario simulates the passage of the rover between two high local objects, one of which blocks both satellite signals, and the second of which produces the reflected signals. It was supposed that the initial rover position is determined with an error of 10–20 m, which results in an error in the baseline computation and, as a consequence, results in the presence of systematic variations in the residuals $\Delta\phi_{i,m}$ of the single phase differences in all of the channels.

As the result of the blockage in channel No. 8, a cycle slip with a duration of about 6 seconds and a value of 20.5 cycles occurred. In the plots of FIGS. 6, 7, and 8, the values of residuals of the single phase differences are given. For a more clear presentation of the results, the amount of phase variation due to the rover movement has been subtracted out form the plotted results.

In curve (a) of the plot of FIG. 6, we have shown the single phase difference residual $\Delta\phi_{i,8}$ of the 8-th channel, and one can clearly see the process of the cycle slip in the 8-th channel in the interval between 3 and 9 seconds. The rate of the cycle slip is about 3.4 cycles per second, whereas during the intervals of normal tracking before and after, the residual $\Delta\phi_{i,8}$ changes monotonically with a rate of 0.2 radians/second. The slow change during normal tracking is caused by a systematic error arising from an error in the initial computation of the rover's position. Curve (b) in FIG. 6 shows the process of the variation in the corrected residual $\Delta\phi_{i,8}^C$ before, during, and after the cycle slip. It can be seen that the correction has removed consequences of the cycle slip from the corrected residual $\Delta\phi_{i,8}^C$. and that it has a time-average rate of change of 0.2 radians/second due to the systematic error. To better show the correction process on the corrected residual $\Delta\phi_{i,8}^C$, we have shown an expanded view of curve (b) in FIG. 7, where the vertical scale has been expanded. (A portion of curve (a) is also shown in FIG. 7.) Here it is seen that during the cycle slip, the value of $\Delta\phi_{i,8}^C$ has an error which oscillates in the range of approximately ±1.5 radians, with the oscillations being caused by the correction process. It is apparent that on the interval from 3 seconds to 9 seconds, the measurements from the 8-th channel should be excluded from the computation of the baseline vector. This is accomplished by the activation of the missing observation signal $S_{A,8}$ (e.g., $S_{A,8}$=0). For performing the ambiguity resolution, it is possible to use the measurements from the 8-th channel during the time interval before the cycle slip (0–3 seconds), and during the time interval after the cycle slip (9–20 seconds) in the computation of the baseline vector.

In curve (a) of the plot of FIG. 8, we have shown the single phase difference residual $\Delta\phi_{i,7}$ in channel No. 7, as received in the same experiment as used for obtaining the results of channel No. 8. A relatively short cycle slip of one cycle is observed here. An undershoot spike at the end of the cycle slip can be seen in the plot, and is caused by the transient response of the PLL circuit when it locked onto the new steady balance point. The corrected residual $\Delta\phi_{i,7}^C$ for channel No. 7 is shown in curve (b) of FIG. 8. It is seen from comparison of the curves (b) in FIGS. 7 and 8 that two cycle slips occurred in two channels in the time interval between 3 and 4 seconds, and that both cycle slips were corrected simultaneously. The measurements in channel No. 7 are excluded from the process computing the baseline vector by the signal $S_{A,7}$=0 in the time interval from 3.1 to 4.62 seconds, which completely covers the range with large errors. The start of the activation of alarm signal $S_{BL,7}$=0 at 3.0 seconds was caused by a short pulse of the fast-response alarm indicator in channel No. 7 which generates alarm signal $S1_7^R$=0. The timer for delay $T_1$ was then set to maintain signal $S_{A,7}$ in an active state for at least 1 second, as described above. After the initial activation of signal $S_{A,7}$ ($S_{A,7}$=0), four stepwise changes occurred in the correction, each of which restarted the timer for delay $T_1$. The process of generating the corrections $\Delta\phi_i.^C$ in channel No. 7 is illustrated in the plot of FIG. 9. Here it is seen, that the first step in the correction occurred at 3.3 seconds, and that further steps occurred in short intervals thereafter, smaller than the time of delay $T_1$=1 second. The last change in the correction took place at 3.62 seconds, when the transient was finished (i.e., when the cycle-slip was completed). Within 1 second ($T_1$) of the last change to the correction, channel No. 7 again was included into the computation of the baseline vector and the final value of the correction was fixed at $2\pi$ radians (corresponding to one cycle). Thus, the proposed system of detection and correction of phase cycle slips eliminates abnormal mistakes caused by a cycle slip and reduces the time required for the resolution of the ambiguity, and as a consequence, prevents loss of the accumulated navigational information due to the random occurrence of a cycle slip.

Use of Different Coordinate Systems.

As is known in the global positioning art, there are a number of spatial coordinate systems for representing the position of an object in three dimensions. The most commonly used coordinate systems are the Cartesian system, Earth-centered Earth-fixed (ECEF) system, geodesic system, and topocentric system. Some of these systems are variants of the Cartesian system. Once the coordinate system is selected for the receiver, the mathematical expression for computing the distance $D_{i,m}$ between a visible satellite (m) and the antenna at the i-th time moment may be determined. From this expression, first three elements of the m-th row of the Jacobian matrix $H_i^\Phi$ are the set of mathematical derivatives of the distance $D_{i,m}$ with respect to the antenna coordinates (generally indicated herein as: x, y, and z). The first three elements of the m-th row of $H_i^\Phi = (\partial D_{i,m}/\partial x, \partial D_{i,m}/\partial y, \partial D_{i,m}/\partial z )$. Thus, the matrix elements of $H_i^\Phi$ are representative of the changes in the distance $D_{i,m}$ that would be caused by changes in the antenna's position in the selected coordinate system. The fourth element in the m-th row of $H_{i\phi}$ is conventionally the mathematical derivatives of the distance $D_{i,m}$ with respect to receiver's clock offset $\tau_i$, as scaled by the speed of light c (i.e., with respect to $c \cdot \tau_i$). This element is conventionally set to a value of 1 for all of the rows.

C. Ambiguity Resolution Unit.

The ambiguity resolution task comprises the following three main parts:

1. Generation of the floating ambiguity estimations.
2. Generation of the integer ambiguities.
3. Formation of a signal of integer ambiguities resolution.

The third invention of the present application pertains to the first part, that of generating the floating ambiguity estimates. The second and third parts may be accomplished by apparatuses and methods well known in the art. The apparatuses and methods of our third invention use as an input data:

a) the pseudo-ranges and full phase measurements obtained in the Base and Rover receivers;
b) the satellites coordinates (which are highly predictable can be readily determined from the GPS time and information provided in the 50 Hz low-frequency information signal by methods well known to the art);
c) the estimated coordinates of the Base and Rover stations (as measured at their antennas); and
d) the weight coefficients characterizing the accuracy of the measurements.

According to the input data, a vector of observations and a covariance matrix of measurements are formed. After that a state vector is generated, components of which are floating ambiguities, the number of which is equal to the number of satellites. On the basis of the floating ambiguity values, a search of the integer ambiguities is performed with use of a least squares method which is modified for integer estimations.

Improvement of the floating ambiguity estimations takes place step-by-step, and the probability of correct ambiguity resolution increases step-by-step as information is accumulated. Finishing of this process is registered by appearance of the signal of integer ambiguities resolution, which indicates that ambiguity resolution was performed sufficiently safely. After that, the integer ambiguities together with other input data are used for accurate determination of the base line vector. The tasks of determining the integer ambiguities and of generating the signal of integer ambiguities resolution are known to the art and do not form part of our third invention. These tasks, therefore, are not described in greater detail.

All computations in the floating ambiguity resolution unit are performed with clock interval $T_J$ which is selected with taking into account user's requirements and capacity of the used processor. A typical value of $T_J$ is within 0.1–1.0 sec. In the RTP mode, the frame duration in the communication line may exceed required clock interval $T_J$. In this case, extrapolation of information parameters transmitted from Base station is used, e.g., by the apparatuses and methods of our first invention described in section A. Full phase measurements may be corrected for cycle slips, e.g., by the apparatuses and methods according to the second invention of the present application described in section B.

In our third invention, recurrent processing procedures for obtaining the floating ambiguity estimations, based on the method of least squares, are used. The procedures are suitable both for the RTP mode and for the PP mode under movable Rover, where the Rover coordinates may be random and independent in adjacent clock moments. For statistic measurements, when it is known that Rover is immovable, procedures enabling one to decrease processor load and increase measurements accuracy are provided.

A common feature of the proposed procedures of our third invention is that for every clock j-th) time moment ($t_j = j \cdot T_J$, where j=1, 2 . . . )joint processing of the code and phase measurements is performed for all satellites simultaneously. The obtained floating ambiguity estimations are accumulated in time and improved step-by-step.

In the discussion of this invention, we will be working mostly with vector forms of the information parameters, thus we have omitted the use of satellite index m for the most part.

C.1. The First Recurrent Procedure for Determining the Float Ambiguity Estimations.

We start this discussion with rewriting equation (18), which has the integer ambiguities $N^m$ in vector form:

$$\phi^B_i(T_i) - \phi^R_i(T_i) = \Lambda^{-1} \cdot (D^B_i - D^R_i) + f_S \cdot (\tau_i^B - \tau_i^R) + N + (\phi'^B_0 - \phi'^R_0) - (\zeta_{\phi i}^B - \zeta_{\phi i}^R),$$

where $\Lambda^{-1}$ is a diagonal matrix of inverse wavelengths. We note that the components of $(\phi'^B_0 - \phi'^R_0)$ can be selected to be integer constants, and can therefore be incorporated into the integer ambiguities N. Thus, we may simplify the above equation:

$$\phi^B_i(T_i) - \phi^R_i(T_i) = \Lambda^{-1} \cdot (D^B_i - D^R_i) + f_S \cdot (\tau_i^B - \tau_i^R) + N - (\zeta_{\phi i}^B - \zeta_{\phi i}^R)$$

Our approach comprises solving the above equations to find an estimation for vector N. However, we cannot readily find measured values for vectors $\tau_i^B$, $\tau_i^R$, $\zeta_{\phi i}^B$, and $\zeta_{\phi i}^R$, and we have some errors in the range vectors $D^B_i$ and $D^R_i$. Our approach is to represent (model) the errors in the range vectors $D^B_i$ and $D^R_i$ and the terms $f_S \cdot (\tau_i^B - \tau_i^R) - (\zeta_{\phi i}^B - \zeta_{\phi i}^R)$ by the following error vector: $\Lambda^{-1} \cdot H_j^\gamma \cdot [\Delta x, \Delta y, \Delta z, c \cdot \Delta \tau]^T$, where $H_j^\gamma$ is the Jacobian matrix (e.g., directional cosine matrix), and where $[\Delta x, \Delta y, \Delta z, c\cdot\Delta\tau]^T$ are corrections to the baseline coordinates and clock offsets of the receivers. Thus, we will model the above equation as:

$$(\phi_j^R - \phi_j^B) - \Lambda^{-1}(D_j^R - D_j^B) = N + \Lambda^{-1} \cdot H_j^\gamma \cdot [\Delta x, \Delta y, \Delta z, c\cdot\Delta\tau]^T$$

We will use the pseudoranges to find the vector $H_j^\gamma \cdot [\Delta x, \Delta y, \Delta z, c\cdot\Delta\tau]^T$ as follows:

$$(\gamma_j^R - \gamma_j^B) - (D_j^R - D_j^B) = H_j^\gamma \cdot [\Delta x, \Delta y, \Delta z, c\cdot\Delta\tau]^T$$

This will be done through use of the least squares method, and the formation of observation vectors, state vectors, and observation matrices, as described below in greater detail. Once the estimation of vector N is found, it will be accumulated and processed to find accurate estimates for the floating ambiguities.

Generation of the Vector of Observations.

In our first general recurrent (i.e., iterative) procedure, a vector of observations $\mu_j$ is generated at each clock time moment $t_j = j \cdot \Delta T_j$ and comprises $2 \cdot n$ components, where n is the number of the satellite channels. The first n components are the residuals of the single differences of the Base and Rover pseudo-ranges, which we denote in vector form as $\Delta\gamma_j$:

$$\Delta\gamma_j = \gamma_j - D_j$$

with $\gamma_j = \gamma_j^R - \gamma_j^B$, and $D_j = D_j^R - D_j^B$, and where $\gamma_j^R$ and $\gamma_j^B$ are vectors containing the pseudo-ranges of the satellites, measured in the Base and Rover receivers, respectively; and $D_j^R$ and $D_j^B$ are vectors of the estimated ranges of the satellites from Base and Rover stations at the moment of j-th signal radiation.

The next n components of the observation vector $\mu_j$ are the residuals of the single differences of the Base and Rover full phases ($\Delta\phi_j$), which we indicate here in vector form:

$$\Delta\phi_j = \phi_j - \Lambda^{-1} \cdot D_j$$

where $\phi_j = \phi_j^R - \phi_j^B$;

$\phi_j^R$ and $\phi_j^B$ are vectors of the full phases of the given satellite signal, measured at the Base and Rover receivers, respectively (the phases are measured in cycles); and $\Lambda^{-1}$ is a diagonal matrix of inverse wavelengths, where each diagonal component corresponds to a channel and is equal to $1/\lambda$, where $\lambda$ is the wavelength of the carrier signal in the given channel.

The full phase vectors $\phi_i^B$ and $\phi_i^R$ may be constructed in the form provided by equation (5):

$$\phi_i^B(T_i) = f_{p,nom} \cdot (T_i - T_p^B) - \phi_{i,NCO}^B(T_i),$$

$$\phi_i^R(T_i) = f_{p,nom} \cdot (T_i - T_p^R) - \phi_{i,NCO}^R(T_i),$$

or may be constructed in the form which includes the phase offsets of the base receiver:

$$\phi_i^B(T_i) = [f_{p,nom} \cdot (T_i - T_p^B) - \phi_{i,NCO}^B(T_i)] - \phi'_0^B,$$

$$\phi_i^R(T_i) = [f_{p,nom} \cdot (T_i - T_p^R) - \phi_{i,NCO}^R(T_i)] - \phi'_0^R.$$

In either case, we will use the convention practice and have the base receiver correct its clock so that the base time $T_i$ will be equivalent to the GPS time $t_k$ for the purposes of implementing our inventions (the time offset has already been accounted for in the above equations). For all practical purposes, times $T_i$ and $t_k$ will refer to the same processing time increment, and can be interchanged in the above equations.

Generation of the Measurements Covariance Matrix.

Measurements covariance matrix $R_J$ is formed in the following way on the basis of weight coefficients obtained in Base and Rover receivers:

$$R_j = \begin{bmatrix} R_j^\gamma & 0 \\ 0 & R_j^\varphi \end{bmatrix},$$

where 
$$R_j^\gamma = \begin{bmatrix} (K_{j,1}^\gamma)^{-1} & 0 & \cdots & 0 \\ 0 & (K_{j,2}^\gamma)^{-1} & \cdots & 0 \\ \vdots & \vdots & \ddots & \vdots \\ 0 & 0 & \cdots & (K_{j,n}^\gamma)^{-1} \end{bmatrix}, \text{ and}$$

$$R_j^\varphi = \begin{bmatrix} (K_{j,1}^\varphi)^{-1} & 0 & \cdots & 0 \\ 0 & (K_{j,2}^\varphi)^{-1} & \cdots & 0 \\ \vdots & \vdots & \ddots & \vdots \\ 0 & 0 & \cdots & (K_{j,n}^\varphi)^{-1} \end{bmatrix}.$$

The weight coefficients $(K_{j1}^\gamma, K_{j2}^\gamma, \ldots, K_{jn}^\gamma)$ characterize the accuracy of the measurements of the residuals $\Delta\gamma_j$ of the pseudo-range single differences for the corresponding satellite channels (1-st, 2-nd ... n-th). Each of these coefficients is determined according to the weight coefficients measured in each channel by Base and Rover receivers for the pseudo-ranges, i.e., by values $K_j^{\gamma B}$, $K_j^{\gamma R}$.

Thus, for example, for the n-th channel $$(K_{jn}^\gamma)^{-1} = (K_{jn}^{\gamma B})^{-1} + (K_{jn}^{\gamma R})^{-1},$$

where $K_{jn}^{\gamma B}$, $K_{jn}^{\gamma R}$ are determined taking into account the measured signal-to-noise ratio in the receivers and the satellite elevation angles in the n-th channel (of Base and Rover, respectively) in the manner that was described earlier in section A (for determining weight coefficient $K_K$). Specifically, for each of the receivers (no superscript used), $$K_{j,m}^\gamma = Z_{k,m}^2 \cdot \sin(\xi_{k,m} - \xi_{min}) \cdot \sigma_\gamma^2 \text{ when } \xi_{k,m} > \xi_{min}, \text{ and}$$

$$K_{j,m}^\gamma = 0 \text{ when } \xi_{k,m} \leq \xi_{min},$$

where $Z_{k,m}^2$ is the signal strength of the m-th satellite carrier signal as received by the receiver (it has been normalized to a maximum value and made dimensionless), where $\xi_{k,m}$ is the elevation angle of the m-th satellite as seen by the receiver, where a minimum elevation angle $\xi_{min}^B$ at which the signal becomes visible at the receiver, where $\sigma_\gamma^2$ is the variance of the code measurements ($\sigma_\gamma \approx 1$ m). The factor $Z_{k,m}^2 \cdot \sin(\xi_{k,m} - \xi_{min})$ is dimensionless.

Weight coefficients $K_{j1}^\Phi, K_{j2}^\Phi, \ldots K_{jn}^\Phi$ characterize the accuracy of the measurements of the residuals $\Delta\phi_j$ of the phase single differences, and are determined similarly. Here the same input data is used: the signal-to-noise ratio and the angle of elevation, but another scale for the phase measurements is considered (e.g., $\sigma_\phi^2$ instead of $\sigma_\gamma^2$). Specifically for each of the receivers (no superscript used), $$K_{j,m}^\Phi = Z_{k,m}^2 \cdot \sin(\xi_{k,m} - \xi_{min}) \cdot \sigma_\phi^2 \text{ when } \xi_{k,m} > \xi_{min}, \text{ and}$$

$$K_{j,m}^\Phi = 0 \text{ when } \xi_{k,m} \leq \xi_{min},$$

where $Z_{k,m}^2$, $\xi_{k,m}$ and $\xi_{min}^B$ are as they are above, and where $\sigma_\phi^2$ is the variance of the code measurements ($\sigma_\phi \approx 1$ mm).

When the magnitudes of either of weight coefficients $K_{j,m}^{\gamma B}$ or $K_{j,m}^{\gamma R}$ is less than a first selected small threshold value, the value of $K_{j,m}^{\gamma}$ is generated as a first small number which is less than the first threshold value. This is equivalent to setting $(K_{j,m}^{\gamma})^{-1}$ to a large number equal to the inverse of the first small number. Similarly, When the magnitudes of either of weight coefficients $K_{j,m}^{\Phi B}$ or $K_{j,m}^{\Phi R}$ is less than a second selected small threshold value, the value of $K_{j,m}^{\Phi}$ is generated as a second small number which is less than the second threshold value. This is equivalent to setting $(K_{j,m}^{\Phi})^{-1}$ to a large number equal to the inverse of the second small number.

The elements of the covariance matrix $R_j$ corresponding to the channels which should be excluded from processing (by the signal "observation absence") are replaced by very large number. The very large number is selected in advance, and has a value which exceeds by several orders of magnitude the nominal values of the covariance matrix components $(K_j^{\gamma})^{-1}$ or $(K_j^{\Phi})^{-1}$ encountered during operation. Consequently, in further computations, the weights of all measurements relating to these channels become so small that they do not influence the result.

Determination of the State Vector Estimation.

The state vector $A_j$ in the first recurrent procedure of our third invention comprises (4+n) components. The first three components are increments ($\Delta x$, $\Delta y$, $\Delta z$) to the coordinates (x, y, z) of the base vector unknown at the j-th clock moment, the fourth component is the unknown increment of the reference oscillator phases($c \cdot \Delta \tau$). The remaining n components are the unknown floating ambiguities, different in different channels ($N^1$, $N^2$ ... $N^n$).

2n equations (according to the number of components of the observation vector)) may be used to determine the state vector $A_j$ at the j-th clock moment (i.e., to determine 4+n unknown values). Solution of such a system of equations at $n \geq 4$ is performed by the method of least squares.

Since the vector of observations $\mu_j$ contains only the corrections to the estimated values, the system of equations is linearized and may be expressed in the form of $$\mu_j = H_j^{\mu} \cdot A_j,$$

where the observation matrix $H_j^{\mu}$ specifies the relationship between the components of the observations vector $\mu_j$ and the state vector $A_j$. In this case, matrix $H_j^{\mu}$ comprises 2n rows and (4+n) columns.

Matrix $H_j^{\mu}$ may be divided into the following 4 parts (sub-matrices):

$$H_j^{\mu} = \left[ \begin{array}{c|c} H_j^{\gamma} & 0 \\ \hline \Lambda^{-1} \cdot H_j^{\gamma} & E \end{array} \right].$$

The first part, the left upper corner of this matrix (the first four columns by the first n rows), is occupied by the observation matrix $H_j^{\gamma}$ relating to the pseudo-range measurements, each row corresponding to one channel (from the 1-st to the n-th). For the n-th channel, the corresponding row appears like this:

$$[\alpha_{jn}, \beta_{jn}, h_{jn}, 1],$$

where $\alpha_{jn}$, $\beta_{jn}$, $h_{jn}$ – the directional cosines of the range vector to the n-th satellite from Rover for the j-th time moment. The generation of the elements of the pseudo-range observation matrix $H_j^{\Phi}$ was previously described above in section B on our second invention of the present application.

The second part of matrix $H_j^{\mu}$, the left lower corner (the first four columns by the last n rows), is occupied by the matrix product $\Lambda^{-1} \cdot H_j^{\gamma}$ relating to the full phase measurements. each row corresponding to one channel (from the 1-st to the n-th).

For the n-th channel, the corresponding row appears like this:

$$[\alpha_{jn}/\lambda_n, \beta_{jn}/\lambda_n, h_{jn}/\lambda_n, 1/\lambda_n],$$

where $\lambda_n$ is the wavelength of the carrier signal in the n-th channel.

The third part, the right upper corner (the last n columns by the first n rows) is occupied by zeroes.

The fourth part, the right lower corner, (the last n rows by the last n columns) is occupied by the elements relating to the floating ambiguities. This part represents the identity matrix E with dimensions of n×n.

The method of least squares gives an estimation $\hat{A}_j$ of the state vector $A_j$ in the form of $$\hat{A}_j = [(H_j^{\mu})^T \cdot R_j^{-1} \cdot H_j^{\mu}]^{-1} \cdot (H_j^{\mu})^T \cdot R_j^{-1} \cdot \mu_j$$

(here and further upper index T means matrix transposition, upper index −1 means matrix inversion).

Determination of the Float Ambiguity Vector Estimation.

From the obtained estimation vector $\hat{A}_j$ of the state vector, only those components are extracted which relate to the ambiguity (but not the components related to the base vector coordinates or to the frequency drift of the reference oscillator). The selected components form a preliminary estimation vector $\tilde{N}_j$ of the floating ambiguity vector (this vector has n components).

As the next step, a main estimation vector $\hat{N}_j$ of the floating ambiguity vector is generated as a weighted summation of the preliminary estimation vector $\tilde{N}_j$ and the value of the main estimation vector $\hat{N}_{j-1}$ generated at the previous clock moment $t_{(j-1)} = (j-1) \cdot \Delta T_j$. The weighted summation is generated at each clock moment $t_j = j \cdot \Delta T_j$ for j=1, 2 ..., where under j=1 it is assumed that $\hat{N}_1 = \tilde{N}_1$. Several exemplary procedures for performing the weighted summation are described below.

Exemplary Procedures for Performing the Weighted Summation.

The weighted summation of the preliminary estimation vector $\tilde{N}_j$ and main estimation vector $\hat{N}_{j-1}$ may be performed by different methods. The first exemplary method which we disclose here is the main one, and it is suitable for arbitrary observation time. In this first method, we first generate a covariance matrix $\mathfrak{R}_j$ for the estimation vector $\hat{A}_j$ of the state vector as follows:

$$\mathfrak{R}_j = [(H_j^{\mu})^T \cdot R_j^{-1} \cdot H_j^{\mu}]^{-1}.$$

We then generate a covariance matrix $\tilde{R}_j^N$ for the preliminary estimation vector $\tilde{N}_j$ by selecting from matrix $\mathfrak{R}_j$ only that part which relates to the floating ambiguity (e.g., the sub-matrix comprising the last n rows and last n columns of matrix $\mathfrak{R}_j$). The weighted summation is performed with taking into account the obtained covariance matrixes, and main estimation $\hat{N}_j$ is found as follows:

$$\hat{N}_j = W_j \cdot \hat{N}_{j-1} + (E - W_j) \cdot \tilde{N}_j,$$

where $W_j = \tilde{R}_j^N \cdot (\tilde{R}_j^N + R_{j-1}^N)^{-1}$ is the weight matrix, where $R_j^N = [(\tilde{R}_j^N)^{-1} + (R_{j-1}^N)^{-1}]^{-1}$ is the covariance matrix for the main estimation vector $\hat{N}_j$ of the state vector at the j-th time moment, where for j=1 we set $R_1^N = \tilde{R}_1^N$, and where E is the identity matrix.

As the weighted summation is generated through successive time moments, information at the current time is accumulated with information at previous time moments, and as a result the components of the main estimation vector $\hat{N}_j$ of the floating ambiguities become more accurate with time. The accumulation process of the summation reduces the effects of measurement errors. The motion of the satellites over the accumulation period enables the method to generate many preliminary estimation vectors $\tilde{N}_j$, each having a different sets of pseudo-ranges and computed distances but having the same integer ambiguity.

A second exemplary method for generating the weighted summation is simplified, and is suitable for small observation intervals $T_S$ in the range of 10 to 20 seconds, and more typically in the range of 8 to 10 seconds. In this method, weight matrix $W_j$ is not generated. which reduces processor load. The main estimation vector is generated as $$\hat{N}_j = \frac{j-1}{j} \cdot \hat{N}_{j-1} + \frac{1}{j} \cdot \tilde{N}_j.$$

In the simplified weighted summation, the vector components corresponding to those channels which should be excluded from further processing according to the signal "Observation missing" are excluded from vectors $\hat{N}_{j-1}$ and $\tilde{N}_j$.

An exemplary third method combines the first and second methods. Over an integer number Ks of time moments $t_l$, as indexed by index l, the second method is used to generate main estimation vectors $\hat{N}_l$ from preliminary estimation vectors $\tilde{N}_l$ according to the second method as follows:

$$\hat{N}_l = \frac{l-1}{l} \cdot \hat{N}_{l-1} + \frac{1}{l} \cdot \tilde{N}_l,$$

where Ks is greater than one, where adjacent time moments l are separated by the interval $\Delta T_J$, and where $\hat{N}_l = \tilde{N}_l$ for l=1. At the end of the Ks-th time moment (l=Ks), an intermediate estimation vector $\hat{N}_k^*$ of the float ambiguity vector is generated as $\hat{N}_k^* = \hat{N}_{Ks}$, which will be used by the first method to generated a final estimation vector. The index l is reset to zero (l=0), and second method is repeated in the same manner for the next Ks consecutive time moments, which will generate the next intermediate estimation vector $\hat{N}_{k+1}^*$ as $\hat{N}_{k+1}^* = \hat{N}_{Ks}$. The second method is continually repeated in this manner to generated successive intermediate estimation vectors at periodic time intervals $\Delta T_S = Ks \cdot \Delta T_J$, where $\Delta T_S$ is preferably in the range of 10 to 20 seconds. For each intermediate estimation vector $\hat{N}_k^*$, a corresponding covariance matrix $\check{R}_k^N$ is generated by a recurrent procedure which we describe next. During the interval l=1 to l=Ks over which the intermediate estimation vector is being generated, a temporary covariance matrix $\mathfrak{R}_l^*$ is determined by the following recurrent procedure:

$$\hat{R}_l^* = \frac{l-1}{l} \cdot \hat{R}_{l-1}^* + \frac{1}{l} \cdot \tilde{R}_l^N,$$

where $\mathfrak{R}_l^* = \tilde{R}_l^N$ for l=1. The covariance matrix $\tilde{R}_j^N$ is generated from the covariance matrix $\mathfrak{R}_j = (H_j^T \cdot R_j^{-1} \cdot H_j)^{-1}$ described above by selecting from the covariance matrix $\mathfrak{R}_j$ only that part which relates to the floating ambiguity (e.g., the sub-matrix comprising the last n row and last n columns of matrix $\mathfrak{R}_j$). At the end of the Ks-th time moment, the desired covariance matrix $\check{R}_k^N$ is generated as:

$$\check{R}_k^N = \frac{R_{Ks}^*}{Ks}.$$

The weighted summation according to the first method is performed on the intermediate estimation vectors $\hat{N}_k^*$, $\hat{N}_{k+1}^*$, etc., taking into account the weight matrixes $\check{R}_k^N$, $\check{R}_{k+1}^N$, etc., to generate the main estimation vectors $\hat{N}_k$, $\hat{N}_{k+1}$, etc., of the floating ambiguity at clock moments $t_k = k \cdot \Delta T_S$ as follows:

$$\hat{N}_k = W_k \cdot \hat{N}_{k-1} + (E - W_k) \cdot \hat{N}_k^*,$$

where $W_k = \check{R}_k^N \cdot (\check{R}_k^N + R_{k-1}^N)^{-1}$,
$R_k^N = [(\check{R}_k^N)^{-1} + (R_{k-1}^N)^{-1}]^{-1}$, (for k=1, we set $R_1^N = \check{R}_1^N$).

The third method enables one to combine advantages of the second simplified method (which does not require frequent inversions of non-diagonal matrixes having large dimensionality) and the first main method which does not limit the observation time. It is apparent that in the third method the floating ambiguity estimations and, hence, the accurate estimations of the base vector will be provided with the longer time interval of $\Delta T_S$.

It may be appreciated that equivalent results in the solution process are obtained by exchanging the block matrix rows of the observation matrix $H_j^\mu$, exchanging the sub-vectors $\Delta \gamma_j$ and $\Delta \phi_j$ of the observation vector $\mu_j$, and exchanging the sub-matrices $R_j^\Phi$ and $R_j^\gamma$ of matrix $R_j$. Also, equivalent results in the solution process are obtained by exchanging the block columns of the observation matrix $H_j^\mu$, and exchanging the sub-vectors $[\Delta x, \Delta y, \Delta z, c \cdot \Delta \tau]^T$ and $N_j$ of the estimated state vector $\hat{A}_j$. This second set of exchanges may be done alone or in combination with the first set of exchanges.

Features of the First Recurrent Procedure at Kinematic and Static Operating Modes.

We use the term "the kinematic mode" to describe the operating mode where the Rover is moving, and its coordinates between adjacent clock moments is considered to be random and independent. In such a movement model, it is impossible to predict the Rover position for the j-th time moment, knowing its position at previous time moments. Therefore the Rover coordinates are determined at every moment again and are not improved in the long run by the use of accumulation.

We use the term "the static mode" to describe the operating mode where the Rover is immovable, and its coordinates are constant but unknown and are subject to determination. The coordinates of the immovable Rover are improved in the long run as information is accumulated. The above described first recurrent procedure is applicable to both the static and kinematic modes, since it provides for gradual accumulation of information about only the floating ambiguity estimations, which are constant in both modes. However, if it is known that the mode is static, it is possible to improve results at the expense of performing an additional accumulation of information about the Rover coordinates. This can be done by modifying the first recurrent procedure as we describe below, the essence of which comprises the expansion of the components of vector $\hat{N}_j$.

In the static mode, a vector $\tilde{B}_j$ is obtained from state vector $\hat{A}_j$, from which in this case it is necessary to extract not only the components relating to the floating ambiguity, but the three increments to the coordinates of the base vector as well. Thus, only the component in vector $\hat{A}_j$ for the phase drift of the main oscillators is not used. In this case, vector $\tilde{B}_j$ contains n+3 components and, strictly speaking, cannot be called the "floating ambiguity estimation vector". We will therefore call it "the augmented estimation vector." Further operation of the recurrent procedure is according to either the first or third methods of generating the weighted summation which we described above, with the substitution of $\tilde{B}_j$ for $\tilde{N}_j$, $\hat{B}_j$ for $\hat{N}_j$, and $\hat{B}_{j-1}$ for $\hat{N}_{j-1}$ and with the expansion of the covariance matrices $\tilde{R}_j^N$ to include the components of covariance matrix $\mathfrak{R}_j$ related to the coordinate increments as well as the components related to the floating ambiguities. The modified process is finished by extracting the main estimation of the floating ambiguity vector from the augmented estimation vector $\hat{B}_j$.

Under such change of the first recurrent procedure, the accuracy of floating ambiguity increases more rapidly in time, and the time necessary for obtaining a reliable ambiguity resolution is reduced.

Another difference of the static and kinematic modes relates to the method of generating the observations vector $\mu_j$ and observations matrix $H_j$. As it was mentioned above, the generation of vector $\mu_j$ and matrix $H_j$ uses the estimated values of the range vectors $D_j^B$ and $D_j^R$ as input. Since the Base station is immovable and since the Base coordinates are known, the components of vector $D_j^B$ change only because of the movements of the satellites, which are considered to be known, and hence it is possible to determine vector $D_j^B$ for every j-th moment with sufficient accuracy.

In the static mode, the Rover coordinates are constant, but have unknown accuracy, at the beginning of the observation. Therefore, for initial range determination, the prior values of the Rover's coordinates are used, which are known, as a rule, with a large error. This error rapidly decreases when pseudo-range measurements are introduced into the processing. In fact, already after several clock intervals $T_j$, the accuracy is found to be sufficient for the linearization of the system of navigation equations and for the estimation of the directional cosines (which are components of matrix $H_j$). Further improvement of the Rover coordinates for determining vectors $\mu_j$ and $H_j$ in the static mode is not needed. In the static (stationary) mode, the same geometric Jacobian matrix $H_j^\gamma$ may used for a plurality of discrete time moments j.

In the kinematic mode, the Rover coordinates change, therefore the estimated range vector $D_j^R$ for the Rover should be recomputed at every processing time interval $\Delta T_j$, taking into account the movements of both the satellites and the Rover. This may be done by using, a stand-alone solution for the rover's position using only rover's measured navigation parameters (just the rover). It may also be done updating the values of the vector $D_j^R$ which holds the estimated distances between the satellites and the rover receiver) on the basis of the set of baseline estimation corrections $[\Delta x, \Delta y, \Delta z, c \cdot \Delta \tau]^T$ found from matrix $\hat{A}_{j-1}$ at the previous time moment j-1. The geometric Jacobian matrix $H_j^\gamma$ may also be updated by either of the above methods. These updates may also be done in our second recurrent procedure, which is described below.

C2. The Second Recurrent Procedure for Determining the Float Ambiguity Estimations.

In our second general recurrent procedure for determining the float ambiguities, two separate vectors of observations are formed: a pseudo-range observations vector $\mu_j^\gamma$ and a phase observations vector $\mu_j^\Phi$. Two corresponding state vectors are also formed, state vector $A_j^\gamma$ and state vector $A_j^\Phi$.

Observations vector $\mu_j^\gamma$ for the second recurrent procedure is generated at each time moment $T_j$, and comprises n components which represent the residuals of the single differences of the Base and Rover pseudo-ranges (vector $\Delta\gamma_j$). These differences are determined in the same way as in our first general recurrent procedure, the covariance matrix $R_j^\gamma$ of the measurements for the second recurrent procedure is generated in the same way as the corresponding matrix in the first recurrent procedure.

The observations vector $\mu_j^\Phi$ is also generated at each clock time moment $T_j$ and contains n components which represent the residuals of the single differences of the Base and Rover phases (vector $\Delta\phi_j$). These components, as well as covariance matrix $R_j^\Phi$, are determined in the same way as in the first recurrent procedure.

Determination of the State Vector Estimation According to the Pseudo-range Measurements.

State vector $A_j^\gamma$ in the second recurrent procedure contains 4 components. The first three are the unknown increments ($\Delta x, \Delta y, \Delta z$) to the coordinates ($x, y, z$) of the baseline vector at the j-th clock, and the fourth component ($c \cdot \Delta \tau$) is the unknown increment of the reference oscillator phase.

n equations (according to the components number in vector of observations $\mu_j^\gamma$) are used for determining the state vector $A_j^\gamma$. Solution of the system of equations under n>4 is performed by the method of least squares.

The linearized system of equations is expressed as $$\mu_j^\gamma = H_j^\gamma \cdot A_j^\gamma,$$

where the observations matrix $H_j^\gamma$ corresponds to the first part of matrix $H_j^\mu$ used in the first recurrent procedure.

The method of least squares gives an estimation of the 4-component state vector in the form of:

$$\hat{A}_j^\gamma = [(H_j^\gamma)^T \cdot (R_j^\gamma)^{-1} \cdot H_j^\gamma]^{-1} \cdot (H_j^\gamma)^T \cdot (R_j^\gamma)^{-1} \cdot \mu_j^\gamma.$$

Determination of the Estimation of the Float Ambiguity Vector.

The obtained estimation state vector $\hat{A}_j^\gamma$, being based on pseudo-range measurements. enables one to find a desired value of the phase observations vector in the form of the estimation state vector $\hat{\mu}_j^\Phi$. Estimation vector $\hat{\mu}_j^\Phi$ of the phase observations vector is a vector containing n components and is determined as:

$$\hat{\mu}_j^\Phi = H_j^\Phi \cdot \hat{A}_j^\gamma,$$

where $H_j^\Phi = \Lambda^{-1} \cdot H_j^\gamma$.

It is then possible to determine a preliminary estimation vector $\tilde{N}_j$ of the floating ambiguity vector as a difference between the measured vector of the phase observations $\mu_j^\Phi$ and its estimation $\hat{\mu}_j^\Phi$ as follows:

$$\tilde{N}_j = \mu_j^\Phi - \hat{\mu}_j^\Phi.$$

The main estimation vector $\hat{N}_j$ of the float ambiguity vector is generated by a weighted summation of the preliminary estimation vector $\tilde{N}_j$ and the main estimation vector $\hat{N}_{j-1}$ determined at the previous clock moment $t_{(j-1)}=(j-1) \cdot T_j$. All computations are repeated for every j-th clock moment under j=1, 2 . . . , where under j=1 it is assumed that $\hat{N}_1 = \tilde{N}_1$.

As well as in the first recurrent procedure, the weighted summation may be performed by any of the three methods which were described above. However, the form of the covariance matrix $\tilde{R}_j^N$ for the preliminary estimation vector ($\tilde{N}_j$) is preferably different. In the second recurrent procedure, the matrix $\tilde{R}_j^N$ is preferably generated in the following form:

$$\tilde{R}_j^N = R_j^\phi + H_j^\phi \cdot [(H_j^\gamma)^T \cdot (R_j^\gamma)^{-1} \cdot H_j^\gamma]^{-1} \cdot (H_j^\phi)^T$$

A second, and less preferred way of generating covariance matrix $\tilde{R}_j^N$ follows the method used in our first recurrent procedure. Specifically, we use the larger matrices $H_j^\mu$ and $R_j^{-1}$ to form the larger covariance matrix $\mathfrak{R}_j = [(H_j^\mu)^T \cdot R_j^{-1} \cdot H_j^\mu]^{-1}$, and we then generate covariance matrix $\tilde{R}_j^N$ by selecting from matrix $\mathfrak{R}_j$ only that part which relates to the floating ambiguities.

In the second recurrent procedure (as well as in the first), in the kinematic mode, the estimated range vector $D_j^R$ and matrices $H_j^\phi$ and $H_j^\gamma$ should be recomputed taking into account the Rover's movement. This may be done by any of the methods described above for the first recurrent procedure (stand-alone position solution, or updating the components of $D_j^R$, $H_j^\phi$, and $H_j^\gamma$ on the basis of the set of baseline corrections $[\Delta x\ \Delta y\ \Delta z\ c\cdot\tau]^T$ found at the previous time moment j−1). In the static mode, improvement of the Rover coordinates for determining the floating ambiguity is not needed.

FIG. 12 shows an exemplary schematic diagram of a general processing unit 500 which may be used to perform the first and second recurrent procedures, and their various configurations. A residual generator 510 receives the vectors $\gamma_j^B, \gamma_j^R, D_j^B, D_j^R, \phi_j^B, \phi_j^R$, and generates the residuals $\Delta\gamma_j$ and $\Delta\phi_j$, which are provided to a state vector processor 520. A first covariance generator 515 receives the weighting coefficients for the various measurements and generates covariance matrices $R_j^\phi$ and $R_j^\gamma$, which provides these matrices to state vector processor 520. Processor 520 generates the state vector from the provided information by any of the above-described procedures, and generates the state vector $\hat{A}_j$ as an output. This is provided to an accumulation processor 530 which extracts $\hat{N}_j$ or $\hat{B}_j$ from $\hat{A}_j$ and generates $\hat{N}_j$ or $\hat{B}_j$ by any of the above methods with the aid of the appropriate covariance matrices, which are provided by a second covariance matrix generator 535.

While the present inventions have been particularly described with respect to the illustrated embodiments, it will be appreciated that various alterations, modifications and adaptations may be made based on the present disclosure, and are intended to be within the scope of the present invention. While the inventions have been described in connection with what is presently considered to be the most practical and preferred embodiments, it is to be understood that the present inventions are not limited to the disclosed embodiments but, on the contrary, is intended to cover various modifications and equivalent arrangements included within the scope of the appended claims.

APPENDIX A: Measuring the Loop Bandwidths $B_1$ in the Cycle-Slip Detection and Correction Unit Given the exemplary selection of loop orders for the individual loops 260 (FIG. 2A) and common tracking system 240 (FIGS. 2A and 2B), and our recommended bandwidths and orders of astaticism for each, it is within the capabilities of those skilled in the GPS art to construct the filters for the loops. In this appendix, we provide tutorial information to those who are unfamiliar to the GPS art for determining the orders of astaticism and measuring the bandwidths of the loops so that the effect of a particular filter characteristic upon the loop order and bandwidth may be determined. The individual PLL loops 260 are discussed first. and then the loops of the common tracking system 240 are discussed.

The individual loops 260 and common tracking loops (240) of the cycle-slip detection-correction unit are discrete time systems. To make our analysis of these systems easier, we will construct equivalent "continuous-time" systems. To do this, we replace the accumulator integrators $I_1$ and $I_2$ with appropriately-scaled, continuous time integrators as follows:

$$T_I \cdot \sum_{r=1}^{k} z[r] \leftrightarrow T_I \cdot F \int_0^t z(t')dt', \quad (A1)$$

where F is the frequency of summation, "r" represents the discrete-time signal being accumulated, and "z" the equivalent continuous-time signal. In the loop filters, F is equal to the frequency $F_c$ of the processing time interval $T_I$. $F_c$ is the reciprocal of the period of time interval $T_I$, $F_c=1/T_I$, and thus we have:

$$T_I \cdot \sum_{r=1}^{k} z[r] \leftrightarrow \int_0^t z(t')dt' \quad (A2)$$

The frequency-domain operator corresponding to equation (A2) is 1/p. The relationship for a more general accumulator is $$\sum_{r=1}^{k} z[r] \leftrightarrow F \int_0^t z(t')dt', \quad (A3)$$

To begin analyzing an individual loop 260 (see FIG. 2A), we form a small-signal model of the behavior of the loop in the absence of influences from the common tracking system 240. To do this, we remove the projected estimate signal $V_{p,i,m}$ from adder 248, or set its values to zero. We then form a linear, small-signal model of the components of the individual loop, and the components that are connected to the individual loop, specifically the correction unit 220. This model is shown in FIG. 10A. Gain block 264 provides a fixed amplitude modification of $K_\Sigma$ gain, and each of integrators $I_1$ and $I_2$ provides a frequency transfer function of 1/p, where $p=j\omega=j2\pi f$. Adder 268 adds the outputs of gain block 264 and integrator $I_2$ without modification, and adder 248 passes the output of adder 268 to integrator $I_1$, which provides a frequency transfer function of 1/p. The output of integrator is provided to the inverting (−) input of summator 224 of correction unit 220, which introduces an external input signal to the loop at the non-inverting (+) input of summator 224. The output of summator 224 provides an output difference signal, which is provided to processing blocks 226 and 228 of correction unit 22. Processing blocks 226 and 228 generate the output to the individual loop 260. In a large signal view, processing blocks 226 and 228 provide a non-linear transformation between $\delta\phi_{i,m}$ and $\psi_{i,m}$. However, in an small-signal view; these blocks provide a linear transfer function having units gain. The output of these processing blocks is provided to the input of gain block 264 to complete the loop The small signal loop gain from the output of summator 224 to the inverting input of summator 224 is denoted as M(p), and is equal to:

$$M(p)=K_v\cdot(1+1/p)\cdot 1/p \text{ with integrator } I_2 \text{ in use, and} \quad (A4)$$

$$M(p)=K_v\cdot(1/p) \text{ without integrator } I_2. \quad (A5)$$

For the purposes of determining the order of astaticism of the loop, we define a transfer function $K_A(p)$ of the individual loop as the small-signal changes in the mismatch $\delta\phi_{i,m}$ denoted as $\phi_{out}$ on FIG. 10A) which are caused by small-signal changes in the input $\Delta\phi_{i,m}$ (denoted as $\phi_{inp}$ on FIG. 10A): $K_A(p)=\phi_{out}/\phi_{inp}$. Looking at the loop of FIG. 10A. we see that:

$$\phi_{out}=\phi_{inp}-M(p)\cdot\phi_{out}, \qquad (A6)$$

which may be solved for K(p) as follows:

$$K_A(p) = \varphi_{our}/\varphi_{inp} = \frac{1}{(1+M(p))}. \qquad (A7)$$

Substituting the above forms for M(p) for our specific example, we have:

$$K_A(p) = \frac{p^2}{(p^2 + K_\Sigma \cdot (p+1))} \text{ with integrator } I_2 \text{ in use, and}$$

$$K_A(p) = \frac{p}{(p+K_\Sigma)} \text{ without integrator } I_2.$$

The order of astaticism of the overall loop transfer function $K_A(p)$ is equal to the polynomial degree of "p" appearing in the numerator $K_A(p)$, with $K_A(p)$ in rational form—meaning no fractions 1/p appearing the numerator or denominator of $K_A(p)$.

For the purposes of determining the bandwidth of the loop, we define the transfer function $K_B(p)$ of the individual loop as the small-signal changes in the estimate $\Delta\hat\phi_{i,m}$ (denoted as $\phi_{out}$ on FIG. 10B) which are caused by small-signal changes in the input $\Delta\phi_{i,m}$ (denoted as $\phi_{inp}$ on FIG. 10B): $K_B(p)=\phi_{out}/\phi_{inp}$. (FIGS. 10A and 10B are identical except for the location of $\phi_{out}$.) Looking at the loop of FIG. 10B, we see that:

$$\phi_{out}=M(p)\cdot(\phi_{inp}-\phi_{out}), \qquad (A8)$$

which may be solved for K(p) as follows:

$$K_B(p) = \varphi_{our}/\varphi_{inp} = \frac{M(p)}{(1+M(p))}. \qquad (A9)$$

Substituting the above forms for M(p) for our specific example, we have:

$$K(p) = \frac{K_\Sigma \cdot (p+1)}{(p^2 + K_\Sigma \cdot (p+1))}$$

with integrator $I_2$ in use, and $$K(p) = \frac{K_\Sigma}{(p+K_\Sigma)}$$

without integrator $I_2$.

The transfer function $K_B(p)$ can be divided into a magnitude component $M_K(\omega)=|K_B(p)|$ and a phase component $\phi_K(\omega)=\text{angle}[K_B(p)]$, and related to one another as follows:

$$K_B(p)=M_K(\omega)*\exp[+j\phi_K(\omega)] \qquad (A10).$$

With $j\omega=p$. Since $\omega=2\pi f$, magnitude and phase components can equivalently be parameterized by frequency f: $M_K(f)$, $\phi_K(f)$.

The bandwidth of the PLL loop may then be determined from the transfer function $K_B(p)$ by an number of methods. We prefer using the equivalent noise bandwidth definition. $B_L$, which is provided below:

$$B_L = \frac{1}{M_K^2(f=0)} \int_0^\infty M_K^2(f) df \qquad (A11)$$

where $M_K(f=0)$ is the magnitude of the transfer function at zero frequency. The integrand is definite because the value of $M_K^2(f)$ goes to zero as f goes to infinity ($\infty$). The physical sense of bandwidth $B_L$ is as follows: the integrand $\int M_K^2(f) df$ represents the output power present at the output ($\phi_{out}$) of the PLL loop when a white noise signal having uniform spectral density from f=0 to f=$\infty$ is applied to the input ($\phi_{inp}$) of the PLL loop. The value $M_K^2(f=0)$ is the power density of the noise signal at f=0. The quantity $B_L \cdot M_K^2(f=0)$ represents the same amount of output power over the frequency interval of f=0 to f=$B_L$ as represented by the integrand if it is assumed that that the power density over this interval is at a uniform value of $M_K^2(f=0)$. In other words, $B_L$ is the bandwidth of the rectangular frequency band having a uniform power density equal to the loop's power density at f=0, and having a total power equal to the output noise power of the PLL loop. The PLL is an astatic tracking system, so its frequency response $K_B(p)$ is equal to 1 at f=0, and $M_K^2(f=0)=1$.

Measuring the Loop Bandwidths $B_L$ of the Common Loops

As we pointed out above, the bandwidths of the individual loops 260 are measured under the condition that output signals of common tracking system 240 are disconnected from the inputs of summators 248. In a contrary manner, the bandwidths of the common loops (240) are measured under the condition that the outputs of the individual loops 260 are disconnected from the inputs of summators 248. The astatic order and the bandwidth $B_L$ of a common loop can be measured, in essence, in the same way as it is described above for an individual loop 260. To simplify the analysis, we will focus on the frequency response of one of the common loops, and open the other three common loops by disconnecting the outputs of the three filters for those common loops. The one selected common loop becomes independent since all the other loops, both individual and common ones, are opened. We can further simplify the analysis by noting that we need to only find the small signal loop gain M(p) from the output of summator 224 to the inverting input of summator 224, and then we can re-use equations A6–A11 provided above in the analysis of the individual loop 260 to find the transfer functions $K_A(p)$ and $K_B(p)$.

A small-signal model may be constructed in a similar manner as previously described. The matrix operations for matrices $G_i^\Phi$ and $H_i^\Phi$ represent additional complexity. However, as it turns out, the total effective gain to the common loops from these matrices is 1. As an example, the small-signal model for the common loop for the correction to the X-coordinate is shown in FIG. 11.

We apply a phase signal $\phi^X_{inp}$ to the system which represents a correction to the baseline vector only along the axis of the X coordinate. A fraction of this signal $\phi^X_{inp}$ is provided as an input signal to each channel's cycle-slip correction units 220 at the non-inverting (+) input of summator 224. The fraction is determined by the geometry of the baseline vector and the satellite carrier signal being tracked by the channel. These fractions for the 1-st through N-th channels are given by the X-coordinate column of matrix $H_i^\Phi$ (usually the 1-st column) with the matrix element ($H_i^\Phi{}_{1,X}$) of the first row of the X-column of $H_i^\Phi$ (being the fraction for the first channel, and the matrix element ($H_i^\Phi{}_{N,X}$) in the last row of X-column of $H_i^\Phi$ being the fraction for the N-th channel. Thus, the input signal to summator 224 of the first channel is $H_i^\Phi{}_{1,X} \cdot \phi^X{}_{inp}$, and the input signal to summator 224 of the last channel is $H_i^\Phi{}_{N,X} \cdot \phi^X{}_{inp}$.

The inverting (−) input of each summator 224 receives an estimate $\Delta\hat{\phi}_{i,m}$ from a corresponding integrator $I_1$, which is driven by a corresponding output of the $H_i^\Phi$ matrix processing block 246. Since matrix $H_i^\Phi$ is only being driven by the filter output $v_x$ for the X coordinate correction (because all of the other common loops are disconnected), the outputs of processing block 246 will be proportional to the X column of matrix $H_i^\Phi$. Since all the integrators $I_1$ are the same, and since the X-column of matrix $H_i^\Phi$ only has scalar values (no phase variation), the small-signal outputs from integrators $I_1$ have the same phase, and have magnitudes which follow the fractions specified by the X-column of matrix $H_i^\Phi$. In other words, we may represent the small-signal output of the integrator $I_1$ for the k-th channel as $H_i^\Phi{}_{k,X} \cdot \phi^X{}_{est}$, where $\phi^X{}_{est}$ is the same for all of the channels. In FIG. 11, we have denoted this output as $H_i^\Phi{}_{1,X} \cdot \phi^X{}_{est}$ for the first channel, and as $H_i^\Phi{}_{N,X} \cdot \phi^X{}_{est}$ for the N-th (last) channel.

The outputs of summators 224 may then be represented as:

$$H_i^\Phi{}_{k,X} \cdot (\phi^X{}_{inp} - \phi^X{}_{est}).$$

As we did above with the individual loops, we start with the outputs of the summation nodes 224 and trace them around the loop to find the total modification. The $G_i^\Phi$ matrix processing block 242 takes these signals and perform the multiplication with the $G_i^\Phi$ matrix to produce the small signal version of signal $A_x^\Phi$, which we denote as $\alpha_x^\Phi$, as follows:

$$\alpha_x^\varphi = \sum_{k=1}^{N} G_i^\varphi{}_{X,k} \cdot H_i^\varphi{}_{k,X} \cdot (\varphi_{inp}^x - \varphi_{est}^x)$$

The summation of the $G_i^\Phi$ and $H_i^\Phi$ matrix elements is 1:

$$\sum_{k=1}^{N} G_i^\varphi{}_{X,k} \cdot H_i^\varphi{}_{k,X} = 1,$$

which provides for the simplified form of signal $\alpha_x^\Phi$ as $\alpha_x^\Phi = (\phi^X{}_{inp} - \phi^X{}_{est})$. Signal $\alpha_x^\Phi$ is processed to form the signal $v_x$ by the transfer function $K_{dx}(p)$ of filter 244-1 as follows:

$$v_x = K_{dx}(p) \cdot \alpha_x^\Phi = K_{dx}(p) \cdot (\phi^X{}_{inp} - \phi^X{}_{est}).$$

Signal $v_x$ is the small signal version of signal signal $V_x$. From FIG. 11, it can be seen that the processing of signal $v_x$ by the $H_i^\Phi$ matrix block 246 will result in an output of integrator $I_1$ for the k-th channel as:

$$K_{dx}(p) \cdot (\phi^X{}_{inp} - \phi^X{}_{est}) \cdot H_i^\Phi{}_{k,X} \cdot (1/p),$$

which is the input to the inverting input of summator 224 for the k-th channel. The small signal loop gain M(p) from the output of summator 224 to the inverting input of summator 224 is therefore:

$$M(p) = [K_{dx}(p) \cdot (\phi^X{}_{inp} - \phi^X{}_{est}) \cdot H_i^\Phi{}_{k,X} \cdot (1/p)] / [H_i^\Phi{}_{k,X} \cdot (\phi^X{}_{inp} - \phi^X{}_{est})],$$

$$M(p) = [K_{dx}(p) \cdot (1/p)].$$

Using equation (A7), we can find the transfer function $K_A(p)$ for the determination of the loop astaticism as:

$$K_A(p) = \frac{1}{(1 + M(p))} = \frac{p}{(p + K_{dx}(p))}.$$

Using equation (A9), we can find the transfer function $K_B(p)$ for the determination of the loop bandwidth as:

$$K_B(p) = \frac{M(p)}{(1 + M(p))} = \frac{K_{dx}(p)}{(p + K_{dx}(p))}$$

The other common loops may be analyzed similarly.

APPENDIX B: List of Additional Claims to be Added

A1. An extrapolating unit for extrapolating the value of a navigation parameter (e.g., $\phi^B{}_k$ or $\gamma^B{}_k$) from a global positioning satellite as measured by a base receiver, said navigation parameter being transmitted to a rover receiver over a communication link in a sequence of consecutively provided frames, each frame comprising the measured value of the navigation parameter made for a specific time moment $t_k$ as designated by a clock in the base receiver, the start of each frame occurring at a time interval $T_k$ from the start of the previous frame, the navigation parameter being extrapolated according to an extrapolation form comprising a constant, plus one or more terms which are a function of time, and one or more corresponding scaling parameters for scaling the terms, the values of said constant and scaling parameters being generated by said method, said extrapolating unit comprising:

a receiving unit for receiving from the base station frames, each frame comprising a measured value of the navigation parameter, a representation of the specific time moment $t_k$ as designated by a clock in the base receiver at which the value was measured, and a weight factor $K_k$ representative of the estimated quality of measured value of said frame, a monitoring unit to measure the signal-to-noise ratio of the communication link during the time each frame is received by the rover;

a memory unit which capable of storing a plurality $M_r$ of frames, said memory unit being responsive to the receiving unit and monitoring unit for storing the most recent consecutive frames received by the receiving unit and an indication representative of the signal-to-noise ratio of the communication link during the receipt or the corresponding stored frame;

an assessment unit responsive to the signal-to-noise ratio, the weight factor $K_k$ of the frame, which generates a quality indication associated with each stored frame of whether the measured value of a frame is satisfactory or unsatisfactory, said quality indication being generated as satisfactory unless one or more unsatisfactory conditions occurs, said quality indication being generated as unsatisfactory when the signal-to-noise ratio of the communication link falls below a first threshold value during the reception of the frame, said quality indication being generated as unsatisfactory when the weight factor $K_k$ of the frame falls below a second threshold value during the reception of the frame;

a discriminator for selecting, after each frame is received and stored, a subset of a number $n_s$ of the most recent frames from said set $M_r$ of stored frames which have satisfactory quality indications;

a processing unit for computing the values of the constant and scaling parameters of the extrapolation form from at least one selected subset of $n_s$ frames by an application of a least squares method which accounts for the weighting factors; and a generator for generating an extrapolated value of the navigation parameter frame from the extrapolation form for one or more time moments occurring after the time moment of the last received frame.

A2. The A1 apparatus wherein the frames are encoded with error detecting information;

wherein the receiving unit decodes the frames to detect transmission errors and provides an alarm signal to the assessment unit if the frame has errors.

A3. The A1 apparatus wherein the frames are encoded with error detecting and correcting information;

wherein the receiving unit decodes the frames to detect and correct for transmission errors, and provides an alarm signal to the assessment unit if the frame has errors which cannot be corrected.

B1. A cycle slip detection and correction unit for detecting and correcting cycle slips in the phase measurements one or more of a plurality n of satellite carrier signals (m=1 . . . n) made by a first navigation receiver (B) and a second navigation receiver (R), each of the navigation receivers tracking each satellite carrier signal with a phase lock loop, each phase lock loop capable of locking onto the satellite carrier signal at a plurality of separate points of steady balance which are spaced apart from one another by an respective interval '$\alpha_m$' of phase, a cycle slip being an unplanned transition from one point of steady balance to another. said unit receiving:

a plurality n of phase signals $\phi_{i,m}^B$(m=1 . . . n) at a plurality of sequential and discrete moments i of time, said phase signals $\phi_{i,m}^B$ being representative of the phases of the satellite carrier signals as received by the first navigation receiver, a plurality n of phase signals $\phi_{i,m}^R$(m=1 . . . n) at the discrete time moments i, the phase signals $\phi_{i,m}^R$ being representative of the phases of the satellite carrier signals as received by the second navigation receiver, a plurality n of distances $D_{i,m}^B$(m=1 . . . n) between the satellites and the first receiver. a plurality n of distances $D_{i,m}^R$(m=1 . . . n) between the satellites and the second receiver, and the wavelengths $\lambda_m$ of the corresponding satellite carrier signals, said cycle slip detection and correction unit comprising:

a residual generator which generates, for each discrete time moment i, a plurality n of single-difference residual signals $\Delta\phi_{i,m}$(m=1 . . . n) in the form of:

$$\Delta\phi_{i,m}=(\phi_{i,m}^B-\phi_{i,m}^R)-1/\lambda_m\cdot[D_{i,m}^B-D_{i,m}^R],$$

where $\lambda_m$ is the wavelength of the corresponding satellite carrier signal;

a common tracking system which generates, for each discrete time moment i, a plurality of estimates $\Delta\hat{\phi}_{i,m}$ (m=1 . . . n) corresponding to the plurality of residual signals $\Delta\phi_{i,m}$, said estimates including a first estimate $\Delta\hat{\phi}_{i,S}$ of a selected residual signal $\Delta\phi_{i,S}$ corresponding to a selected satellite carrier signal S(S being in the group of m=1 . . . n);

an individual correction unit (220) generating a first correction signal $\phi_{i,S}^C$ for the selected satellite carrier signal from the first estimate $\Delta\hat{\phi}_{i,S}$ and selected residual signal $\Delta\phi_{i,S}$ corresponding to the selected satellite carrier signal S, said individual correction unit comprising a summator which receives the first estimate $\Delta\hat{\phi}_{i,S}$ and selected residual signal $\Delta\phi_{i,S}$ and generates, for each discrete time moment i, a first mismatch signal $\delta\phi_{i,S}$ as a difference between the residual signal $\Delta\phi_{i,S}$ and the estimate $\Delta\hat{\phi}_{i,S}$: $\delta\phi_{i,S}=\Delta\phi_{i,S}-\Delta\hat{\phi}_{i,S}$, said individual correction unit comprising a transformation unit which generates the a first correction signal $\phi_{i,S}^C$ as an integer which is the nearest integer to the ratio $\delta\phi_{i,S}/\alpha_S$: $\phi_{i,S}^C = \alpha_S\cdot\text{round}(\delta\phi_{i,S}/\alpha_S)$.

B2. The B1 unit comprising a plurality of addition individual correction units which generate corresponding mismatch signals $\delta\phi_{i,m}$ and correction signals $\phi_{i,S}^C$, wherein each individual correction unit further comprises a second summator (228) which generates a corrected mismatch signal $\psi_{i,m}$ for each individual correction unit as $\psi_{i,m}=\delta\phi_{i,m}-\phi_{i,m}^C$ (m≠S).

B3. The B2 apparatus wherein said common tracking system comprises a first processing block for multiplying the corrected mismatch signals by a pseudo-inverse matrix $G_i^\Phi$ to generate a plurality of bias signals ($A_x^\Phi$, $A_y^\Phi$, $A_z^\Phi$, $A_q^\Phi$);

a plurality of filters for filtering a respective bias signal to generate a corresponding plurality of respective estimate signals ($V_x$, $V_y$, $V_z$, $V_q$) for the bias signals ($A_x^\Phi$, $A_y^\Phi$, $A_z^\Phi$, $A_q^\Phi$);

a second processing block for multiplying the estimate signals ($V_x$, $V_y$, $V_z$, $V_q$) by a geometric Jacobian matrix $H_i^\Phi$ to generate a corresponding plurality of projected estimate signals $V_{p,i,m}$(m=1 . . . n); and a plurality of integrators ($I_1$), each integrator integrating a respective projected estimate signal to generate a corresponding estimate signal $\Delta\hat{\phi}_{i,m}$.

What is claimed is:

1. A method of detecting and correcting cycle slips in the phase measurements of a plurality n of satellite carrier signals (m=1 . . . n) made by a first navigation receiver (B) and a second navigation receiver (R), each of the navigation receivers tracking each satellite carrier signal with a phase lock loop, each phase lock loop capable of locking onto the satellite carrier signal at a plurality of separate points of steady balance which are spaced apart from one another by an respective interval '$\alpha_m$' of phase, a cycle slip being an unplanned transition from one point of steady balance to another, said method including the steps of:

(a) receiving, for a plurality of sequential and discrete moments i of time, a plurality n of phase signals $\phi_{i,m}^B$ (m=1 . . . n) representative of the phases of the satellite carrier signals as received by the first navigation receiver;

(b) receiving, for each discrete time moment i, a plurality n of phase signals $\phi_{i,m}^R$(m=1 . . . n) representative of the phases of the satellite carrier signals as received by the second navigation receiver;

(c) receiving, for each discrete time moment i, a plurality n of distances $D_{i,m}^B$(m=1 . . . n) between the satellites and the first receiver, a plurality n of distances $D_{i,m}^R$ (m=1 . . . n) between the satellites and the second receiver;

(d) generating, for each discrete time moment i, a plurality n of single-difference residual signals $\Delta\phi_{i,m}$(m=1 . . . n) in the form of:

$$\Delta\phi_{i,m}=(\phi_{i,m}^B-\phi_{i,m}^R)-1/\lambda_m\cdot[D_{i,m}^B-D_{i,m}^R],$$

where $\lambda_m$ is the wavelength of the corresponding satellite carrier signal;

(e) generating, for each discrete time moment i, a first estimate $\Delta\hat{\phi}_{i,S}$ of a selected residual signal $\Delta\phi_{i,S}$ corresponding to a selected satellite carrier signal S (S being in the group of m=1 . . . n) as a function of the residual signals $\Delta\phi_{i,m}$(m=1 . . . n);

(f) generating, for each discrete time moment i, a first mismatch signal $\delta\phi_{i,S}$ as a difference between the selected residual signal $\Delta\phi_{i,S}$ and the estimate $\Delta\hat{\phi}_{i,S}$ for it:

$$\delta\phi_{i,S}=\Delta\phi_{i,S}-\Delta\hat{\phi}_{i,S}; \text{ and}$$

(g) generating, for each discrete time moment i, a first correction signal $\phi_{i,S}^C$ in relation to the first mismatch signal $\delta\phi_{i,S}$ according to the form:

$$\phi_{i,S}^C=\alpha_S \cdot \text{round}(\delta\phi_{i,S}/\alpha_S),$$

where round(*) is the operation of rounding the quantity $\delta\phi_{i,S}/\alpha_S$ to the nearest integer.

2. A method according to claim 1 further comprising the step of generating, for each discrete time moment i, the plurality n of phase signals $\phi_{i,m}^R$(m=1 . . . n) representative of the phases of the satellite carrier signals as received by the second navigation receiver.

3. A method according to claim 2 further comprising the step of generating, for each discrete moments i of time, the plurality n of phase signals $\phi_{i,m}^B$(m=1 . . . n) representative of the phases of the satellite carrier signals as received by the first navigation receiver.

4. A method according to claim 1 further comprising the step of:

(h) generating, for one or more of the discrete time moments i, a first corrected residual signal $\Delta\phi_{i,S}^C$ as a difference of the first single-difference residual signal $\Delta\phi_{i,S}$ and the first correction signal $\phi_{i,S}^C$: $\Delta\phi_{i,S}^C=\Delta\phi_{i,S}-\phi_{i,S}^C$.

5. A method according to claim 4 therein step (a) comprises the step of generating the phase signals $\phi_{i,m}^B$(m=1 . . . n) which are measured at the first navigation receiver by extrapolation at the second navigation receiver from measured values which are transmitted from the first navigation receiver to the second navigation receiver through a communication link.

6. A method according to claim 4 wherein said steps (a)–(h) are performed while the plurality of discrete time moments are occurring.

7. A method according to claim 4 wherein each of the first and second navigation receivers are stationary, wherein the plurality of discrete time moments occur over a first period of time, wherein steps (a) and (b) are performed while the plurality of discrete time moments are occurring, wherein steps (a) and (b) further comprise respective steps for recording the phase signals $\phi_{i,m}^B$(m=1 . . . n) and $\phi_{i,m}^R$ (m–1 . . . n), and wherein said steps (c)–(h) are preformed during a second period time which follows said first period of time.

8. A method according to claim 4 further comprising the step of generating an error alarm signal ("OBSERVATION MISSING") indicating that the first corrected residual signal $\Delta\phi_{i,S}^C$ may have errors due to a cycle slip, said step including the steps of generating the error alarm signal in an active state whenever the value of the first correction signal $\phi_{i,S}^C$ changes between consecutive discrete moments of time i, and generating the error alarm signal in a non-active state when the value of the first correction signal $\phi_{i,S}^C$ remains unchanged for a period $T_1$ of time, said time period $T_1$ being greater than the time period $T_I$ between consecutive-discrete time moments i.

9. A method according to claim 8 further comprising the steps of:

monitoring the signal quality of the selected satellite carrier signal as received by the first navigation receiver (B) and generating a first alarm signal in an active state when the signal quality falls below a respective selected level; and monitoring the signal quality of first selected satellite carrier signal as received by the second navigation receiver (R) and generating a second alarm signal in an active state when the signal quality falls below a respective selected level; and wherein the step of generating the error alarm signal further includes the step of generating the error alarm signal in an active state whenever any of the first and second alarm signals are in their active states.

10. A method according to claim 9 wherein the time period $T_1$=1.0 second.

11. A method according to claim 4 wherein a baseline vector (x,y,z) relates the position of one receiver to the position of the other receiver, wherein each receiver has a time clock for referencing its measurements and wherein any difference between the time clocks may be represented by an offset q, and wherein said step (e) of generating the first estimate $\Delta\hat{\phi}_{i,S}$ of the selected residual signal $\Delta\phi_{i,S}$ comprises the steps of:

(i) generating, for each discrete time moment i, an additional estimate $\Delta\hat{\phi}_{i,m}$ for each of the other residual signals $\Delta\phi_{i,m}$(m≠S);

j) generating, for each discrete time moment i, an additional mismatch signal $\delta\phi_{i,m}$ for each of the other residual signals $\Delta\phi_{i,m}$(m≠S), the additional mismatch signal $\delta\phi_{i,m}$ being generated as a difference between each additional residual signal $\Delta\phi_{i,m}$ and its corresponding estimate $\Delta\hat{\phi}_{i,m}$:

$$\delta\phi_{i,m}=\Delta\phi_{i,m}-\Delta\hat{\phi}_{i,m}(m\neq S);$$

(k) generating, for each discrete time moment i, an additional correction signal $\phi_{i,m}^C$ (m≠S) for each of the other residual signals $\Delta\phi_{i,m}$(m≠S) in the form:

$$\phi_{i,m}^C=\alpha_m \cdot \text{round}(\delta\phi_{i,m}/\alpha_m)(m\neq S),$$

where round(*) is the operation of rounding the quantity $\delta\phi_{i,m}/\alpha_m$ to the nearest integer;

(l) generating, for each discrete time moment i, a corrected mismatch signal $\psi_{i,m}$ (m≠S) for each of the other residual signals $\Delta\phi_{i,m}$(m≠S) as a difference of the corresponding additional mismatch $\delta\phi_{i,m}$(m≠S) and the corresponding additional correction $\phi_{i,m}^C$(m≠S):

$$\psi_{i,m}=\delta\phi_{i,m}-\phi_{i,m}^C(m\neq S);$$

(m) generating, for each discrete time moment i, a plurality of bias signals ($A_x^\Phi, A_y^\Phi, A_z^\Phi$) representing biases in the coordinates of the base line vector (x, y, z) and a bias signal ($A_q^\Phi$) representing a bias in the time clock offset q, said bias signals being generated in relation to the corrected mismatch signals $\psi_{i,m}$(m≠S);

(n) generating, for each discrete time moment i, a plurality of respective estimate signals ($V_x, V_y, V_z, V_q$) for the bias signals ($A_x^\Phi, A_y^\Phi, A_z^\Phi, A_q^\Phi$) by filtering each bias signal;

(o) generating, for each discrete time moment i, a plurality of projected estimates $V_{p,i,m}$(m=1 . . . n) by multiplying a geometric Jacobian matrix $H_i^\Phi$ with a vector $Vd_i$ of the estimate signals ($V_x, V_y, V_z, V_q$), three columns of matrix $H_i^\Phi$ comprising the directional cosines between one of the receivers and the satellites and a fourth column of matrix $H_i^\Phi$ comprising the unit vector, one of the projected estimates $V_{p,i,S}$ is corresponding to the selected residual signal $\Delta\phi_{i,S}$ and each of the remaining projected estimates $V_{p,i,m}$ (m≠S) corresponding a respective one of the other residual signals $\Delta\phi_{i,m}$ (m≠S); and (p) integrating the projected estimate $V_{p,i,S}$ corresponding to the selected residual signal $\Delta\phi_{i,S}$ with respect to time to generate the first estimate $\Delta\hat{\phi}_{i,S}$; and wherein said step (i) of generating the additional estimates $\Delta\hat{\phi}_{i,m}$ comprises the step of integrating the remaining projected estimates with respect to time $V_{p,i,m}$ (m≠S).

12. A method according to claim 11 wherein the phase lock loops comprise a common circuit topology such that the intervals $\alpha_m$ (m=1 . . . n) are the same for all of the satellite carrier signals.

13. A method according to claim 11 wherein the corrected mismatch signals $\psi_{i,m}$ (m≠S) may be grouped as a vector $\psi_i$ of mismatch signals;

wherein said step (m) of generating the plurality of bias signals ($A_x^\Phi$, $A_y^\Phi$, $A_z^\Phi$, $A_q^\Phi$) comprises the step of multiplying a geometric pseudo-inverse matrix $G_i^\Phi$ of matrix $H_i^\Phi$ with the vector $\psi_i$ of mismatch signals the resulting product of which comprises the plurality of bias signals ($A_x^\Phi$, $A_y^\Phi$, $A_z^\Phi$, $A_q^\Phi$).

14. A method according to claim 13 wherein $G_i^\Phi$ is generated in the form:

$$G_i^\Phi = [(H_i^\Phi)^T \cdot (R_i^\Phi)^{-1} \cdot (H_i^\Phi)]^{-1} \cdot (H_i^\Phi)^T \cdot (R_i^\Phi)^{-1},$$

where matrix $R_i^\Phi$ is a covariance observation matrix having diagonal elements which are representative of the combined measurement accuracy of the satellite signals made by both receivers, one diagonal element corresponding to the measurement accuracy of the first satellite carrier signal and each remaining diagonal element corresponding to the measurement accuracy of one of the additional satellite carrier signals.

15. A method according to claim 13 further comprising the step of:

(q) generating, for each discrete time moment i, a corrected mismatch signal $\psi_{i,S}$ for the selected residual signal $\Delta\phi_{i,S}$ as a difference of the first mismatch signal $\delta\phi_{i,S}$ and the first correction signal $\phi_{i,S}^C$:

$$\psi_{i,S} = \delta\phi_{i,S} - \phi_{i,S}^C; \text{ and}$$

(r) adding the corrected mismatch signal $\psi_{i,S}$ as a component to the vector $\psi_i$ of mismatch signals.

16. A method according to claim 15 wherein the plurality of discrete time moments i are spaced from one another by a time interval $T_I$ which is in the range of 5 ms to 10 ms:

wherein the phase lock loops comprise a common circuit topology such that $\alpha_m=0.5$ cycles (m=1 . . . n);

wherein said steps (a)–(r) are performed for each discrete time moment i before being performed for the next time moment i+1;

wherein the processing steps included by steps (e)–(g), (i)–(r) form a common tracking system which conveys each bias signal ($A_x^\Phi, A_y^\Phi, A_z^\Phi, A_q^\Phi$) through a feedback loop formed by the processing steps included by steps (e)–(g), (i)–(r), wherein the frequency response of each feedback loop has a bandwidth of between 15 Hz and 25 Hz; and wherein said step (n) of filtering each bias signal comprises the step of filtering each bias signal with a filter having a frequency transfer function of the form:

$$K_d(p) = K1 + \frac{K2}{p} + \frac{K3}{p^2},$$

where p is the Laplacian operator.

17. A method according to claim 15 wherein each of the first and second navigation receivers is stationary, wherein the plurality of discrete time moments occur over a first period of time, wherein steps (a) and (b) are performed while the plurality of discrete time moments are occurring, wherein steps (a) and (b) further comprise respective steps for recording the phase signals $\phi_{i,m}^B$ (m=1 . . . n) and $\phi_{i,m}^R$ (m=1 . . . n), and wherein said steps (c)–(r) are preformed during a second period time which follows said first period of time.

18. A method according to claim 17 wherein the plurality of discrete time moments i are spaced from one another by a time interval $T_I$ which is in the range of 0.05 seconds to 1 second;

wherein the phase lock loops comprise a common circuit topology such that $\alpha_m=0.5$ cycles (m=1 . . . n);

wherein said steps (a)–(r) are performed for each discrete time moment i before being performed for the next time moment i+1;

wherein the processing steps included by steps (e)–(g), (i)–(r) form a common tracking system which conveys each bias signal ($A_x^\Phi, A_y^\Phi, A_z^\Phi, A_q^\Phi$) through a feedback loop formed by the processing steps included by steps (e)–(g), (i)–(r), wherein the frequency response of each feedback loop has a bandwidth of between 4 Hz and 0.2 Hz; and wherein said step (n) of filtering each bias signal comprises the step of filtering each bias signal with a filter having a frequency transfer function of the form:

$$K_d(p) = K1' + \frac{K2'}{p},$$

where p is the Laplacian operator.

19. A method according to claim 15 further comprising the step of:

(s) generating a first drift correction signal $V_{In,i,S}$ as a function of the corrected mismatch signal $\psi_{i,S}$ for the selected residual signal $\Delta\phi_{i,S}$, the first drift correction signal $V_{In,i,S}$ for correcting the first estimate $\Delta\hat{\phi}_{i,S}$ for systematic errors appearing in the selected residual signal $\Delta\phi_{i,S}$; and wherein said step (p) comprises the step of adding the first drift correction signal $V_{In,i,S}$ to the projected estimate $V_{p,i,S}$ corresponding to the first residual signal $\Delta\phi_{i,S}$ to form a combined signal, and wherein said step (p) integrates the combined signal.

20. A method according to claim 19 wherein the step of generating a first drift correction signal $V_{In,i,S}$ comprises the step of periodically sampling the corrected mismatch signal $\psi_{i,S}$ for the selected residual signal $\Delta\phi_{i,S}$ at a plurality of time moments spaced apart by a time interval $\Delta T_{in}$, and generating the first drift correction signal $V_{In,i,S}$ in proportion to the sampled corrected mismatch signal $\psi_{i,S}$.

21. A method according to claim 20 wherein the time interval $\Delta T_{in}$ is initially set to a value in the range of 0.01 seconds to 5.0 seconds;

wherein the first corrected residual signal $\Delta\phi_{i,S}^C$ is provided to an ambiguity resolution process which generates an indication when the cycle ambiguity in the carrier phase has been resolved; and wherein the time interval $\Delta T_{in}$, is set to a value in the range of 60–200 seconds when an indication is generated that the cycle ambiguity has been resolved.

22. A method according to claim 20 wherein the time interval $\Delta T_{in}$ is initially set to a value in the range of 0.01 seconds to 5.0 seconds for an initial period of time, and is thereafter set to a value in the range of 60–200 seconds.

23. A method according to claim 20 comprising the steps of:

monitoring the signal quality of the selected satellite carrier signal as received by the first navigation receiver (B) and generating a first alarm signal in an active state when the signal quality falls below a respective selected level;

monitoring the signal quality of the selected satellite carrier signal as received by the second navigation receiver (R) and generating a second alarm signal in an active state when the signal quality falls below a respective selected level;

generating a blocking signal in an active state whenever one or more of said first and second alarm signals are active, or whenever the absolute value of the corrected mismatch $\psi_{i,S}$ corresponding to the selected satellite carrier signal is above a threshold $\Pi_\delta$; and blocking the sampling of the corrected mismatch signal $\psi_{i,S}$ for the selected satellite carrier signal when the blocking signal is generated in an active state.

24. A method according to claim 23 wherein said step (r) further comprises the step of removing the corrected mismatch signal $\psi_{i,S}$ for the selected residual signal $\Delta\phi_{i,S}$ from the vector $\psi_i$ of mismatch signals when the blocking signal is generated in an active state; and said step (m) further comprises the step of forming, when the blocking signal is generated in an active state, a reduced matrix $H_i^\Phi$ which has the matrix row corresponding to the first satellite signal removed and thereafter computing a replacement pseudo-inverse matrix $G_i^\Phi$ from said reduced matrix $H_i^\Phi$.

25. A method according to claim 23 comprising the step of:

generating the blocking signal in a non-active state when the absolute value of the corrected mismatch $\psi_{i,S}$ for the selected residual signal $\Delta\phi_{i,S}$ remains below the threshold $\Pi_\delta$ for a time period $T_d$ with said first and second alarm signals being non-active, said time period being greater than the time period $T_I$ between consecutive discrete time moments i.

26. A method according to claim 25 wherein the threshold $\Pi_\delta = 1.4$ radians and the time period $T_d = 1.0$ second.

27. A method according to claim 19 wherein the step of generating a first drift correction signal $V_{In,i,S}$ comprises the step of integrating the corrected mismatch signal $\psi_{i,S}$ for the selected residual signal $\Delta\phi_{i,S}$ with an integrating-type filter having a transfer function of the form (1+K4/p) or of the form (1+K4'/p+K5'/p²), wherein the corrected mismatch signal $\psi_{i,S}$ is applied to the input of the integrating-type filter for an initial time period $T_W$ and thereafter removed, and wherein the first drift correction signal $V_{In,i,S}$ is provided at the output of the integrating-type filter.

28. A method according to claim 27 wherein the first corrected residual signal $\Delta\phi_{i,S}{}^C$ is provided to an ambiguity resolution process which generates an indication when the cycle ambiguity in the carrier phase has been resolved; and wherein the corrected mismatch signal $\psi_{i,S}$ for the selected residual signal $\Delta\phi_{i,S}$ is reapplied to the input of the integrating-type filter for another time period $T_W$ when an indication is generated that the cycle ambiguity has been resolved, and is thereafter removed.

29. A method according to claim 27 wherein the corrected mismatch signal $\psi_{i,S}$ for the selected residual signal $\Delta\phi_{i,S}$ is reapplied to the input of the integrating-type filter for another time period $T_W$, and thereafter removed.

30. A method according to claim 27 wherein said steps (a)–(s) are performed for each discrete time moment i before being performed for the next time moment i+1;

wherein the processing steps included by steps (e)–(g), (q), (s) and (p) form an individual feedback loop during the initial time period $T_W$, the loop conveying the first drift correction signal $V_{In,i,S}$ as a feedback signal through the processing steps included by steps (e)–(g), (q), (s) and (p);

wherein the individual feedback loop has a second order of astaticism (type 2 servo system) during the initial time period $T_W$;

wherein the frequency response of the individual feedback loop has a bandwidth of between 1 Hz and 3 Hz; and wherein the initial time period $T_W$ is between 0.5 seconds and 3 seconds.

31. A method according to claim 27 wherein the corrected mismatch signal $\psi_{i,S}$ or the selected residual signal $\Delta\phi_{i,S}$ is reapplied to the input of the integrating-type filter for another time period $T_W$, and wherein the time between the first and second applications of the corrected mismatch signal $\psi_{i,S}$ is between 10 minutes and 15 minutes.

32. A method according to claim 15 further comprising the steps of:

monitoring the signal quality of the selected satellite carrier signal as received by the first navigation receiver (B) and generating a first alarm signal in an active state when the signal quality falls below a respective selected level;

monitoring the signal quality of selected satellite carrier signal as received by the second navigation receiver (R) and generating a second alarm signal in an active state when the signal quality falls below a respective selected level; and generating a blocking signal in an active state whenever one or more of said first and second alarm signals are active, or whenever the absolute value of the corrected mismatch $\psi_{i,S}$ for the selected residual signal $\Delta\phi_{i,S}$ is above a respective threshold $\Pi_\delta$; and wherein said step (r) comprises the step of removing the corrected mismatch signal $\psi_{i,S}$ for the selected residual signal $\Delta\phi_{i,S}$ from the vector $\psi_i$ of mismatch signals when the blocking signal is generated in an active state; and wherein said step (m) comprises the step of forming, when the blocking signal is generated in an active state, a reduced matrix $H_i^\Phi$ which has the matrix row corresponding to the first satellite signal removed and thereafter generating a replacement matrix $G_i^\Phi$ from said reduced matrix $H_i^\Phi$.

33. A method according to claim 32 wherein step (a) comprises the step of transmitting values for the phase signals $\phi_{i,m}{}^B$(m=1 . . . n) measured at the first navigation receiver to the second navigation receiver through a communication link; and wherein the step of generating the blocking signal further comprises the steps of monitoring the signal quality of the communication link and generating the blocking signal in an active state when the quality of the communication link falls below a respective selected level.

34. A method according to claim 32 comprising the step of:

generating the blocking signal in a non-active state when the absolute value of the corrected mismatch $\psi_{i,S}$ for the selected residual signal $\Delta\phi_{i,S}$ remains below the threshold $\Pi_\delta$ for a time period $T_d$ with said first and second alarm signals being non-active, said time period being greater than the time period $T_i$ between consecutive discrete time moments i.

35. A method according to claim 34 wherein the threshold $\Pi_\delta$=1.4 radians and the time period $T_d$=1.0 second.

36. A cycle slip detection and correction unit for detecting and correcting cycle slips in the phase measurements one or more of a plurality n of satellite carrier signals (m=1 . . . n) made by a first navigation receiver (B) and a second navigation receiver (R), each of the navigation receivers tracking each satellite carrier signal with a phase lock loop, each phase lock loop capable of locking onto the satellite carrier signal at a plurality of separate points of steady balance which are spaced apart from one another by an respective interval '$\alpha_m$' of phase, a cycle slip being an unplanned transition from one point of steady balance to another, said unit receiving:

a plurality n of phase signals $\phi_{i,m}^B$(m=1 . . . n) at a plurality of sequential and discrete moments i of time, said phase signals $\phi_{i,m}^B$ being-representative of the phases of the satellite carrier signals as received by the first navigation receiver, a plurality n of phase signals $\phi_{i,m}^R$(m=1 . . . n) at the discrete time moments i, the phase signals $\phi_{i,m}^R$ being representative of the phases of the satellite carrier signals as received by the second navigation receiver, a plurality n of distances $D_{i,m}^B$(m=1 . . . n) between the satellites and the first receiver, a plurality n of distances $D_{i,m}^R$(m=1 . . . n) between the satellites and the second receiver, and the wavelengths $\lambda_m$ of the corresponding satellite carrier signals, said cycle slip detection and correction unit comprising:

a residual generator which generates, for each discrete time moment i, a plurality n of single-difference residual signals $\Delta\phi_{i,m}$(m=1 . . . n) in the form of:

$$\Delta\phi_{i,m}=(\phi_{i,m}^B-\phi_{i,m}^R)-1/\lambda_m\cdot[D_{i,m}^B-D_{i,m}^R],$$

where $\lambda_m$ is the wavelength of the corresponding satellite carrier signal;

a common tracking system which generates, for each discrete time moment i, a plurality of estimates $\Delta\phi_{i,m}$ (m=1 . . . n) corresponding to the plurality of residual signals $\Delta\phi_{i,m}$, said estimates including a first estimate $\Delta\phi_{i,S}$ of a selected residual signal $\Delta\phi_{i,S}$ corresponding to a selected satellite carrier signal S (S being in the group of m=1 . . . n);

an individual correction unit (220) generating a first correction signal $\Delta\phi_{i,S}^C$ for the selected satellite carrier signal from the first estimate $\Delta\phi_{i,S}$ and selected residual signal $\Delta\phi_{i,S}$ corresponding to the selected satellite carrier signal S, said individual correction unit comprising a summator which receives the first estimate $\Delta\phi_{i,S}$ and selected residual signal $\Delta\phi_{i,S}$ and generates, for each discrete time moment i, a first mismatch signal $\Delta\phi_{i,S}$ as a difference between the residual signal $\Delta\phi_{i,S}$ and the estimate $\Delta\phi_{i,S}$:$\delta\phi_{i,S}=\Delta\phi_{i,S}-\Delta\phi_{i,S}$, said individual correction unit comprising a transformation unit which generates the first correction signal $\phi_{i,S}^C$ as an integer which is the nearest integer to the ratio $\delta\phi_{i,S}/\alpha_S$:$\phi_{i,S}^C=\alpha_S\cdot$round($\delta\phi_{i,S}/\alpha_S$).

37. The apparatus of claim 36 further comprising a plurality of addition individual correction units which generate corresponding mismatch signals $\delta\phi_{i,m}$ and correction signals $\phi_{i,S}^C$, wherein each individual correction unit further comprises a second summator (228) which generates a corrected mismatch signal $\psi_{i,m}$ for each individual correction unit as $\psi_{i,m}=\delta\phi_{i,m}-\phi_{i,m}^C$(m≠S).

38. The apparatus of claim 37 wherein said common tracking system comprises a first processing block for multiplying the corrected mismatch signals by a pseudo-inverse matrix $G_i^\Phi$ to generate a plurality of bias signals ($A_x^\Phi$, $A_y^\Phi$, $A_z^\Phi$, $A_q^\Phi$);

a plurality of filters for filtering a respective bias signal to generate a corresponding plurality of respective estimate signals ($V_x$, $V_y$, $V_z$, $V_q$) for the bias signals ($A_x^\Phi$, $A_y^\Phi$, $A_z^\Phi$, $A_q^\Phi$);

a second processing block for multiplying the estimate signals ($V_x$, $V_y$, $V_z$, $V_q$) by a geometric Jacobian matrix $H_i^\Phi$ generate a corresponding plurality of projected estimate signals $V_{p,i,m}$(m=1 . . . n); and a plurality of integrators ($I_1$), each integrator integrating a respective projected estimate signal to generate a corresponding estimate signal $\Delta\phi_{i,m}$.

* * * * *

UNITED STATES PATENT AND TRADEMARK OFFICE
CERTIFICATE OF CORRECTION

PATENT NO. : 6,456,233 B1
DATED : July 31, 2001
INVENTOR(S) : Zhodzishsky et al.

It is certified that error appears in the above-identified patent and that said Letters Patent is hereby corrected as shown below:

Column 60,
Line 41, delete the first occurrence of "an" and insert therefor -- a --.
Line 41, delete "'$\alpha_m$'" and insert therefor -- '$a_m$' --.
Line 55, before "a" insert -- and --.
Line 67, delete the first occurrence of "$\Delta\phi_{i,s}$" and insert therefor -- $\Delta\hat{\phi}_{i,s}$ --.

Column 61,
Line 6, delete the second occurrence of "$\Delta\phi_{i,s}$" and insert therefor -- $\Delta\hat{\phi}_{i,s}$ --.

Line 9, delete "$\delta\phi_{i,s} = \Delta\phi_{i,s} - \Delta\phi_{i,s}$ ; and" and insert therefor -- $\delta\phi_{i,s} = \Delta\phi_{i,s} - \Delta\hat{\phi}_{i,s}$ ; and --.

Line 15, delete "$\phi_{i,s}{}^c = \alpha_s \cdot round(\delta\phi_{i,s}/\alpha_s)$," and insert therefor -- $\phi_{i,s}{}^c = a_s \cdot round(\delta\phi_{i,s}/a_s)$, --.

Line 17, delete "$\delta\phi_{i,s}/\alpha_s$" and insert therefor -- $\delta\phi_{i,s}/a_s$ --.
Line 24, delete "moments" and insert therefor -- moment --.
Line 33, break line after "$\phi_{i,s}{}^c$:" so all of formula appears on next line.
Line 35, delete "therein" and insert therefor -- wherein --.
Line 46, delete "are" and insert therefor -- is --.
Line 52, delete "preformed" and insert therefor -- performed --.
Line 53, after the first occurrence of "period" insert -- of --.
Line 65, delete "consecutive-discrete" and insert therefor -- consecutive discrete --.

Column 62,
Line 6, after "of" insert -- the --.
Line 28, delete "j)" and insert therefor -- (j) --.

Line 41, delete "$\phi_{i,m}{}^c = \alpha_m \cdot round(\delta\phi_{i,m}/\alpha_m)(m \neq S)$," and insert therefor -- $\phi_{i,m}{}^c = a_m \cdot round(\delta\phi_{i,m}/a_m) \; (m \neq S)$, --.

Line 44, delete "$\delta\phi_{i,m}/\alpha_m$" and insert therefor -- $\delta\phi_{i,m}/a_m$ --.

Line 48, after "mismatch" insert -- signal --.
Line 49, after "correction" insert -- signal --.
Line 55, delete "base line" and insert therefor -- baseline --.

UNITED STATES PATENT AND TRADEMARK OFFICE
CERTIFICATE OF CORRECTION

PATENT NO. : 6,456,233 B1
DATED : July 31, 2001
INVENTOR(S) : Zhodzishsky et al.

It is certified that error appears in the above-identified patent and that said Letters Patent is hereby corrected as shown below:

Column 63,
Line 3, before "corresponding" delete --is --.
Line 5, after "corresponding" insert -- to --.
Line 16, delete "$\alpha_m$ (m=1...n)" and insert therefor -- $a_m$ (m=1...n) --.
Line 24, delete "signals" and insert therefor -- signals, --.
Line 53, delete "10 ms:" and insert therefor -- 10 ms; --.
Line 55, delete "$\alpha_m$=0.5 cycles" and insert therefor -- $a_m$=0.5 cycles --.

Column 64,
Line 17, delete "preformed" and insert therefor -- performed --.
Line 17, after "period" insert -- of --.
Line 24, delete "$\alpha_m$=0.5 cycles" and insert therefor -- $a_m$=0.5 cycles --.

Column 65,
Line 3, delete "$\Delta T_{in}$," and insert therefor -- $\Delta T_{in}$ --.
Line 25, after "mismatch" insert -- signal --.
Line 44, after "mismatch" insert -- signal --.

Column 66,
Line 26, delete "or" and insert therefor -- for --.
Line 38, after "of" insert -- the --.
Line 46, after "mismatch" insert -- signal --.

Column 67,
Line 7, after "mismatch" insert -- signal --.
Line 16, after "measurements" insert -- of --.
Line 23, delete "an" and insert therefor -- a --.
Line 24, delete "'$\alpha_m$'" and insert therefor -- '$a_m$' --.
Line 29, delete "being-representative" and insert therefor -- being representative --.

UNITED STATES PATENT AND TRADEMARK OFFICE
CERTIFICATE OF CORRECTION

PATENT NO. : 6,456,233 B1
DATED : July 31, 2001
INVENTOR(S) : Zhodzishsky et al.

It is certified that error appears in the above-identified patent and that said Letters Patent is hereby corrected as shown below:

Column 68,
Line 7, delete the first occurrence of "$\Delta\phi_{i,s}$" and insert therefor $-- \Delta\hat{\phi}_{i,s} --$.
Line 11, delete "$\Delta\phi_{i,s}{}^C$" and insert therefor $-- \Delta\phi_{i,s}{}^C --$.

Line 12, delete "$\Delta\phi_{i,s}$" and insert therefor $-- \Delta\hat{\phi}_{i,s} --$.
Line 15, delete "$\Delta\phi_{i,s}$" and insert therefor $-- \Delta\hat{\phi}_{i,s} --$.

Line 17, after "first mismatch signal", delete "$\Delta\phi_{i,s}$" and insert therefor $-- \delta\phi_{i,s} --$.

Line 19, delete "$\Delta\phi_{i,s} : \delta\phi_{i,s} = \Delta\phi_{i,s} - \Delta\phi_{i,s}$" and insert therefor
$-- \Delta\hat{\phi}_{i,s} : \delta\phi_{i,s} = \Delta\phi_{i,s} - \Delta\hat{\phi}_{i,s} --$.
Line 22, delete "$\delta\phi_{i,s}/\alpha_s : \phi_{i,s}{}^C =$" and insert therefor $-- \delta\phi_{i,s}/\alpha_s : \phi_{i,s}{}^C = --$.
Line 23, delete "$\alpha_s \cdot round(\delta\phi_{i,s}/\alpha_s).$" and insert therefor
$-- a_s \cdot round(\delta\phi_{i,s}/a_s). --$.
Line 25, delete "addition" and insert therefor -- additional --.
Line 42, before "generate" insert -- to --.

Line 46, delete "$\Delta\phi_{i,m}$." and insert therefor $-- \Delta\hat{\phi}_{i,m} --$.

Signed and Sealed this

Fourteenth Day of June, 2005

JON W. DUDAS
*Director of the United States Patent and Trademark Office*